(12) United States Patent
Friesen et al.

(10) Patent No.: US 12,392,117 B2
(45) Date of Patent: Aug. 19, 2025

(54) SYSTEMS AND METHODS FOR GENERATING WATER FROM AIR

(71) Applicant: Source Global, PBC, Scottsdale, AZ (US)

(72) Inventors: Cody Friesen, Scottsdale, AZ (US); Michael Robinson, Scottsdale, AZ (US); Kamil Salloum, Scottsdale, AZ (US); Jonathan Goldberg, Scottsdale, AZ (US)

(73) Assignee: SOURCE Global, PBC, Scottsdale, AZ (US)

( * ) Notice: Subject to any disclaimer, the term of this patent is extended or adjusted under 35 U.S.C. 154(b) by 0 days.

(21) Appl. No.: 18/379,878

(22) Filed: Oct. 13, 2023

(65) Prior Publication Data
US 2024/0102269 A1 Mar. 28, 2024

Related U.S. Application Data

(63) Continuation of application No. 17/578,854, filed on Jan. 19, 2022, now Pat. No. 11,814,820.
(Continued)

(51) Int. Cl.
*B01D 53/04* (2006.01)
*B01D 5/00* (2006.01)
(Continued)

(52) U.S. Cl.
CPC ............. *E03B 3/28* (2013.01); *B01D 5/0051* (2013.01); *B01D 5/0075* (2013.01);
(Continued)

(58) Field of Classification Search
CPC ....... E03B 3/28; B01D 5/0051; B01D 5/0075; B01D 53/0438; B01D 53/0446; B01D 53/0454; B01D 53/261; B01D 53/265; B01D 2257/80; B01D 2259/4009; B01D 1/0035; B01D 2251/302; B01D 2251/304; B01D 2251/306; B01D 2251/402; B01D 2251/404; B01D 2251/60; B01D 2251/70; B01D 2252/2023; B01D 2253/102;
(Continued)

(56) References Cited

U.S. PATENT DOCUMENTS 10,829,913 B1 * 11/2020 Ahmed ................ B01D 61/025
11,414,843 B2 * 8/2022 Friesen ................ B01D 53/04
(Continued)

*Primary Examiner* — Frank M Lawrence, Jr.
(74) *Attorney, Agent, or Firm* — Fish & Richardson P.C.

(57) ABSTRACT

A water generation system for generating liquid water from a process gas containing water vapor is disclosed. In various embodiments, the water generation systems comprise a solar thermal unit, a condenser and a controller configured to operate the water generation system between a loading operational mode and a release operational mode for the production of liquid water. A method of generating water from a process gas is disclosed herein. In various embodiments, the method comprises flowing a process gas into a solar thermal unit, transitioning from the loading operational mode to a release operational mode; flowing a regeneration fluid into the solar thermal unit and the condenser during the release operational mode; and, condensing water vapor from the regeneration fluid to produce liquid water.

23 Claims, 40 Drawing Sheets

Related U.S. Application Data

(60) Provisional application No. 63/139,216, filed on Jan. 19, 2021, provisional application No. 63/170,366, filed on Apr. 2, 2021, provisional application No. 63/274,753, filed on Nov. 2, 2021.

(51) Int. Cl.
*B01D 53/26* (2006.01)
*E03B 3/28* (2006.01)

(52) U.S. Cl.
CPC ..... *B01D 53/0438* (2013.01); *B01D 53/0446* (2013.01); *B01D 53/0454* (2013.01); *B01D 53/261* (2013.01); *B01D 53/265* (2013.01); *B01D 2257/80* (2013.01); *B01D 2259/4009* (2013.01)

(58) Field of Classification Search
CPC ........ B01D 2253/104; B01D 2253/106; B01D 2253/108; B01D 2253/11; B01D 2253/1124; B01D 2253/202; B01D 2253/204; B01D 53/263; Y02A 20/00
USPC ....... 95/10, 117, 121–123; 96/109, 111, 126, 96/130, 146
See application file for complete search history.

(56) References Cited

U.S. PATENT DOCUMENTS

| | | |
|---|---|---|
| 11,814,820 B2* | 11/2023 | Friesen .................... E03B 3/28 |
| 11,905,687 B2* | 2/2024 | Friesen .................... E03B 3/28 |
| 2007/0028769 A1* | 2/2007 | Eplee .................... B01D 53/06 95/113 |
| 2018/0169571 A1* | 6/2018 | Stuckenberg ........ B01D 53/002 |
| 2021/0394114 A1* | 12/2021 | Schmaelzle .......... B01D 53/261 |

* cited by examiner

SYSTEMS AND METHODS FOR GENERATING WATER FROM AIR

CROSS-REFERENCE TO RELATED APPLICATIONS

This application is a continuation of U.S. patent application Ser. No. 17/578,854, filed on Jan. 19, 2022 entitled "SYSTEMS AND METHODS FOR GENERATING WATER FROM AIR", which claims priority to, and the benefit of, U.S. Provisional Patent Application Ser. No. 63/139,216, filed on Jan. 19, 2021 entitled "SYSTEMS AND METHODS FOR GENERATING WATER FROM AIR", U.S. Provisional Patent Application Ser. No. 63/170,366, filed on Apr. 2, 2021 entitled "HYGROSCOPIC SYSTEMS AND METHODS FOR GENERATING WATER FROM AIR", and U.S. Provisional Patent Application Ser. No. 63/274,753, filed on Nov. 2, 2021 entitled "SYSTEMS AND METHODS FOR GENERATING WATER FROM AIR", the disclosures of which are hereby incorporated by reference in their entirety.

TECHNICAL FIELD

This disclosure is related to systems and methods for generating liquid water from a gas. In particular this disclosure is related to systems and methods for generating liquid water from ambient air via hygroscopic components.

BACKGROUND

Producing liquid water by extracting water vapor from ambient air or atmospheric air can present various challenges. Certain challenges include those associated with maximizing a water production rate and/or efficiency at a low cost and high reliability. There exists a need for improved systems and methods for producing liquid water from atmospheric air and in some cases, by compact, modular devices that are configured for high efficiency, field serviceability and maintenance in addition to being simple to manufacture and deploy.

Furthermore, certain challenges are associated with approaches employing desiccant or hygroscopic materials for water uptake and release of water vapor to produce liquid water. Water from air systems can include solid or liquid desiccants. Systems employing liquid desiccants often take an approach of spraying a liquid desiccant mist to improve the interaction with and water uptake from a gas. However, this approach can require significant energy and additional separation processes for released water and exhaust gas. Systems employing solid desiccants can be relatively inefficient for water production due to various considerations including limited surface areas and limited mass-specific water uptake potential. There exists a need for improved systems and methods for efficient and consistent water production with hygroscopic systems in highly efficient and/or deployable form factors.

SUMMARY OF THE INVENTION

A water generating system is disclosed herein. In various embodiments, the system for generating water from a process gas (e.g., air) comprises a solar thermal unit configured to absorb thermal energy and capture water vapor from air during a loading operational mode and transfer heat and water vapor to a working gas flowing in a regeneration flow path during a release operational mode. The water generating system further comprises a condenser configured to condense water vapor from the working gas to produce liquid water during the release operational mode. Furthermore, the water generating system comprises a controller configured to operate the water generation system between the loading operational mode and the release operational mode.

A method of generating water from a process gas using a water generating system is disclosed herein. In various embodiments, the method comprises flowing a process gas (e.g., air), during a loading operational mode, to a process inlet of a solar thermal unit, through a process flow path of the solar thermal unit and to a process outlet of the solar thermal unit; wherein the solar thermal unit captures water vapor from the process gas upon flowing therethrough. The method further comprises transitioning from the loading operational mode to a release operational mode; at least partially sealing the process inlet and the process outlet of the solar thermal unit during the release operational mode; and, flowing a working gas, during the release operational mode, to a regeneration inlet of the solar thermal unit, through a regeneration flow path of the solar thermal unit and to a regeneration outlet of the solar thermal unit; wherein the working gas accumulates heat and water vapor from the solar thermal unit upon flowing therethrough. The method further comprises flowing the working gas from the regeneration outlet of the solar thermal unit through the solar thermal unit and a condenser during the release operational mode; and, condensing, via the condenser, water vapor from the working gas to produce liquid water.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Views in the figures are drawn to scale (unless otherwise noted), meaning the sizes of the depicted elements are accurate relative to each other for at least the embodiment in the view.

FIG. 3B illustrates an enlarged portion of a cross-sectional view of a process flow path in a solar thermal unit, according to an embodiment;

FIG. 3C illustrates an enlarged portion of a cross-sectional view of a process flow path in a solar thermal unit, according to an embodiment;

FIG. 3D illustrates an enlarged portion of a cross-sectional view of a process flow path in a solar thermal unit, according to an embodiment;

FIG. 4B illustrates a cross-sectional view of an enlarged portion of a regeneration flow path in a solar thermal unit, according to an embodiment;

FIG. 4C illustrates a cross-sectional view of an enlarged portion of a regeneration flow path in a solar thermal unit, according to an embodiment;

FIG. 4D illustrates a cross-sectional view of an enlarged portion of a regeneration flow path in a solar thermal unit, according to an embodiment;

Figure 1:
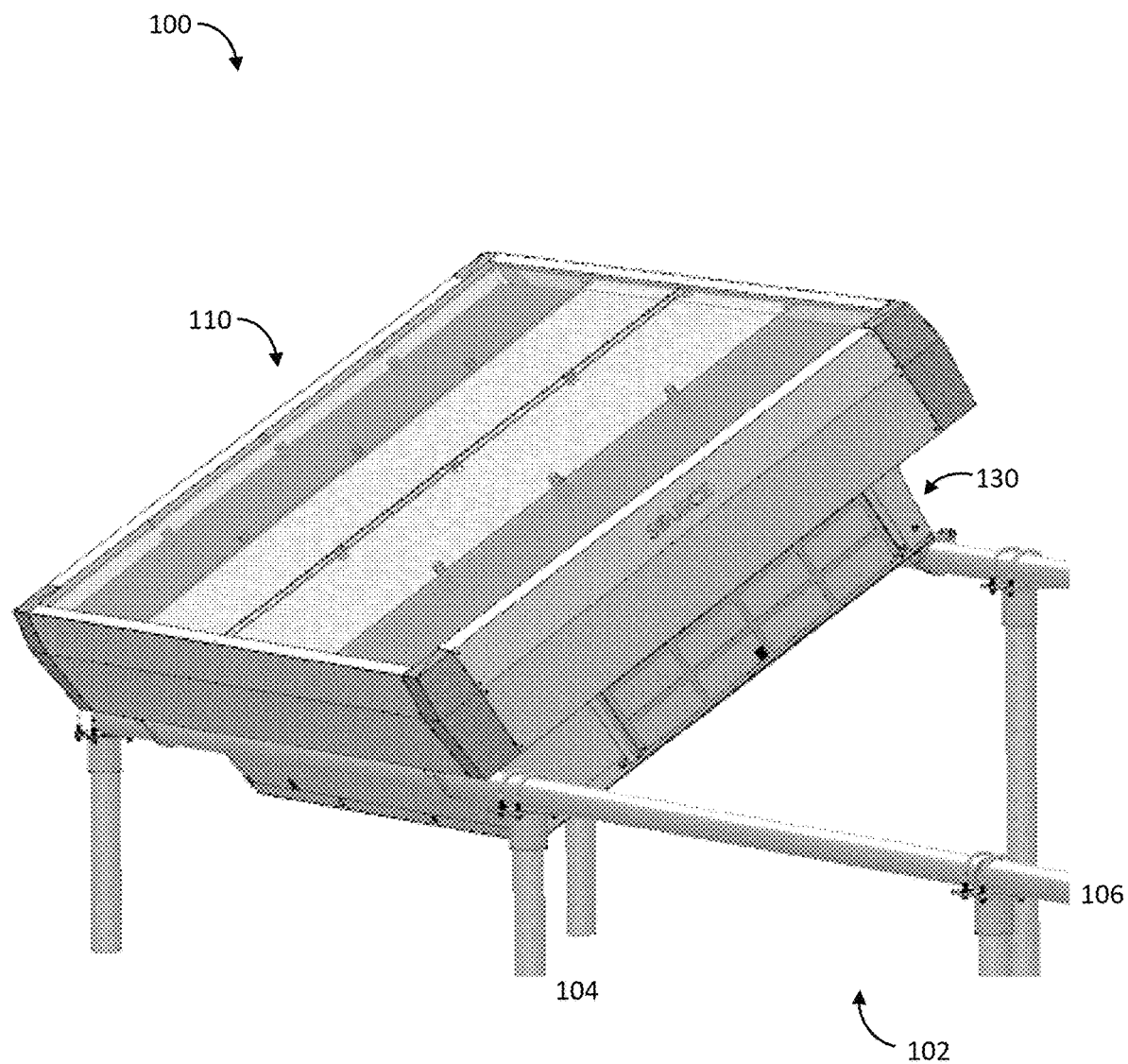
FIG. 1 depicts a water generation system, according to an embodiment.

For simplicity and clarity of illustration, the drawing figures show the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

DESCRIPTION OF ILLUSTRATIVE EMBODIMENTS

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure.

Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Surface shading lines may be used throughout the figures to denote different parts but not necessarily to denote the same or different materials.

This disclosure includes embodiments of systems and methods, such as, for example, for water treatment and storage. The term "coupled" is defined as connected, although not necessarily directly, and not necessarily mechanically. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately" and "about" may be substituted with "within [a percentage] of" what is specified, where the percentage includes 0.1, 1, 5, and 10%. Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements Likewise, a method that "comprises," "has," "includes," or "contains" one or more operations or steps possesses those one or more operations or steps, but is not limited to possessing only those one or more operations or steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. The feature or features of one embodiment may be applied to other embodiments or implementations, even though not described or illustrated, unless expressly prohibited by this disclosure or the nature of the embodiments.

As will be described in detail below, this disclosure describes various systems and methods for efficient water production from a process gas like ambient air. The systems and methods for producing water from ambient air can provide several advantages including high efficiency for water production without external power, simple deployment, quick field installation and a high degree of field serviceability and maintenance. Self-powered and highly efficient water productions systems and methods of their operation will become apparent from the following disclosure. Furthermore, compact, low profile and/or modular devices and methods of their operation to produce liquid water from atmospheric air will become apparent from the following disclosure. Additionally, the systems and methods for producing water from ambient air can provide several advantages including efficient and consistent production of liquid water using durable hygroscopic materials, composites and/or assemblies. Systems of the present disclosure can combine a hygroscopic material, composite and/or assembly design approach with an operational control approach to realize long-term operational stability and efficiencies to produce liquid water from air. In addition, the systems and methods for producing water from ambient air can provide several advantages including high quantities and production rates of liquid water using efficient condenser assemblies and operational methods without the need for external power as will become apparent from the following disclosure.

FIG. 1 depicts a water generation system 100 for generating liquid water from a process gas containing water vapor that can be modular and/or field-serviceable. In various embodiments, the process gas comprises ambient air at atmospheric pressure. System 100 comprises a solar thermal unit 110 configured to absorb solar energy (e.g., from solar insolation during the day) above a lower housing assembly 130. The lower housing assembly 130 can comprise a condenser 144 and in some implementations, a compact, integrated exchanger and condenser unit 140 which will be described in more detail below. For ease of description, water generation assemblies of the present disclosure will be described in relation to an upper solar thermal unit, which can include an upper housing (e.g., 111), and a lower assembly comprising a condenser, which can include a lower housing (e.g., 132, 134). However, it should be appreciated that other configurations are also possible, for example one or more solar thermal units can be coupled, via any desirable number of conduits, to a condenser and/or enthalpy exchanger that may not be physically located below an associated solar thermal unit or within a lower housing or lower housing assembly. In some implementations, it may be preferable to produce a solar thermal unit including an upper housing separately from a lower housing assembly comprising a condenser for ease of manufacture, transportation and/or installation. For example, one or more solar thermal units can be manufactured separately and then coupled or joined with a condenser assembly or lower housing assembly upon packaging or upon installation.

System 100 can be installed or mounted above a ground surface or rooftop via a mounting assembly. In some embodiments, water generation system 100 can be mounted on a tracking assembly (e.g., single axis solar tracker, multi axis solar tracker and the like) configured to track movement of the sun to maximize thermal energy input to the solar thermal unit. In other embodiments, mounting assembly 102 can be configured to position system 100 in a fixed tilted configuration i.e., at a slight angle relative to the ground surface or rooftop, for example toward the southern sky for an installation in the Northern Hemisphere, or toward the northern sky for an installation in the Southern Hemisphere. The descriptive terms used herein such as front, rear, above, below, top, bottom, over, under, etc. are used to aid understanding of the invention are not used in a limiting sense. Furthermore, the directions north, south, east and west may be used herein assuming the installation site is in the Northern Hemisphere, however opposite directions can be used for installations in the Southern Hemisphere without departing from the spirit and scope of the present disclosure.

As depicted in FIG. 1, support assembly 102 comprises a plurality of vertical piers 104 supporting a plurality of horizontal beams 106 at a height above the ground surface. The horizontal beams 106 can extend in a generally horizontal or for example, an east-west axis. In the example shown, the vertical piers 104 on a generally north side have a height greater than those positioned on a generally south side. As such, the front surface of system 100 (i.e. front surface of solar thermal unit 110) is oriented at fixed tilt angle to face a southern direction. The northern edge of lower housing assembly 130 is supported above horizontal beam 106 to facilitate access to panels located on generally north, east and west sides of system 100, thereby enabling field serviceability as will be described in more detail below.

In various embodiments, a solar thermal unit comprises one or more interstitial layers below a top cover layer for collecting solar radiation. In one example, the one or more interstitial layers can comprise an assembly including one or more photovoltaic (PV) panels for converting solar insolation to electrical energy, one or more glazing layers (e.g., transparent layers, glass layers) or a combination thereof. Solar thermal units of the present disclosure convert solar insolation to thermal energy by transferring energy from sunlight to a regeneration fluid, heat absorbing fluid or working fluid that flows through the solar thermal unit. In some embodiments, the solar thermal unit is configured at least partially as a solar photovoltaic unit which converts solar insolation to both electrical and thermal energy. In at least some examples, solar thermal units of the present disclosure may be configured such that the temperature gradient increases along the depth of the solar thermal unit, in the direction that a heat absorbing fluid flows along a regeneration flow path within the solar thermal unit. This may result in heat being substantially extracted and/or directed away from one or more upper layers of the system, such as a glazing layer that has contact with ambient air, keeping such layers relatively cool. A regeneration flow path of the solar thermal unit can be configured to direct a regeneration fluid or working gas to collect heat from a glazing layer, from one or more interstitial layers disposed below and spaced apart from a glazing layer or from a combination thereof.

Figure 2A:
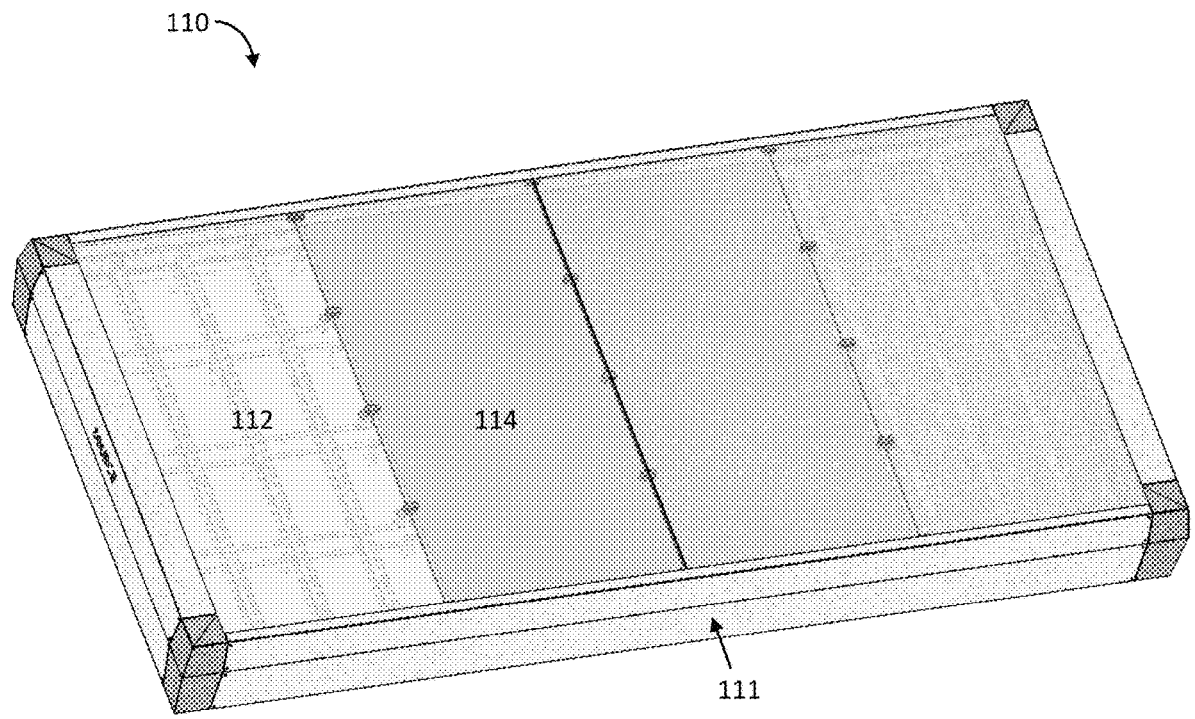
FIG. 2A illustrates a top-down perspective view of a solar thermal unit, according to an embodiment.
Figure 2B:
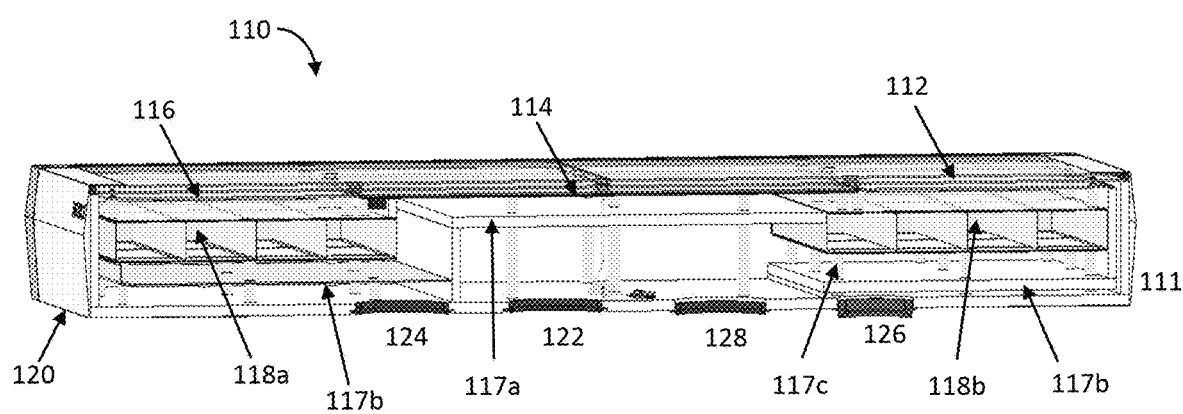
FIG. 2B illustrates a cross-sectional side view of a solar thermal unit, according to an embodiment.
Figure 2C:
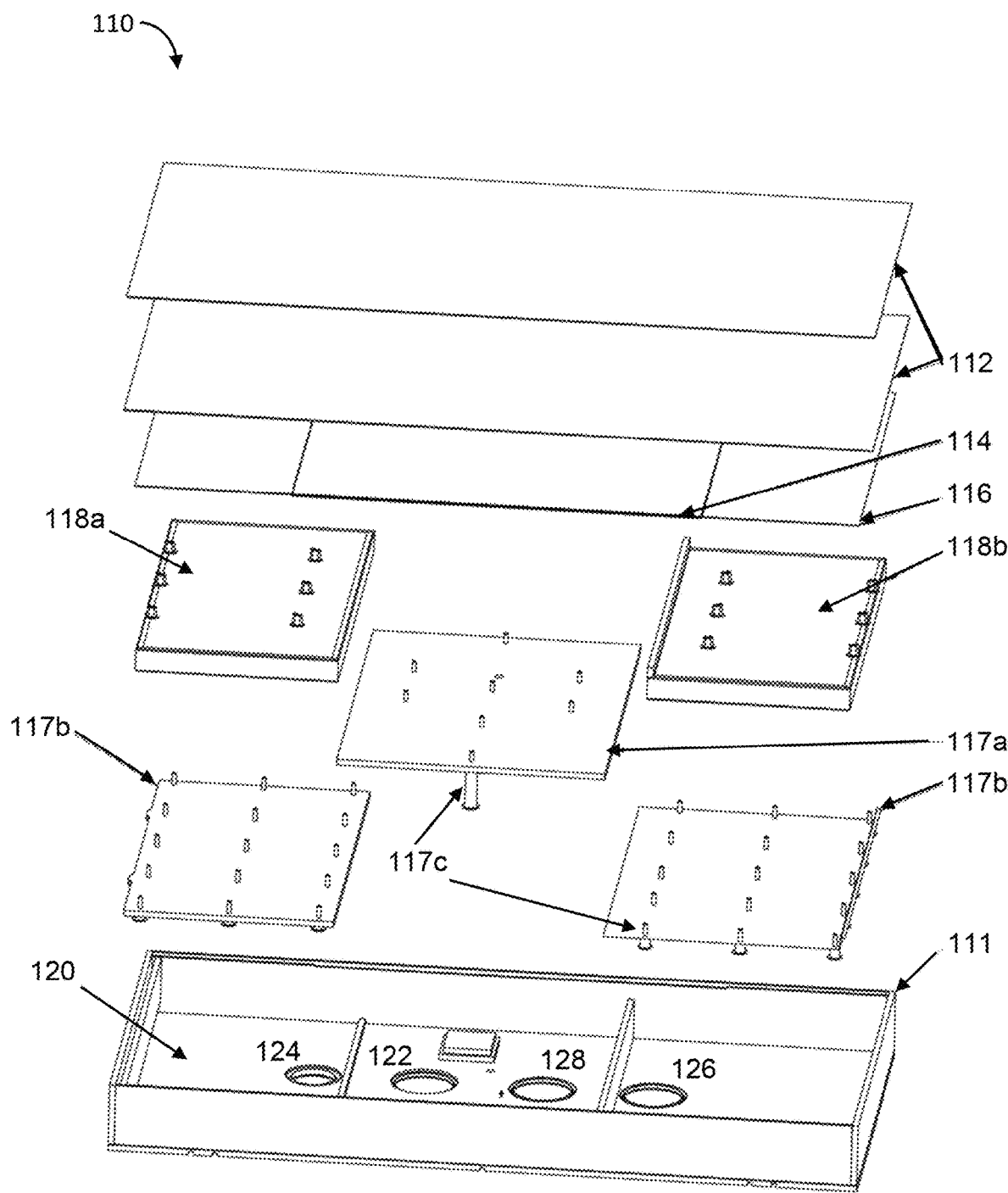
FIG. 2C illustrates an exploded view of a solar thermal unit, according to an embodiment.

FIG. 2A shows a top-down perspective view of solar thermal unit 110, FIG. 2B shows a side cross-sectional view of solar thermal unit 110 and FIG. 2C shows an exploded view of solar thermal unit 110. Solar thermal unit 110 includes a housing 111 (e.g., outer thermally insulated protective housing) and a top cover or top outer surface that includes glazing layer 112 (e.g., one or more glass layers) and a photovoltaic (PV) panel 114 beneath glazing layer(s) 112. In various embodiments, the solar thermal unit comprises one or more interstitial layers, for example interstitial layers 116 below the top surface, cover layer or glazing layers. As depicted, glazing layer 112 includes a top glazing (e.g., glass panel) and a mid-glazing (e.g., glass panel) that are positioned above a PV panel 114 centered at interstitial layer 116. However, in other embodiments, one or more PV panels 114 can be included in a top layer and/or a mid-glazing layer of a solar thermal unit and can be positioned in alternative locations (e.g., along one or more sides or edges of solar thermal unit). The top surface or cover layer, glazing layers and/or interstitial layers of solar thermal unit 110 can include a transparent material (e.g. glass) allowing solar radiation to pass into the interior of solar thermal unit 110, for example through glazing layers 112 and interstitial layer 116.

The interior volume of solar thermal unit 110 can be architected or configured to equilibrate, direct and distribute gases flowing therethrough by using any desirable static or active means, for example, plenum, flow diverters, flow dividers, separators, baffles, flow straighteners, spacers and/or manifolds. For example, plenum 117a, separators 117b and spacers 117c may be configured to define the process and working fluid flow pathways in the solar thermal unit 110 load and/or unloading operational cycles.

In various embodiments, some or all portions of the process gas flow path can be configured to be sized larger relative to the portions of the regeneration flow path in the solar thermal unit. For example, one dimension (e.g., height) of the process flow path can be greater or equal to four times another dimension (e.g. height) of the regeneration flow path in the solar thermal unit. In this non-limiting example, flow between parallel plates is cubic in relation to the height between a top and bottom flow plate. In such embodiments, a greater dimensional height for the process flow path can allow for a higher flow volume with minimal risk of a process flow path crossing to a regeneration flow path, for example during a loading operational mode or cycle.

In some embodiments, interstitial layer(s) (e.g., 116) may promote flow interaction with glazing layers (e.g., 112) and/or photovoltaic (PV) panels (e.g., 114) resulting in increased heat extraction by the working gas. In various embodiments, interstitial layers may be made of the same materials or different materials. In addition to creating thermal energy, some examples of solar thermal units of the present disclosure may also create electrical energy. In such examples, the electrical energy may be created by photovoltaic (PV) modules or panels (e.g., 114) that include one or more photovoltaic cells, which may be positioned at a top cover or surface of solar thermal unit 110. A heat absorbing fluid or working gas entering the upper portion of solar thermal unit 110 may collect heat from the one or more photovoltaic (PV) panels (e.g., 114). Because photovoltaic cells operate more efficiently when they are cooled, the working fluid collecting heat from the one or more photovoltaic (PV) panels may maintain or improve the efficiency of one or more photovoltaic (PV) panels, as well as increasing the amount of heat absorbed by the working fluid. The solar thermal unit 110 depicted in FIG. 2A-2C includes three layers: a top cover layer (e.g. glass), a mid-glazing interstitial layer and an interstitial layer (e.g. a combination of glass layer(s) and solar cell(s)), however other numbers, configurations and compositions of upper layer(s) of the solar thermal unit may be employed without departing from the spirit and scope of this disclosure. For example, in some embodiments, the solar thermal unit can comprise a top cover layer and a single interstitial layer, between which the working fluid can be directed to absorb heat.

In the example of FIG. 2A-C, the solar thermal unit comprises segmented or separate light absorbing material portions or layers 118a, 118b positioned below and spaced apart from the glazing layers 112 and interstitial layers 116. In many embodiments, the absorbing portions or layers 118a and 118b can comprise or be formed of a porous hygroscopic material, body or assembly configured to capture or absorb water vapor from a process gas (e.g. ambient air at atmospheric pressure) flowing therethrough, for example during a loading operational mode or cycle. Furthermore, a regeneration or working fluid can accumulate heat and water vapor upon flowing through the one or more porous hygroscopic layers, bodies or assemblies, for example during a regeneration or release operational mode or cycle. In various embodiments, the solar thermal unit includes one or more interstitial layers between absorber layer(s) (e.g., porous hygroscopic material, body or assembly) and the top cover layer, top surface or glazing layer(s). During a release operational mode or cycle, the working fluid can flow along the one or more interstitial layers in advance of absorbing layer(s) (e.g., one or more porous hygroscopic layers) to collect heat from the one or more interstitial layers and collect water vapor from the one or more absorbing layer(s).

In many embodiments the absorbing portion(s) or layer(s) (e.g., 118) comprise or are formed of a porous hygroscopic layer, material, composite, body or assembly configured to capture and release water vapor and can have various compositions and structures which will be described in more detail below. For ease of description, the following terms will be used to describe hygroscopic or water vapor sorption/desorption portions or layers within the solar thermal unit, unless otherwise noted.

The term "hygroscopic media" or "hygroscopic material" is used herein to describe a functional material involved in absorption/adsorption and desorption of water.

The term "support media" or "support substrate" is used herein to describe a support structure that has a tuned or specified pore distribution to support a deliquescent salt or hygroscopic material, for example such that as the hygroscopic material gains water and transitions to a liquid state, the resulting capillary forces generated by the interaction of the liquid and the pore walls substantially retains the liquid in the pore structure.

The term "hygroscopic composite" or "composite material" is used herein to describe the combination of the support media and the hygroscopic media. The hygroscopic media is supported in and on the surfaces defined by the internal pore structure and external surface geometry of the support media.

The term "hygroscopic composite assembly" or "composite assembly" is used herein to describe the assembly, form, or structure created to hold the "hygroscopic composite" into a functional part that meets the physical criteria of the system including structural properties, pressure drop, flow paths, and thermal properties. The composite assembly can be a loose packed structure of the composite material held within a frame, or it can itself be a composite structure containing the composite material, a binder, and/or structural components that form a rigid self-supporting composite.

In many embodiments, the solar thermal unit 110 is a thermal desiccant unit or thermal hygroscopic unit that includes one or more hygroscopic material, composite, composite assembly, body and/or layer within the housing 111. The hygroscopic material can be configured to capture water vapor from a process gas, for example during a loading operational mode or cycle, and release captured water vapor to a regeneration fluid or "working" fluid during a release operational mode or cycle. In various embodiments, the hygroscopic material can be configured as one or more porous hygroscopic body or layer, for example as a hygroscopic composite including a support substrate. The 'porous' or 'porosity' characterization term used herein can describe a flow-through implementation, as opposed to flow-over or flat plate implementation of a hygroscopic material within a solar thermal or thermal desiccant unit. While flow-over or flat plate implementations could be employed without departing from the scope of this invention, it can be preferable to keep the boundary layers small with a high degree of percolation for example as can be provided in porous flow-through bodies. A porous hygroscopic material, composite, composite assembly or layer can be further configured to absorb thermal energy (e.g. radiative solar thermal energy) and release captured water vapor to a working or regeneration fluid, for example during a release operational mode or cycle. In one example, a hygroscopic material and/or composite can be arranged within a flow distributor (e.g. portions 118a and 118b of FIG. 2B), such as but not limited to a lattice structure, top and bottom rigid porous plates, inter-corrugated fluidic channels, and/or woven and fiber meshes to sustain back pressure and distribute the flow. As will be described in more detail below, a hygroscopic composite can be further configured as a composite assembly such that its structure provides the system with structural properties, pressure drop, flow paths, and/or thermal properties.

In some embodiments, a porous hygroscopic material can be provided as one or more layered structures, a packed bed of hygroscopic particles or beads or a substantially continuous or monolithic structure. Furthermore, a porous hygroscopic material can include one or more light absorbing or light activated hygroscopic materials. In one example, hygroscopic particles may be agglomerated via a binder or dispersed in a high surface area matrix or support medium. The hygroscopic material and/or a support medium (if present) can be selected to minimize reflection of solar radiation and improve absorption and conduction of thermal energy. For example, the hygroscopic material and/or a support medium (if present) can be dark or black in color. In some embodiments, the hygroscopic material can be mixed, combined and/or embedded with materials or structures to efficiently absorb and/or transfer heat. For example, the hygroscopic material can be dispersed around a metallic structure with a thermal conductivity greater than 50 W/mK. In other embodiments, the hygroscopic material is a self-supporting structure housed within the thermal desiccant unit. In one example, a porous hygroscopic material provided within the solar thermal unit is selected to uptake 50-300% of its own mass as water vapor.

Hygroscopic materials, composites, sorption media or desiccants of the present systems can comprise any desirable medium in any desirable configuration (e.g., such that the hygroscopic material, desiccant or sorption medium is capable of adsorption and desorption of water vapor). The following description of hygroscopic materials and sorption mediums is provided only by way of example. In some implementations, the hygroscopic material is capable of sorption at a first temperature, relative humidity and/or pressure and desorption at a second temperature, relative humidity and/or pressure. The hygroscopic material can be provided as a liquid, solid, and/or combinations thereof. The hygroscopic material can be provided as a porous solid impregnated with hygroscopic materials. For example, the hygroscopic material may comprise one or more materials selected from the group consisting of: silica, silica gel, alumina, alumina gel, montmorillonite clay, zeolites, molecular sieves, metal-organic frameworks, activated carbon, metal oxides, lithium salts, calcium salts, potassium salts, sodium salts, magnesium salts, phosphoric salts, organic salts, metal salts, carbon, glycerin, glycols, hydrophilic polymers, polyols, polypropylene fibers, cellulosic fibers, derivatives thereof, and combinations of thereof. In some embodiments, the hygroscopic material can be selected and/or configured to avoid sorption of certain molecules (e.g., those molecules that may be poisonous when consumed by a human). The term "sorption," as used herein, refers to absorption, adsorption or a combination thereof.

In various embodiments, the interior layers and components of solar thermal unit 110 can be configured for or into a split-flow and/or partitioned operational design having two or more fluid flow paths. Solar thermal units of the present disclosure can have a partitioned flow architecture wherein one or more separators and/or flow directing elements define at least partially separate or different flow paths, for example a process flow path and a regeneration flow path. Furthermore, solar thermal units of the present disclosure can have a split or divided flow architecture wherein one or more separators and/or flow directing elements split or divide the flow along a process flow path or a regeneration flow path, for example to reduce pressure drop through the water generation system. As depicted in FIG. 2B-2C, solar thermal unit 110 comprises a process inlet port 122 for inputting, during a loading operational mode, a process gas (e.g., ambient air) and a process outlet port 124 for outputting the process gas (e.g., ambient air) arranged along a rear plane 120 of outer protective housing 111 of solar thermal unit 110. Furthermore, solar thermal unit 110 comprises a regeneration inlet port 126 for inputting, during a release operational mode, a regeneration fluid or "working" gas and a regeneration outlet port 128 for outputting the regeneration fluid or working gas arranged along a rear plane 120 of solar thermal unit 110.

As described in more detail below, various systems for generating liquid water from a process gas (e.g., ambient air) comprise a solar thermal unit including one or more hygroscopic bodies, layers or assemblies. A hygroscopic body, layer or assembly is configured to capture water vapor from a process gas flowing in a process flow path through the hygroscopic body, layer or assembly during a loading cycle. Additionally, the hygroscopic body, layer or assembly is configured to absorb thermal energy (e.g. via radiative solar insolation, thermal conduction and/or regeneration gas convection) and release water vapor to a regeneration or working fluid flowing in a regeneration flow path through the hygroscopic body, layer or assembly during an unloading or release cycle. Various systems for generating liquid water from a process gas further comprise a condenser for condensing water vapor to produce liquid water from the regeneration or working fluid flowing in the regeneration flow path after flowing through the solar thermal unit.

Figure 3A:
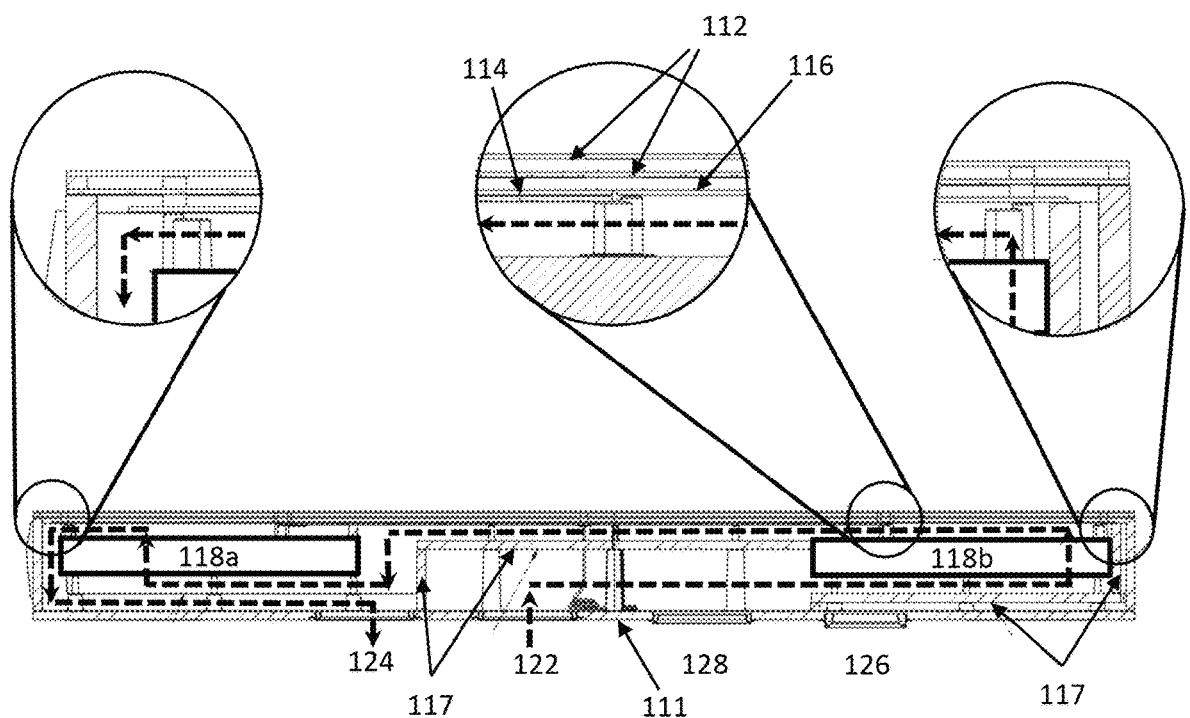
FIG. 3A illustrates a cross-sectional view of a process flow path in a solar thermal unit, according to an embodiment.
Figure 4A:
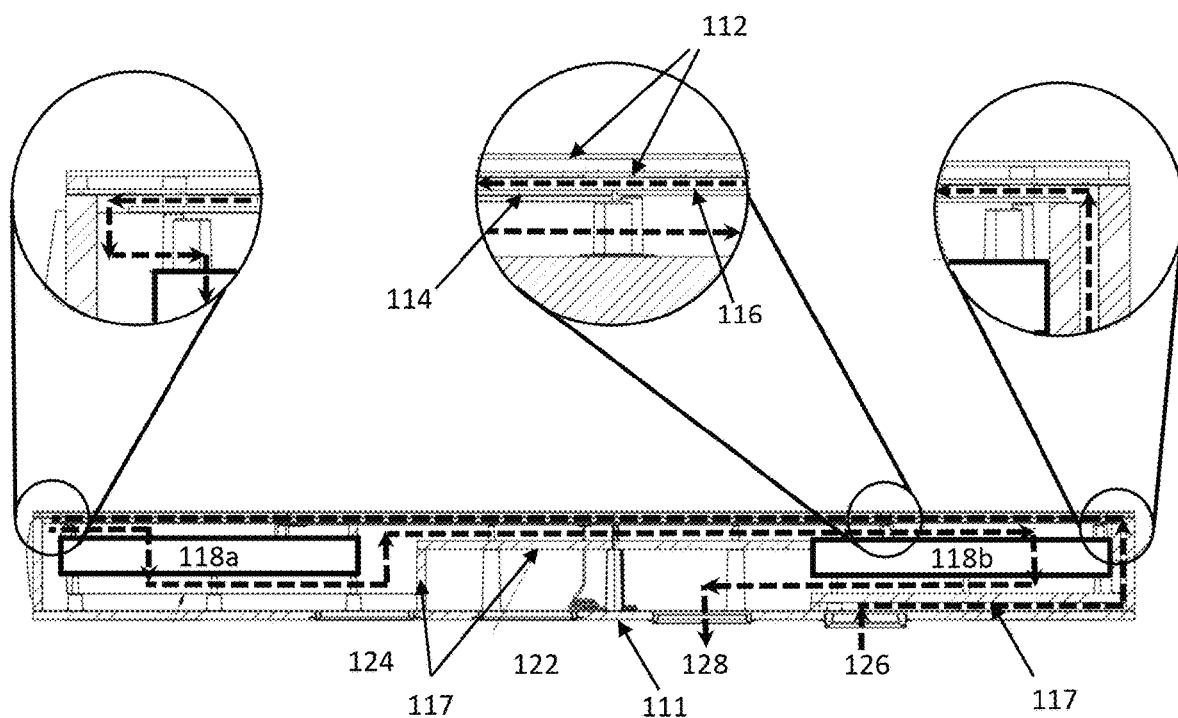
FIG. 4A illustrates a cross-sectional view of a regeneration flow path in a solar thermal unit, according to an embodiment.

FIGS. 3A-D and FIGS. 4A-D depict a solar thermal unit 110 (e.g., solar desiccant unit) comprising a flow architecture including two fluid flow paths wherein fluid flow is directed in series through distinct, split, or partitioned light absorbing portions (e.g., hygroscopic composite assemblies 118a and 118b). In particular, FIGS. 3B, 3C and 3D depict enlarged portions of a cross-sectional view of a process flow path (indicated by dashed lines) depicted in FIG. 3A. FIGS. 4B, 4C and 4D depict enlarged portions of a cross-sectional view of a regeneration flow path depicted in FIG. 4A.

FIG. 3A-D depict a process flow path (indicated by dashed lines) wherein a process gas, for example ambient air, flows into solar thermal unit 110 via process inlet port 122, through the interior of solar thermal unit 110 and exits via the process outlet port 124, for example during a loading operational mode or cycle. The process flow path can first direct process gas through a hygroscopic material (e.g., composite assembly 118b, along an intermediate flow segment below interstitial layer 116 and then through hygroscopic composite assemblies 118a and 118b). During a loading mode or cycle, hygroscopic composite assemblies 118a and 118b can load, uptake or capture water vapor from the process gas upon flowing therethrough.

FIG. 4A-D depict a regeneration flow path (indicated by dashed lines) wherein a regeneration fluid or working gas flows into solar thermal unit 110 via regeneration inlet port 126, through the interior of solar thermal unit 110, and exits via the regeneration outlet port 128 during a release operational mode or cycle. As depicted, a plurality of separators or flow-directing elements 117 define regeneration flow path (dashed line of FIG. 4A-D) that first directs a regeneration or working gas to a top segment or upper portion of the solar thermal unit, for example between mid-glazing layer 112 and PV panel 114 of interstitial layer 116, to collect heat and then through the hygroscopic layers or composite assemblies 118a and 118b to collect additional heat and/or water vapor. This may result in heat being substantially extracted or directed away from upper layers of the system, such as glazing layer(s) 112, keeping such layers relatively cool. In contrast, conventional solar thermal units tend to have an outer surface that is very hot. In some embodiments, one or more heating elements can be incorporated into the glazing layer 112 and/or interstitial layer 116, and for example can be activated, via a system controller, based on an ambient condition (e.g., if solar irradiance or insolation is below a predetermined threshold), a system operational condition (e.g., if regeneration fluid temperature or system water content is below a predetermined threshold) and/or the like. The configuration of the solar thermal unit may also result in heat from the solar insolation being directed to and retained in the most insulated areas of the unit, reducing radiative losses from the unit. Furthermore, the regeneration fluid may collect heat from the PV panel 114 from a top surface and then a bottom surface of the PV panel 114 as depicted in FIG. 4C. Because photovoltaic cells operate more efficiently when they are cooled, the regeneration fluid collecting heat from the PV panel 114 may maintain or improve the efficiency of the PV panel 114, as well as increasing the amount heat absorbed by the regeneration fluid. The front and/or rear sides of the PV panel may be modified to promote flow interaction with the panel to enhance cooling of the panel. Additionally, the cell layout and wiring of the panel may be configured to maximize the panels performance considering temperature gradients across the panel.

Water generation systems of the present disclosure can be operated between a water uptake or loading mode and a water release or unloading mode, for example according to a diurnal cycle (i.e. loading mode during nighttime hours and release mode during daytime hours) so as to produce water with the efficient use of solar energy without external power. The transition between the loading and release mode can be facilitated by passive operation or active operation, for example by closing and opening process ports 122 and 124 of solar thermal unit 110 which are in communication with external ambient air. During the release mode, a working gas flows in a closed-loop regeneration flow path between the solar thermal unit 110 and the lower housing assembly 130. The solar thermal unit 110 can have various flow structuring features (e.g. turns, bends or obstructions) which can improve a heat transfer coefficient from the glazing layers, PV panels if present, and heat and mass transfer coefficients from the porous hygroscopic absorber(s) or layer(s). However, flow directing features and layers of the system can also produce a backpressure resistance or force opposing the desired flow of working fluid in the regeneration flow path. Process ports 122 and 124 can be sealed during a regeneration mode in an efficient manner so as to maintain a closed-loop regeneration path for the working fluid.

As depicted in FIG. 4A-D, the working fluid flows in regeneration flow path (depicted by dashed arrows) from inlet port 126 to an upper portion of solar thermal unit 110 (e.g., between mid-glazing layer 112 and interstitial layer 116) to collect heat, and then is directed, via baffles, diverters or static separators, to lower layers (e.g. segmented or porous absorber layers 118a and 118b) to collect heat, and water vapor in embodiments comprising hygroscopic materials, composites or composite assemblies before exiting the solar thermal unit 110 via outlet port 128. In this way, the working fluid efficiently transports absorbed solar heat from the upper portion of the solar thermal unit 110 and transports the absorbed heat through hygroscopic portions 118, 118b in a generally top-down flow path in which solar heat absorbed from a top portion of the solar thermal unit 110 is transferred down to hygroscopic material in portions 118a, 118b.

In the example depicted in FIGS. 2B-C, 3A-D and FIGS. 4A-D, the regeneration inlet port 126, the regeneration outlet port 128, the process inlet port 122 and the process outlet port 124 are positioned at a rear plane 120 of the solar thermal unit 110 interfacing with and configured to be coupled to the lower housing assembly 130. Furthermore, the ports are substantially aligned along a horizontal or rear centerline of the rear plane 120 of the solar thermal unit 110, which may be preferable for a compact and field-serviceable water generation system 100, however other configurations enabling compact or low profile form factors are also possible.

The solar thermal unit 110 depicts a plurality of baffles, flow diverters or flow-directing elements 117 to define the process and working fluid flow pathways in the solar thermal unit 110 for both load and release operations. Various flow approaches can be employed including flow-through hygroscopic body implementations, flow-over or flat plate implementations of the hygroscopic material, as well as their combinations or derivatives. In addition, the hygroscopic material can be configured in various ways relative to the flow directing means, structures or distributors, for example but not limited to lattice structures, rigid porous plates, inter-corrugated fluidic channels, and/or woven and fiber meshes to sustain back pressure and distribute the flow.

In embodiments where the solar thermal unit comprises hygroscopic material (e.g. at 118a, 118b), a split-flow or segmented architecture can improve interaction or water transfer between the working fluid and the hygroscopic material in the solar thermal unit while also allowing for flow through the top glazing layers for heat scavenging.

Furthermore, the flow architecture of the solar thermal unit can be configured to improve interaction of the process fluid with the hygroscopic material via serial exposure of the subdivided areas (e.g. 118a, 118b). The flow-directing elements 117 depicted in FIGS. 3A-D and 4A-D define two fluid flow paths (i.e., process and regeneration flow paths), however any desirable number and configuration of separators or other flow directing structures or devices can be employed to improve interaction of the process or regeneration gas with the hygroscopic material at a high process or regeneration gas flux. For example, various configurations of the solar thermal unit or thermal desiccant unit can be provided to maintain a process gas flux through the hygroscopic absorber preferably greater than 50 cubic feet per minute (CFM)/m$^2$, greater than 100 CFM/m$^2$, greater than 200 CFM/m$^2$, greater than 300 CFM/m$^2$ or greater than 400 CFM/m$^2$. Furthermore, hygroscopic materials, composites, or composite assemblies in the solar thermal unit can be configured around and/or within flow separators, distributors, sectioned layers or segments according to favored flow paths for both loading (i.e. water uptake) and regeneration (i.e. water release) operations, thereby maximizing water generation or production.

In the example depicted in FIG. 2B, the regeneration inlet port 126, the regeneration outlet port 128, the process inlet port 122 and the process outlet port 124 are positioned at a rear plane 120 of the solar thermal unit 110 interfacing with and configured to be coupled to the lower housing assembly 130. Furthermore, the ports are substantially aligned along a horizontal or rear centerline of the rear plane 120 of the solar thermal unit 110, which can be preferable for a compact and field-serviceable water generation system 100.

In the example depicted in FIG. 2B-C, four ports (i.e. ports 122, 124, 126, 128) are present to direct fluid through a process flow path and a regeneration flow path, however other embodiments may employ different numbers or configurations of ports, for example in association with any desirable valving or fluid routing devices to manage flow into and out of a solar thermal unit. To minimize complexity, maintenance, leakage and/or cost, fewer or simplified fans, blowers, actuators and other fluidic routing devices can also be employed in the solar thermal unit.

The solar thermal unit 110 includes a plurality of flow-directing elements 117 to define the process and working fluid flow pathways in the solar thermal unit 110 for uptake or loading operation and unloading and/or release operation. Various flow approaches can be employed including flow-through hygroscopic body or layer implementations, flow-over or flat plate implementations of the hygroscopic material, as well as their combinations or derivatives. In addition, the hygroscopic materials, composites and/or composite assemblies can be configured in various ways relative to the flow directing means, structures or distributors, for example but not limited to lattice structures, rigid porous plates, inter-corrugated fluidic channels, and/or woven and fiber meshes to sustain back pressure and distribute the flow. Various examples of hygroscopic absorber configurations will be described in more detail below.

Figure 5:
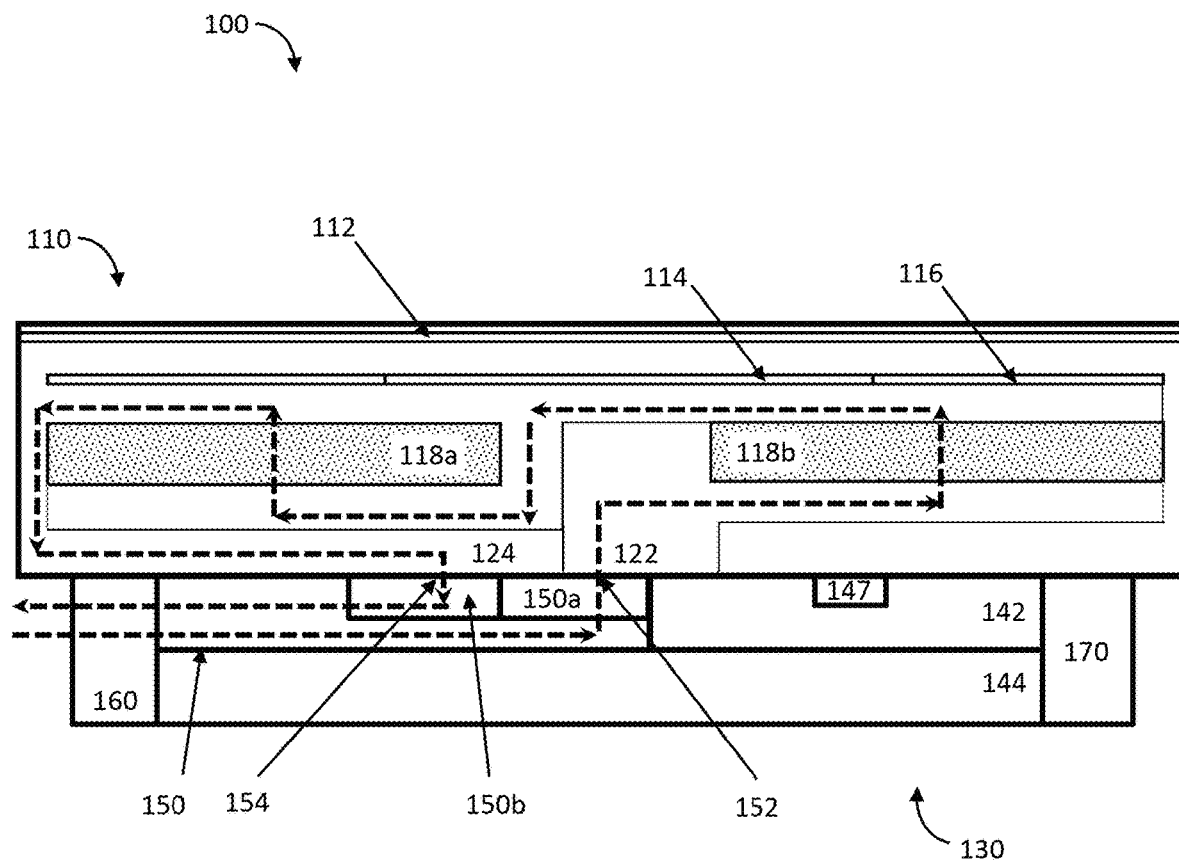
FIG. 5 illustrates a block diagram of a water generation system including a process flow path during an uptake or loading operational cycle, according to an embodiment.
Figure 16A:
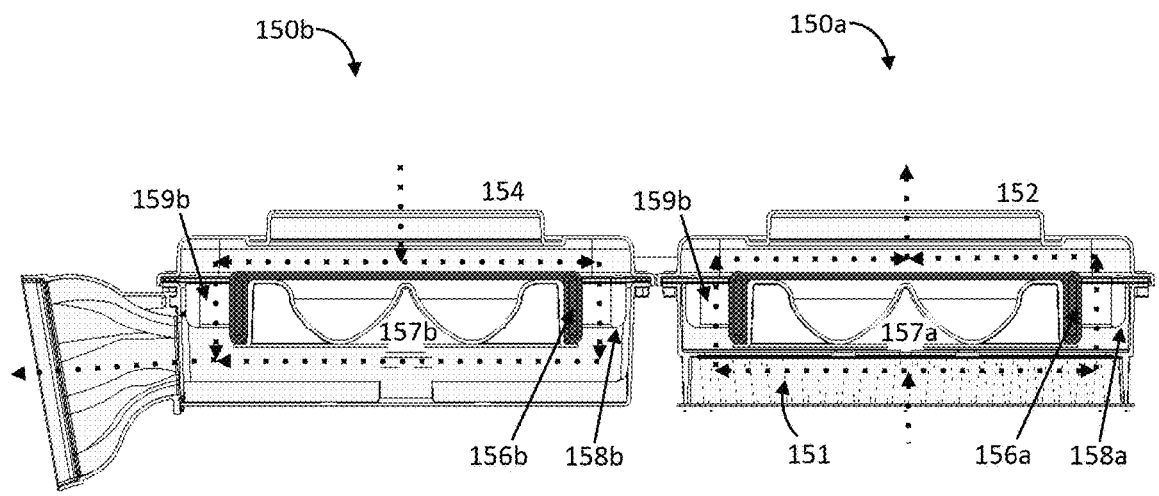
FIG. 16A depicts a cross-sectional side view of valve units according to an embodiment.
Figure 16B:
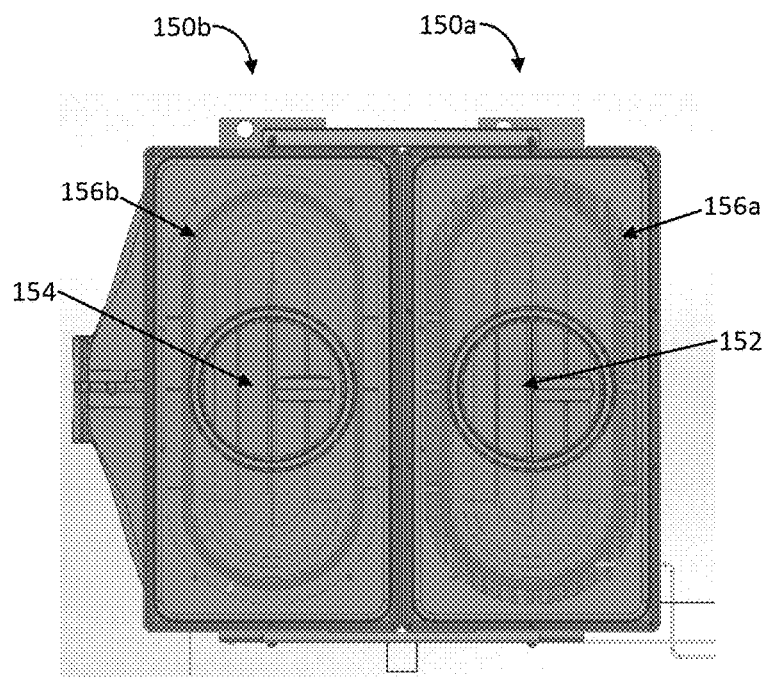
FIG. 16B depicts a top-down view of valve units, according to an embodiment.
Figure 16C:
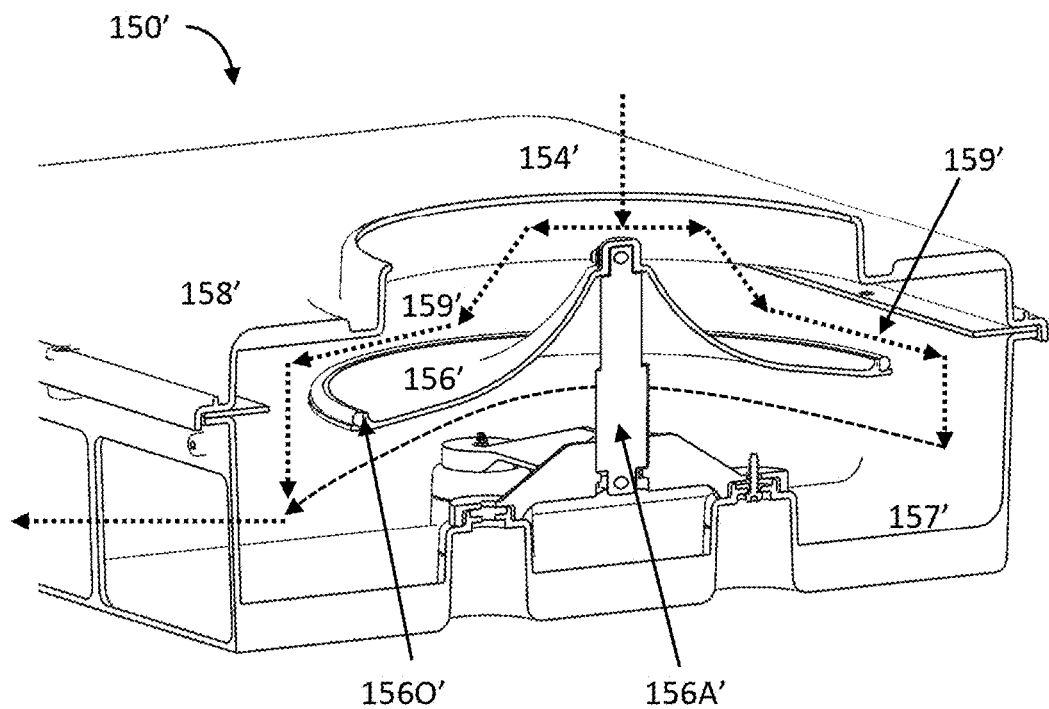
FIG. 16C depicts a perspective side cross-sectional view of a valve unit, according to an embodiment.
Figure 16D:
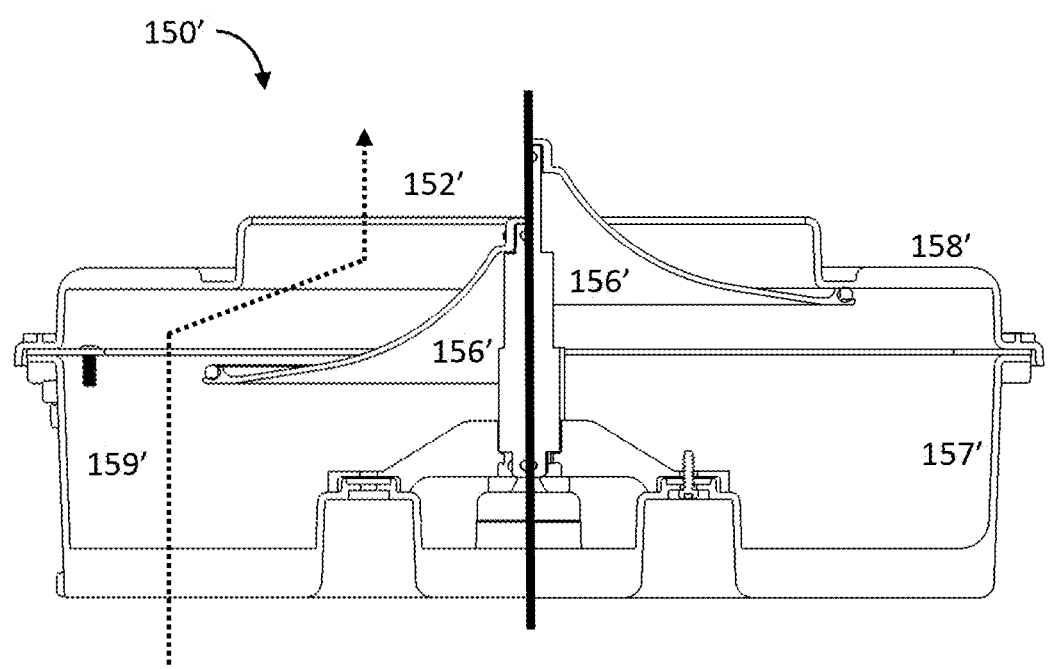
FIG. 16D a side cross-sectional view of a valve unit, according to an embodiment.

FIG. 5 illustrates a block diagram of a water generation system 100 including solar thermal unit 110 and lower housing assembly 130 during an uptake or loading operational cycle. As depicted in FIG. 5, a process flow path (indicated by dashed lines) can direct ambient air into valve unit 150 via fan assembly 160. Process gas, for example ambient air, from outside system 100 can be transported into system 100, for example via fan assembly 160. In various embodiments, one or more filters can be provided to filter process gas (e.g., remove contaminants like dust and the like from ambient air) in advance of inputting into valve unit (e.g., 150) or solar thermal unit (e.g., 110) For example, a porous filter layer can be included as part of the valve unit 150 (e.g., filter layer 151 at inlet of valve unit 150*a*) and/or fan assembly 160. During a loading operational mode, ambient air can enter process inlet port 122 (e.g., via inflatable valve member 156*a* as depicted in FIGS. 16A and 16B is in a deflated state or valve member 156' as depicted in FIGS. 16C and 16D is positioned or actuated so as to provide an open and/or annular passage for ambient air to pass through valve unit 150*a*). Upon entering process inlet port 122, process gas can be transported through solar thermal unit 110 along a process flow path (e.g., process flow path indicated by dashed lines in FIG. 5). Upon exiting solar thermal unit 110 at outlet 124, process gas is directed into valve unit 150 (e.g., via valve unit 150*b* via valve inlet 154 wherein an inflatable valve member 156*b* in a deflated state or repositioned or actuated valve member 156' provides an open and/or annular passage for process gas to pass through valve unit 150*b*) and exit system 100, for example via another passage of fan assembly 160 or another system exhaust.

FIG. 5 depicts a valve unit 150 comprising inflatable valve units or components 150*a* and 150*b*, however any desirable number or type of valves, separately or in combination, can be used to manage flow through process inlet port 122 and process outlet port 124, for example to passively or actively seal closed during a regeneration or unloading cycle. Furthermore, system 100 can include one or more valves or mechanisms for flow bypass and/or alternative fluid passageway configurations, as well as to provide a system-wide or total ingress protection mode wherein the lower housing assembly 130 and/or the solar thermal unit 110 are partially or fully sealed from the outside environment, for example in response to a severe weather event forecast. The system can include valves operating under any number of mechanisms including but not limited to an inflatable valve, an iris valve, a butterfly valve, a poppet valve, an actuated valve, a passive or active flow directing or restricting valve members and/or the like.

Figure 6A:
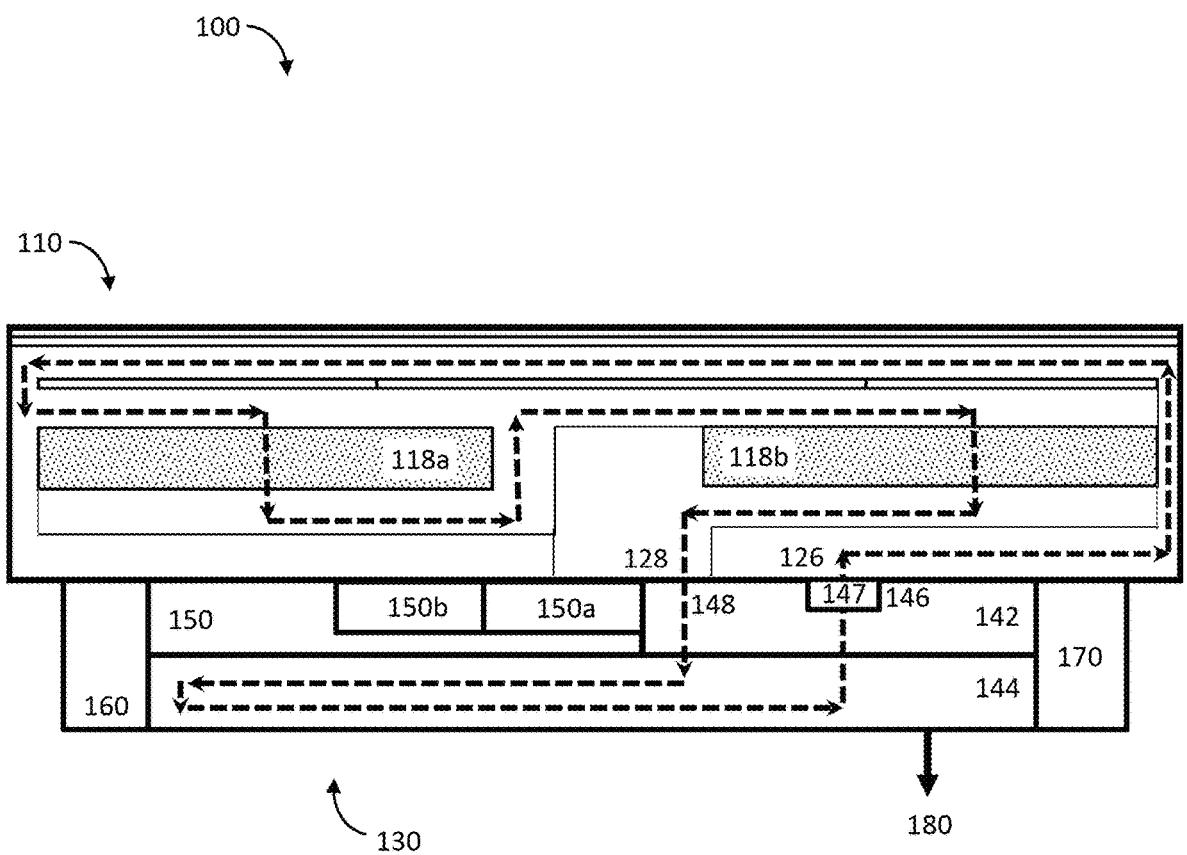
FIG. 6A illustrates a block diagram of a water generation system including a regeneration flow path during a release or unloading operational cycle, according to an embodiment.

FIG. 6A illustrates a block diagram of a water generation system 100 including solar thermal unit 110 and lower assembly 130 during an unloading or release operational cycle. As depicted in FIG. 6A, a regeneration flow path (depicted in dashed lines) can be substantially closed-loop and can include multiple flow segments through system 100 including: a regeneration flow path segment within solar thermal unit 110 (e.g., as depicted in FIGS. 4A-D and FIG. 6A); a regeneration flow path segment (e.g., indicated by downward dashed arrow in FIG. 6A) from the solar thermal unit 110 to an enthalpy or energy exchanger 142 in advance of a condenser 144; a regeneration flow path segment within the condenser 144 (e.g., indicated by dashed arrow in condenser 144 of FIG. 6A); and a regeneration flow path segment (e.g., indicated by upward dashed arrow in FIG. 6A) from the condenser 144 to the solar thermal unit 110 via the energy exchanger 142. During the unloading or regeneration operational mode, condenser 144 can include a liquid water production outlet 180 configured to output liquid water condensed by condenser 144.

System 100 can include one or more blowers or fans (e.g., removable fan cartridge 147) to increase or adjust the flow rate of the working fluid in the closed-loop regeneration flow pathway through the solar thermal unit 110 and the lower assembly 130. During an unloading or release cycle, the working fluid can accumulate both heat and water vapor upon flowing through solar thermal unit 110 and efficiently release the accumulated water vapor upon flowing through lower assembly 130.

In some embodiments, enthalpy or energy exchanger 142 and condenser 144 can be integrated or integrally formed, such that at least some structural components are formed or molded together, for example during the same manufacturing and/or assembly operation to form an integrated exchanger and condenser unit (e.g., 140). In embodiments where at least a portion of the exchanger and condenser components are integrally formed, one or more benefits and advantages can be provided. For example, an integrated structure can provide a low profile or compact system. In some arrangements, integration of the exchanger component with the condenser component can reduce the overall thickness of the lower housing assembly (e.g., via a recessed rotary desiccant wheel exchanger component seated in a portion of the condenser component). In addition, an integrated assembly can provide easy access to components of the lower housing assembly that may need to be serviced, replaced or maintained in the field. Furthermore, such integrated configurations can help reduce the number of portions or components of the lower housing assembly and simplify the manufacture, maintenance, complexity and/or other aspects associated with making and using the lower housing assembly. However, alternative implementations may not include an exchanger component, for example be deployed as a condenser coupled to a solar thermal unit.

The energy exchanger 142 can be a passive sensible heat transfer unit or component (e.g. a heat exchanger like a plate heat exchanger, cross flow heat exchanger, shell and tube heat exchanger, tube in tube heat exchanger and/or the like), a passive latent heat transfer unit or component (e.g. vapor transfer membrane), a passive total heat (i.e. sensible and latent heat) transfer unit or component (e.g. rotary desiccant wheel), or an active heat transfer unit or component (refrigeration unit, vapor compression cycling unit). In some implementations, both heat (i.e. sensible) energy and moisture (i.e. latent) energy is exchanged by the energy exchanger 142. In other implementations, only sensible heat is exchanged, for example with a conventional heat exchanger. Sensible heat can be transferred in the form of a temperature difference between one or more regeneration flow path segments via the energy exchanger 142. Latent heat can be transferred in the form of a moisture difference between different regeneration flow path segments via the energy exchanger 142. In some implementations, the energy exchanger 142 can comprise a plurality of sub-units or sub-components, for example a separate heat exchange sub-unit or sub-component and a moisture exchange sub-unit or sub-component.

In several embodiments, the exchanger component or energy exchanger 142 can be configured to transfer energy (e.g., sensible energy, latent energy, or a combination thereof) between working gas exiting solar thermal unit (e.g., via 128) in advance of condenser 144 and working gas exiting condenser 144 in advance of input to solar thermal unit 110 (e.g., via 126) in a closed loop regeneration flow path. The energy exchanger 142 can be configured such that energy transfer occurs between the working fluid after uptake of water vapor by in the solar thermal unit 110 and the working fluid after condensation of water in the condenser 144. As an example, the energy exchanger 142 can be configured to transfer heat from the working fluid exiting solar thermal unit 110 (e.g., via 128) to the working fluid exiting condenser 144 such that the temperature of the working fluid is reduced prior to entering the condenser 144 and/or the temperature of the working fluid increases prior to entering solar thermal unit 110. As another example, the energy exchanger 142 can be configured to transfer water vapor from the working fluid exiting the condenser 144 to the working fluid exiting the solar thermal unit 110 (e.g., via 128) such that water vapor is retained within or directed towards the lower assembly 130 rather than being transported towards or return to solar thermal unit 110.

In various embodiments, an exchanger component, enthalpy exchanger or energy exchanger (e.g., 142) is operatively coupled between a solar thermal unit (e.g., 110) and condenser (e.g., 144) so as to transfer energy between working fluid flowing between the solar thermal unit and the condenser unit. In various embodiments, an exchanger component transfers enthalpy, heat and/or moisture between the working fluid output from the solar thermal unit and the working fluid output from the condenser during an unloading cycle. For example, the exchanger component can transfer latent heat or moisture from the working fluid output from the condenser in advance of the solar thermal unit to the working fluid output from the solar thermal unit in advance of the condenser. As another example, the exchanger component can transfer sensible heat from the working fluid output from the solar thermal unit in advance of the condenser to working fluid output from the condenser in advance of the solar thermal unit.

In various embodiments, the exchanger component transfers enthalpy via an active enthalpy exchange mechanism, for example a rotary desiccant unit. In embodiments where the exchanger component comprises a rotary desiccant, the hygroscopic material in the solar thermal unit can be selected to have a higher water sorption capacity than the hygroscopic material of the rotary desiccant unit. Alternatively, or in addition, the hygroscopic material in the solar thermal unit can be selected to have a lower water sorption and/or desorption rate than the hygroscopic material in the rotary desiccant unit. For example, the hygroscopic material in the solar thermal unit can include a deliquescent salt that could provide a higher water sorption capacity than an oxide, clay or molecular sieve-based hygroscopic material of the rotary desiccant unit. As another example, the hygroscopic material in the rotary desiccant unit can include an oxide, clay or molecular sieve-based material that can provide a higher water sorption/desorption rate than a deliquescent salt in the hygroscopic material in the solar thermal unit. As yet another example, the hygroscopic material of the rotary desiccant unit can be selected to have a lower density than the hygroscopic material in the solar thermal unit.

In some embodiments, the lower housing assembly comprises a water tank or storage reservoir for receiving produced liquid water from the condenser 144 and including a dispensing outlet (e.g., outlet 180), for example located along a south panel of lower housing assembly (storage tank and dispenser outlet not shown for clarity). In some embodiments, the condenser 144 comprises a lower reservoir for storing at least a portion of liquid water produced by the system. Dispensed water can be similar to "mineral water" i.e., purified water with additive minerals. In various embodiments, system 100 comprises additional peripheral components to facilitate self-sufficient, compact and/or self-contained deployment including but not limited to onboard energy generation and/or energy storage systems, water treatment or mineralization units and/or the like.

System 100 includes a controller 170 configured to control system 100 to maintain a net flux of water vapor from the solar thermal unit 110 to the condenser 144 or in some implementations, integrated exchanger and condenser unit 140 so as to maximize the production of liquid water. Controller 170 can maximize the production of liquid water at the condenser 144 by optimizing or adjusting the exchange rate of the exchanger component 142 (e.g., rate of rotation for a rotary desiccant, rate of enthalpy or heat transfer for a rotary desiccant or passive enthalpic exchange mechanism), the flow rate of the working or regeneration fluid in the working or regeneration fluid pathway (e.g., via removable fan cartridge 147) or a combination thereof. The control system can dynamically maximize the production of liquid water over the diurnal cycle based on current or forecast ambient conditions (e.g., solar insolation or solar irradiance, ambient temperature, ambient humidity), current or forecast system properties (e.g., working fluid temperature, working fluid humidity, water content of hygroscopic materials of the system, battery electrical charge status (e.g., battery 166)). The control system can use a set of sensors (including but not limited to temperature sensors, moisture sensors, current sensors, Hall Effect sensors, anemometry and/or manometry, an onboard deterministic and/or machine learning algorithm, information regarding the thermodynamics of water vapor, information regarding the properties of the hygroscopic materials, information regarding the amount of liquid water produced, information regarding the amount of water vapor retained by the thermal desiccant unit, and/or other factors that can be synthesized in the controller to improve, maximize and/or optimize water production at the condenser.

Various approaches can be employed to control or maximize the production of water by system 100 by driving the water vapor captured by a hygroscopic material in the solar thermal unit 110 during the loading mode towards vapor pressure saturation in the working fluid during the regeneration or release mode. For example, the energy exchange rate of the energy exchanger 142 can be varied based on an ambient solar flux or irradiance, an ambient temperature, an ambient relative humidity, a temperature and/or relative humidity of the working fluid (at any respective node in the system), an amount of water present in hygroscopic material in the solar thermal unit 110, an elapsed time, an electrical charge accumulated in the battery (e.g., battery 166), a user input and so on. Controller 170 can operate the system 100 based on one or more of: a user selection, data received from one or more sensors, forecast conditions, programmatic control, and/or by any other desirable bases. Controller 170 can be associated with peripheral devices (including sensors) for sensing data information, data collection components for storing data information, and/or communication components for communicating data information relating to the operation of the system. Inputs to controller 170 may be measured in that they are indicated in data captured by one or more sensors. In one example, the controller 170 can set process gas flow rates, working fluid flow or circulation rates, enthalpy exchange rates (e.g., rotation rate of rotary desiccant), transitions between load and release times based on a look up table of parameters stored onboard the controller. In yet another example, the controller can self-adjust process gas flow rates, energy exchange rates, load/release transition times and monitor water production signals in an effort to self-teach or learn optimum setpoints.

Controller 170 can be programmed or configured to improve, maximize or optimize liquid water production based on measurements of one or more inputs (e.g., such that controller 170 may improve liquid water production based on current or expected environmental and system conditions) including but not limited to external conditions like ambient air temperature, ambient pressure, ambient air relative humidity, solar insolation, solar irradiance, solar flux, weather forecast, time of day, and so on. Furthermore, controller 170 can be programmed or configured to improve liquid water production based on inputs relating to system operational parameters like working fluid temperature, working fluid pressure, working fluid relative humidity, working fluid water vapor partial pressure, condenser discharge temperature, liquid water production rate, liquid water production volume, liquid water usage rate, liquid water quality, valve sealing pressure and so on.

During a loading mode or cycle, the flow rate of the process gas (e.g., ambient air) into solar thermal unit 110 can be varied by controller 170 in wired or wireless communication with fan 162a to adjust the flow rate of the process gas during the loading mode. During a release mode, the flow rate of the working fluid can be varied by controller 170 in wired or wireless communication with fan 147 based on ambient solar irradiance, ambient temperature, ambient relative humidity, temperature of the working fluid, relative humidity of the working fluid, amount of water present in the hygroscopic material of the solar thermal unit 110, an elapsed time, or a combination thereof. For example, the controller can activate parts of fan assembly 160 depending on the operational mode including flowing ambient air to the first valve unit 150a via fan 162a during a loading mode and flowing ambient air across a heat dissipating portion of the energy exchanger 142 and/or condenser 144 via fans 162b-c during a release operational mode. In addition, the controller 170 can activate fans 162b-c to flow ambient air across a heat dissipating portion of the energy exchanger 142 and/or condenser 144 during the release mode.

During a release mode, the energy exchange rate at the energy exchanger 142 can be varied by controller 170 in wired or wireless communication with energy exchanger 142 based on input variables of based on ambient solar irradiance, ambient temperature, ambient relative humidity, temperature of the working fluid, relative humidity of the working fluid, amount of water present in the hygroscopic material of the solar thermal unit 110, an elapsed time, or a combination thereof. In one particular implementation in which the energy exchanger 142 is a rotary desiccant wheel, the energy exchange rate can be varied by varying the rotation rate of the rotary desiccant wheel.

System 100 can comprise a telematics unit (e.g., a transmitter, receiver, transponder, transverter, repeater, transceiver, and/or the like) to communicate operational parameters and/or data to and/or from system 100 (e.g., via controller 170) through a wired and/or wireless interface. In on example, wireless communications can conform to standardized communications protocols, such as, for example, GSM, SMS components operating at relatively low rates (e.g., operating every few minutes), protocols that may be geographically specified, and/or the like).

System 100 can comprise indicators (e.g., lights, such as, for example, LEDs), which may be configured to provide information regarding system operation. For example, in some embodiments, indicator lights may be configured to provide information (e.g., visually, for example, to a user) that the system is running, that solar power or energy is available, that maintenance is recommended, or a component has failed and/or is failing, and/or the like. Any desirable information (including the information described above with reference to indicators) may be transmitted over a communications network (e.g., alone and/or in addition to operation of any indicators).

In various implementations, system 100 can include or be associated with one or more energy generation or energy storage systems (e.g. photovoltaic panel, battery and so on). For example, system 100 can include a battery system (e.g., 166) for energy storage during daylight hours (e.g. via PV panel 114a, 114b) and utilization during off solar hours. Any desirable energy source for auxiliary components or otherwise can be employed including but not limited to solar, auxiliary AC/DC, etc.

In embodiments where the solar thermal unit comprises a porous hygroscopic material, composite or assembly (e.g., at 118a, 118b), the system flow architecture in combination with the particular configuration, structure, porosity and materials can improve interaction or water transfer between the working fluid and the hygroscopic material, composite and/or composite assembly in the solar thermal unit.

FIG. 1-6 illustrate some implementations of water generation systems and related components. FIG. 3-6 illustrate water generation systems including two hygroscopic layers or bodies in a solar thermal unit and a series flow architecture wherein process or regeneration gas flows through one hygroscopic body in advance of the other hygroscopic body, however other numbers of separate or distinct hygroscopic bodies in alternative configurations and/or flow architectures can be provided. Various examples of hygroscopic body or layer compositions configurations and flow architectures will be described in more detail below. In many embodiments, the composition, configuration and flow architecture of the hygroscopic material, composite and/or composite assembly is selected to improve interaction and/or water transfer between the process or working gas and the hygroscopic material for maximum water uptake from cool ambient air without weeping, swelling or other stability or degradation loss during a loading cycle and with an overall top-to-bottom heat transfer from upper portions of the solar thermal unit to the hygroscopic layers or bodies during unloading.

Furthermore, the efficiency of water generation systems of the present disclosure can vary based on ambient conditions (solar insolation, ambient relative humidity and/or the like) and system state (e.g., water content of system hygroscopic materials, thermal mass or available solar thermal heat). Therefore, it can be desirable to dynamically operate, via a system controller, the water generation system and its components, for example dynamically over the course of a daytime regeneration operation, so as to improve the water production over the course of the regeneration cycle. In various embodiments, process and/or regeneration fluid flow pathways and/or flow rates through hygroscopic material(s), composite(s) or assemblies may vary based on system operational state(s) (e.g., user setpoints, programmatically, water production targets, relative to other water production systems, and/or the like), variations in system operational conditions (e.g., system water content, system power state, system heat or power availability, system configuration and/or the like) and/or environmental variations (e.g., season, time of day, weather, solar irradiation and/or the like) to improve water production characteristics, for example to increase a water generation efficiency or production amount, balance or reduce a pressure drop within the system, balance water uptake and release operations and so on.

Figure 6B:
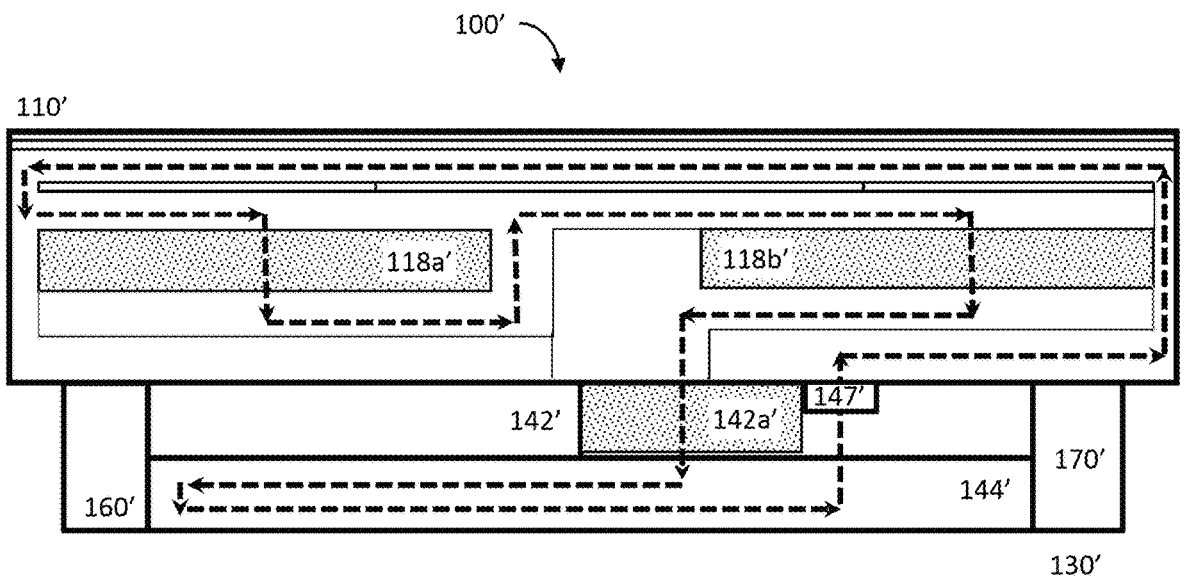
FIG. 6B illustrates a block diagram of a water generation system including a regeneration flow path during a release or unloading operational cycle, according to an embodiment.
Figure 6C:
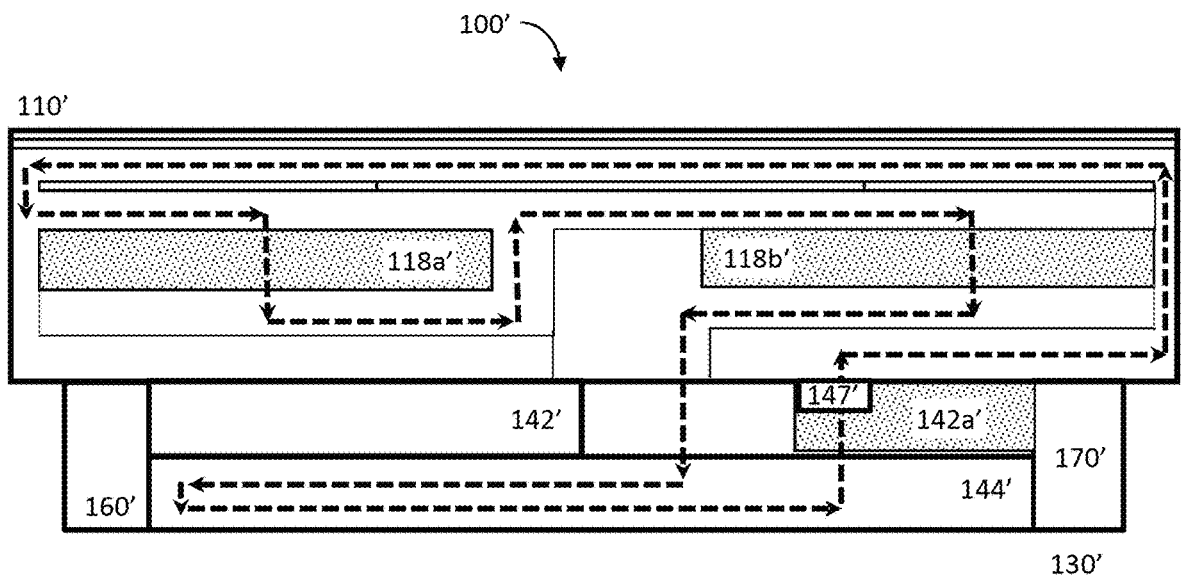
FIG. 6C illustrates a block diagram of a water generation system including a regeneration flow path during a release or unloading operational cycle, according to an embodiment.

In one illustrative example, FIG. 6B and FIG. 6C depict a block diagram of system 100' having at least some components or features similar to those of system 100 depicted in FIG. 6A. System 100' includes two porous hygroscopic absorbers 118a' and 118b' in solar thermal unit 110' and an energy exchanger 142' comprising a hygroscopic layer or body 142a' configured to transition (e.g., rotate as part of a partial hygroscopic wheel or rotor) between a regeneration flow path segment input to the condenser 144' and a regeneration flow path segment output from the condenser 144'. Controller 170' can operate system 100' such that during a first portion of a regeneration cycle (e.g., when system solar thermal energy is low and/or humidity of regeneration fluid output from the condenser is low), regeneration fluid flow bypasses hygroscopic body 142a' upon exiting condenser 144' as depicted in FIG. 6B. During a second portion of the regeneration cycle (e.g., when system solar thermal energy is high and/or humidity of regeneration fluid output from condenser is high) depicted in FIG. 6C, controller 170' can operate system 100' such that regeneration fluid flows through hygroscopic body 142a' upon exiting condenser 144' to capture water in advance of flow into solar thermal unit 110'. The illustrative example of FIG. 6B-C depicts a movable hygroscopic body 142a', however in other embodiments, the regeneration fluid path can be configured to alternate or transition during operation to bypass at least a portion of a stationary hygroscopic material, composite or body, for example via fans, valves and/or reversing flow. In various embodiments, the regeneration fluid flow can be configured to alternate or transition during operation based on varying system operational states, operational conditions, and/or environmental variations.

In embodiments where the energy exchanger comprises a rotary desiccant, the hygroscopic material in the solar thermal unit can be selected to have a higher water sorption capacity than the hygroscopic material of the rotary desiccant unit. Alternatively, or in addition, the hygroscopic material in the solar thermal unit can be selected to have a lower water sorption and/or desorption rate than the hygroscopic material in the rotary desiccant unit. For example, the hygroscopic material in the solar thermal unit can include a deliquescent salt that could provide a higher water sorption capacity than an oxide, clay or molecular sieve-based hygroscopic material of the rotary desiccant unit. As another example, the hygroscopic material in the rotary desiccant unit can include an oxide, clay or molecular sieve-based material that can provide a higher water sorption/desorption rate than a deliquescent salt in the hygroscopic material in the solar thermal unit. As yet another example, the hygroscopic material of the rotary desiccant unit can be selected to have a lower density than the hygroscopic material in the solar thermal unit.

In various embodiments, a solar thermal unit is designed such that at least a portion of the heat absorbed from a top portion of the solar thermal unit comprises solar heat. In various embodiments, a solar thermal unit further comprises a photovoltaic panel and at least a portion of the heat absorbed from a top portion of the solar thermal unit comprises heat generated by the photovoltaic panel. Additional illustrative examples of hygroscopic configurations and flow architectures will be described below. Unless otherwise specified below, the numerical indicators used to refer to components in FIG. 7-10 are similar to those used to refer to components or features in FIG. 1-6 above, except that the index has been incremented by 100.

Figure 7A:
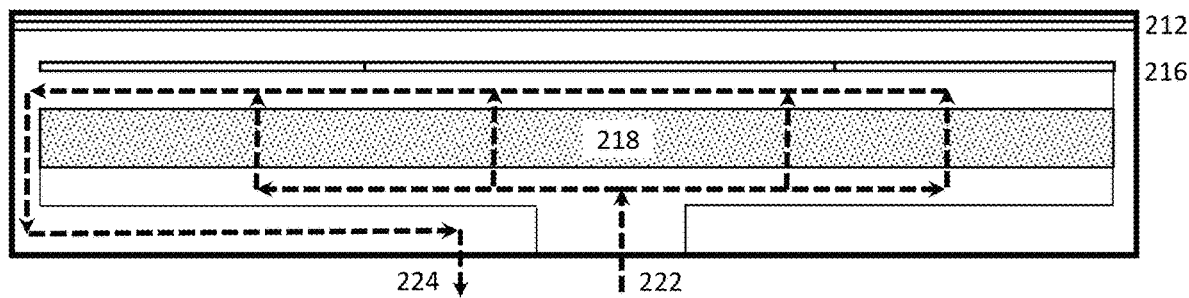
FIG. 7A illustrates a cross-sectional view of a process flow path in a solar thermal unit, according to an embodiment.
Figure 7B:
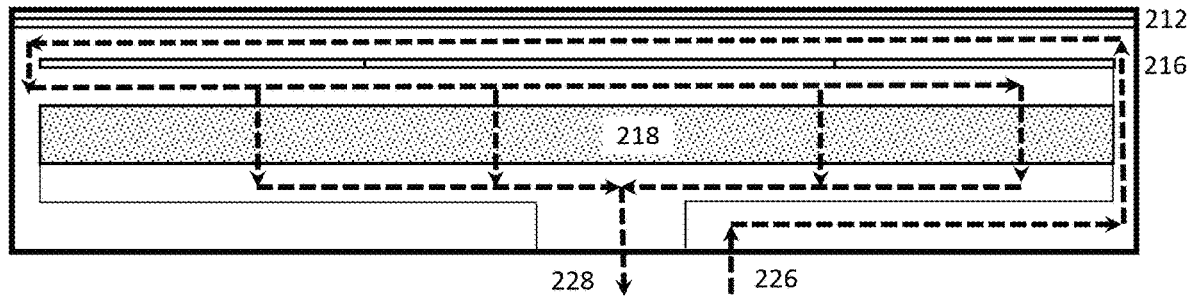
FIG. 7B illustrates a cross-sectional view of a regeneration flow path in a solar thermal unit, according to an embodiment.

FIG. 7A illustrates a cross-sectional view of a process flow path (indicated by dashed arrows) and FIG. 7B illustrates a cross-sectional view of a regeneration flow path (indicated by dashed arrows) in a solar thermal unit 210 including a single or main hygroscopic layer or body 218. As depicted in FIG. 7A, the process fluid comprising water vapor enters solar thermal unit 210 at inlet 222 and flows through the hygroscopic layer 218 to deposit water therein. As depicted in FIG. 7B, the working fluid flows first to an upper portion of solar thermal unit 210 to collect heat i.e., between glazing layer 212 and interstitial layer 216, and then is directed through the hygroscopic layer 218 before exiting at 228.

Because the efficiency and power usage of solar thermal units of the present disclosure may be affected by the flow of the working fluid through the solar thermal unit and the pressure drop across the fluid paths including the porous hygroscopic layers, bodies or assemblies within the unit, it may be desirable to minimize the pressure drop through the porous hygroscopic assembly and reduce the amount of power required to pump the process, working and/or regeneration gas through the system at a desired flow rate.

Figure 8A:
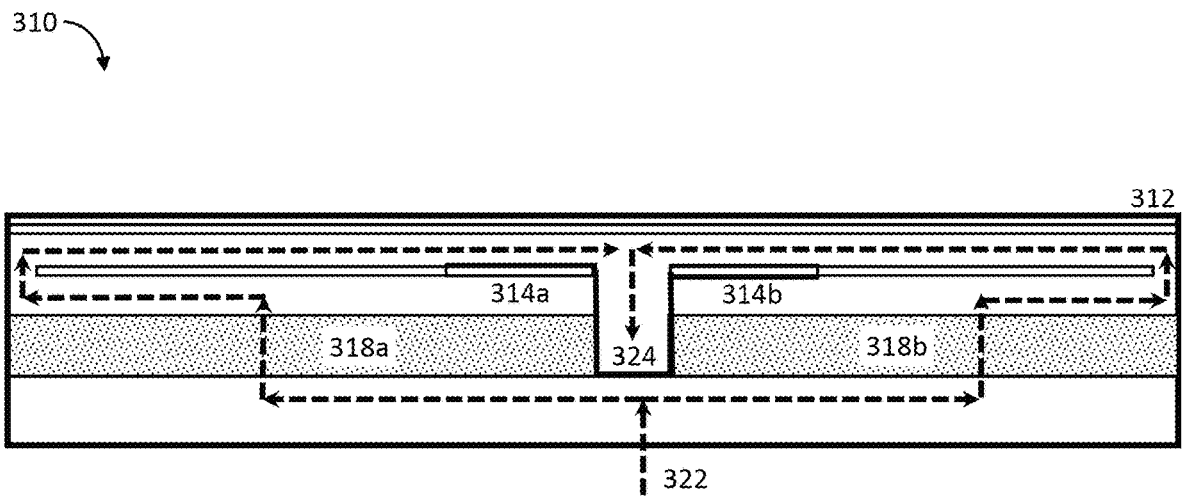
FIG. 8A illustrates a cross-sectional view of a process flow path in a solar thermal unit, according to an embodiment.
Figure 8B:
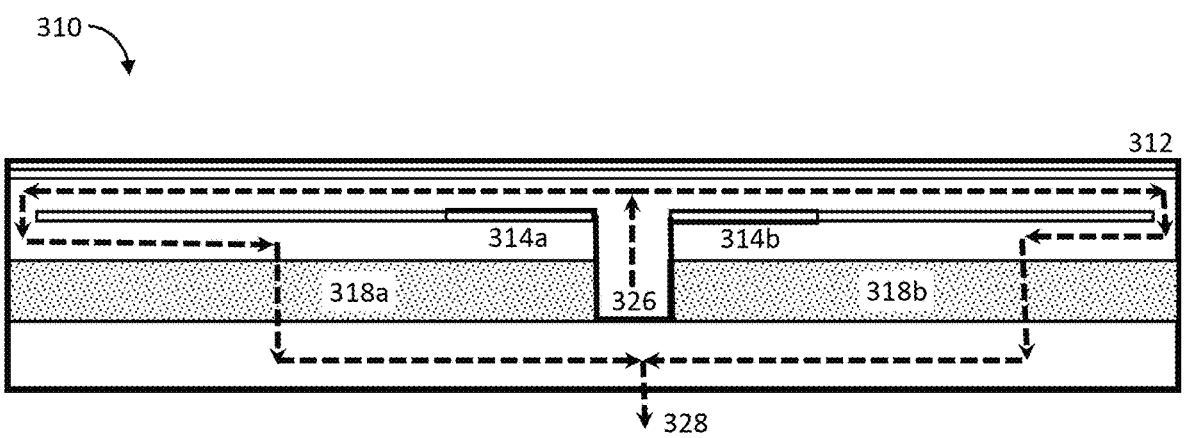
FIG. 8B illustrates a cross-sectional view of a regeneration flow path in a solar thermal unit, according to an embodiment.

In various embodiments, the fluid may be split between multiple flow paths to balance the pressure drop across the unit, and reduce the pressure drop as compared having only a single fluid path. As an example, FIG. 8A illustrates a illustrates a cross-sectional view of a process flow path (indicated by dashed arrows) and FIG. 8B illustrates a cross-sectional view of a regeneration flow path (indicated by dashed arrows) in a solar thermal unit 310 including separate or split hygroscopic composite assemblies 318a and 318b operating under a split flow architecture such that process and regeneration gas is split between the first hygroscopic composite assembly 318a and the second hygroscopic composite assembly 318b.

Figure 9A:
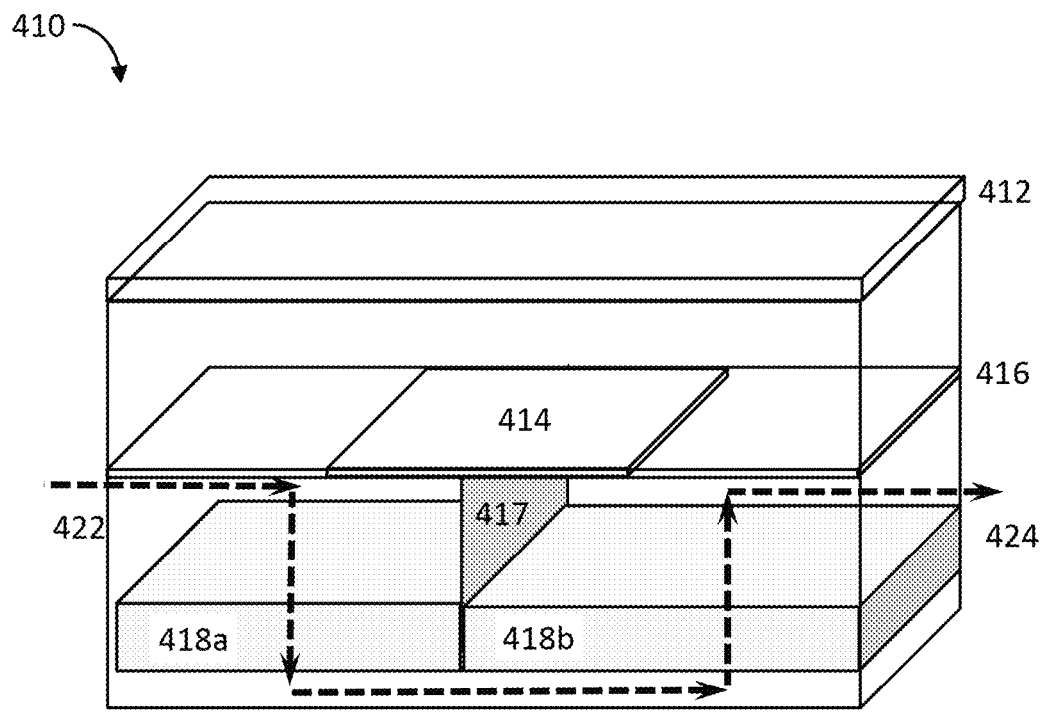
FIG. 9A illustrates a cross-sectional view of a process flow path in a solar thermal unit, according to an embodiment.
Figure 9B:
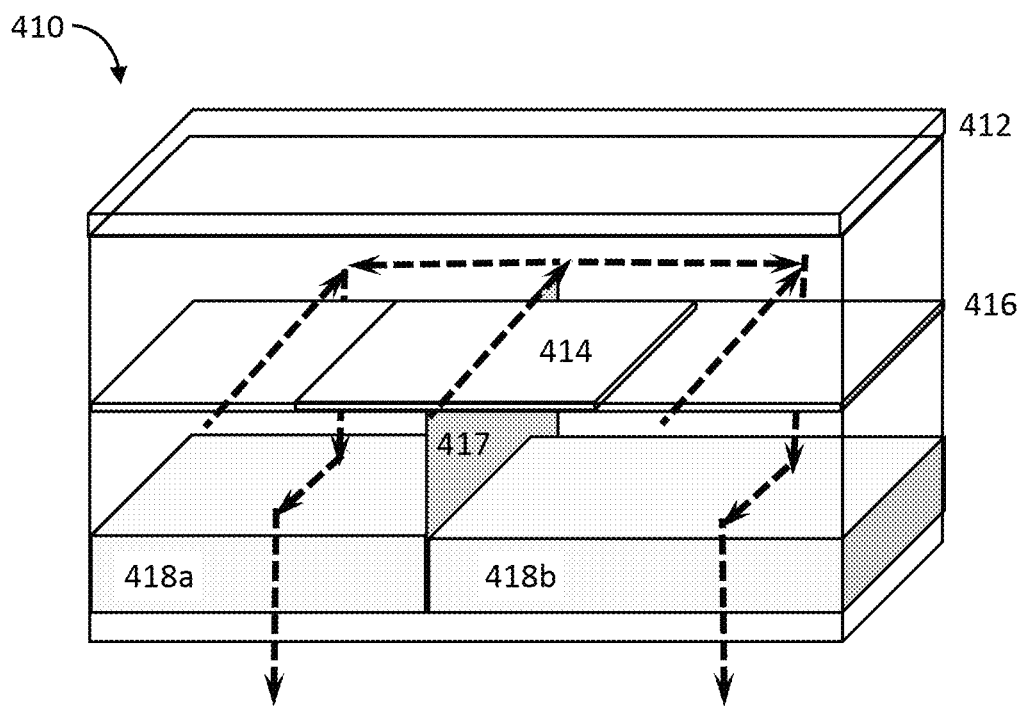
FIG. 9B illustrates a cross-sectional view of a regeneration flow path in a solar thermal unit, according to an embodiment.

As another example, FIG. 9A illustrates a perspective cross-sectional view of a series process flow path through two partitioned, distinct or divided hygroscopic composite assemblies 418a and 418b and FIG. 9B illustrates a perspective cross-sectional view of a regeneration flow path including a cross flow path first between glazing layer 412 and interstitial PV panel 414 and then through two hygroscopic composite assemblies 418a and 418b. As depicted in FIG. 9B, the working fluid flows (in a pathway depicted by dashed arrows) first to an upper portion to collect heat, and then reverses direction to towards lower segmented portions defined by separator 417 to collect water and heat from hygroscopic composite assemblies 418a and 418b. In this way, the working fluid may efficiently transport absorbed solar heat from the upper layer of solar thermal unit 410 to maximize the water uptake from the hygroscopic material during the unloading cycle (FIG. 9B) while improving the interaction of the process gas with hygroscopic bodies 418a and 418b during the loading cycle (FIG. 9A).

In various embodiments, the hygroscopic composite assembly configuration and the flow architecture of the solar thermal unit 410 is configured to improve interaction of the process fluid with the hygroscopic material via serial exposure of the subdivided areas (e.g., 418a, 418b) to the same process fluid flow rate, thereby increasing flow flux of the process fluid during the load time. As depicted in FIG. 9A, the process fluid comprising water vapor enters solar thermal unit 410 and flows (in a pathway depicted by dashed lines) through the lower segmented portions or layers 418a, 418b, under separator 417, to deposit water in the hygroscopic layers 418a and 418b. FIG. 9A-B depict a single separator, however any desirable number and configuration of fluid inlets, fluid outlets, separators or other flow directing means, structures or devices can be provided to improve interaction of the process gas with the hygroscopic material at a high process gas flux.

In an embodiment, various configurations of one or more hygroscopic layers, bodies or assemblies in the solar thermal unit can be provided to maintain a process gas flux preferably greater than 50 cubic feet per minute (CFM)/m$^2$, greater than 100 CFM/m$^2$, greater than 200 CFM/m$^2$, greater than 300 CFM/m$^2$ or greater than 400 CFM/m$^2$ with a pressure drop less than 0.5 inches water, 0.3 inches water, less than 0.2 inches water, less than 0.15 inches water or less than 0.1 inches water. Furthermore, the hygroscopic bodies or layers in the solar thermal unit can be configured around and/or within flow separators, distributors, sectioned layers or segments according to favored flow paths for loading (i.e. water uptake) and/or regeneration (i.e. water release) operations to increase water generation. In an embodiment, the solar thermal unit comprises a hygroscopic composite assembly having a pore structure to maintain a gas flux through the hygroscopic composite with a pressure drop less than 0.2 inches water at a flow gas flux greater than 200 CFM/m$^2$.

The solar thermal unit 410 shown FIG. 9B depicts the working fluid path being introduced into the solar thermal unit at approximately perpendicularly (i.e., at about a 90 degree angle) relative to the process fluid path, and depicts a single separator 417 to maintain the desired top down flow of the working fluid, however any desirable configuration (e.g., spacing, placement, relative angles, etc.) and/or number of fluid inlets, fluid outlets, separators or other flow directing means, structures or devices can be provided to define the process and working fluid flow pathways in the solar thermal unit for load and/or release operations. Furthermore, various flow approaches can be employed including flow-through hygroscopic body implementations, flow-over or flat plate implementations, as well as their combinations or derivatives. In addition, the hygroscopic material can be configured in various ways relative to the flow directing means, structures or distributors, for example but not limited to lattice structures, rigid porous plates, inter-corrugated fluidic channels, and/or woven and fiber meshes to sustain back pressure and distribute the flow.

In various embodiments, a solar thermal unit is designed such that at least a portion of the heat absorbed from a top portion of the solar thermal unit comprises solar heat. In various embodiments, a solar thermal unit further comprises a photovoltaic panel and at least a portion of the heat absorbed from a top portion of the solar thermal unit comprises heat generated by the photovoltaic panel.

Figure 10A:
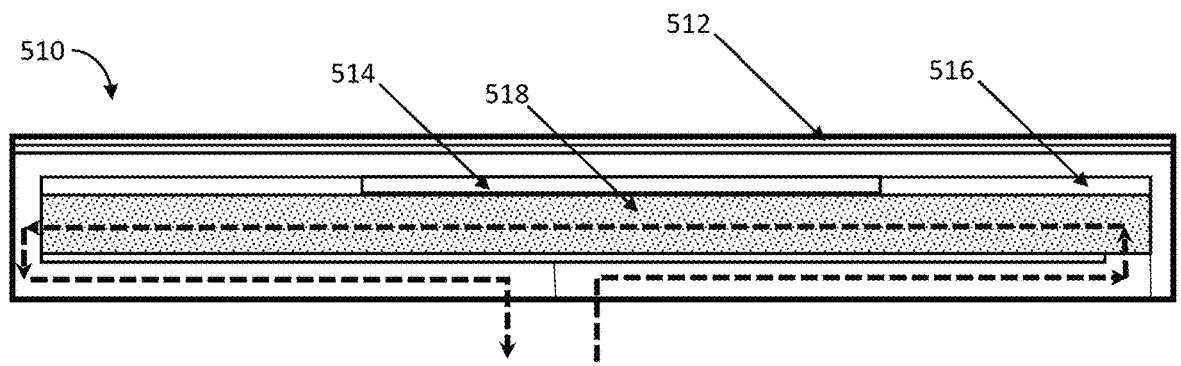
FIG. 10A illustrates a cross-sectional view of a process flow path in a solar thermal unit, according to an embodiment.
Figure 10B:
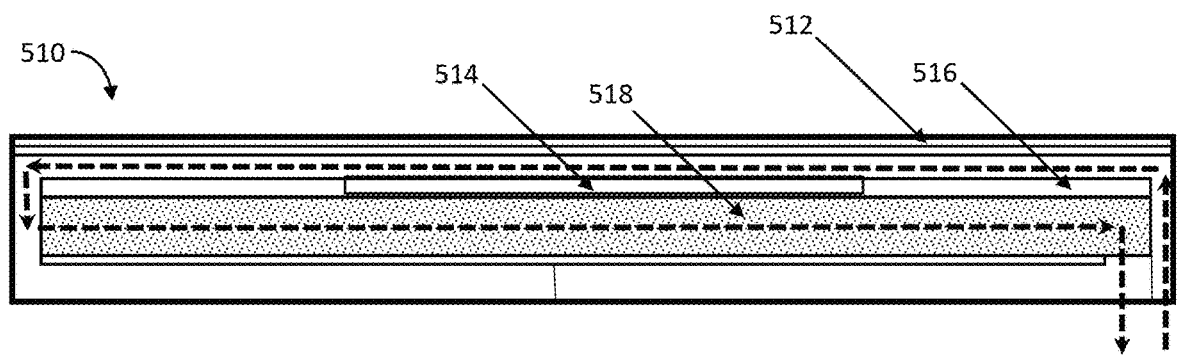
FIG. 10B illustrates a cross-sectional view of a regeneration flow path in a solar thermal unit, according to an embodiment.

The hygroscopic composite assembly can be provided as a self-supporting structure so as to at least partially provide the structural elements and mechanical robustness of a solar thermal unit. As an illustrative example, FIG. 10A illustrates a illustrates a cross-sectional view of a process flow path (indicated by dashed arrows) and FIG. 10B illustrates a cross-sectional view of a regeneration flow path (indicated by dashed arrows) in a modular solar thermal unit 510 including a hygroscopic composite assembly 518 provided adjacent to a rear surface of a photovoltaic (PV) layer or panel 514 and an interstitial layer 516 (e.g., transparent glass panel). In some embodiments, the PV panel 514 can span the entirety of the hygroscopic composite assembly 518. As depicted in FIG. 10A, a process gas comprising water vapor enters solar thermal unit 510 and flows through the hygroscopic composite assembly 518 to deposit water therein during a loading operational cycle. As depicted in FIG. 10B, the working fluid flows first to an upper portion of solar thermal unit 510 to collect heat i.e., between glazing layer 512 and a front surface of PV panel 514, and then is directed through the hygroscopic composite assembly 518 positioned at the rear surface of PV panel 514. In an embodiment, the hygroscopic composite layer or assembly 518 can be configured to be fully or at least partially in physical contact with a rear surface of PV panel 514. In an embodiment, a hygroscopic material, composite or composite assembly can be provided on the backside or rear surface of a PV panel and/or interstitial glazing layer so as to architect a heat transfer network wherein solar irradiation on the PV panel and/or interstitial layer is conducted as heat into the hygroscopic absorber matrix (e.g., 518) to efficiently evaporate water vapor to the regeneration gas flowing in the regeneration flow path. In this approach, the PV panel and/or interstitial glass surfaces can be evaporatively cooling during the unloading or water release operation. In various embodiments, the properties of the hygroscopic material, composite or assembly (e.g., hygroscopic salt content, porosity and the like) and/or the operational setpoints (e.g. rate of regeneration gas flow through solar thermal unit) can be controlled to improve the efficiency of the water generation system.

The hygroscopic material, composite and/or or composite assembly may withstand high temperature (e.g., 120-150° C.) cycling between load and unloading cycles of a water generation system. Durable water generation systems of the present disclosure can provide continuous water capture/release cycling over thousands of cycles, e.g., continuous diurnal cycling over a 20-year lifetime can represent over 7,000 cycles of diurnal loading at nighttime hours and water release during daytime hours. As such, the hygroscopic material, composite and composite assembly may be configured for have long-term cycling stability without loss of mechanical stability or sorption capacity. Furthermore, the hygroscopic materials or components may remain in solid phase and/or maintain full retention of liquid phase within the composite assembly throughout continuous sorption/desorption cycling. In addition, constituents or components of the hygroscopic composite assembly may be selected for and configured to be chemically stable with other hygroscopic composite assembly components or to constituents of the process or regeneration gas (e.g., oxygen).

The hygroscopic composite assembly is also configured to have a low density, high water sorption capacity and an open pore structure without closed throats and with pore sizes on the order of microns to millimeters for facile sorption. The sorption kinetics of the hygroscopic material, composite and composite assembly may leverage a diurnal water vapor loading cycle without compromising total water storage capacity. The sorption capacities of the hygroscopic material, composite or assembly may be configured to maintain a high water storage capacity across global average nighttime atmospheric air conditions. Furthermore, the desorption kinetics of the hygroscopic material, composite or assembly may be selected for the global average of solar insolation magnitude and exposure time (e.g. 6 kWh/m$^2$, 1 kW/m$^2$ peak solar radiation for 8 peak sun hours). In one example, a hygroscopic material, composite or assembly is selected to uptake 30-300% of its own mass as water vapor.

In some embodiments, a hygroscopic composite, assembly or body can be provided as one or more layered structures, a packed bed including hygroscopic components, particles or beads or a substantially continuous or monolithic porous composite structure. Additionally, a composite assembly doesn't necessarily itself need to be a composite in the traditional sense, rather it can be provided as a loose pack or packed bed assembly with a supporting frame. Furthermore, a porous hygroscopic body or layer can include one or more light absorbing or light activated materials. In one example, a hygroscopic composite can include hygroscopic particles agglomerated via a binder and/or dispersed in a high surface area matrix, support medium or substrate. The hygroscopic material, support substrate, composite and/or assembly can be selected to minimize reflection of solar radiation and improve absorption and conduction of thermal energy. For example, the hygroscopic material, support substrate, composite and/or assembly can be dark or black in color. In some embodiments, the hygroscopic material, support substrate, composite and/or assembly can be mixed, combined and/or embedded with materials or structures to efficiently absorb and/or transfer heat. For example, the hygroscopic material or composite can be dispersed around a metallic structure with a thermal conductivity greater than 50 W/mK. In other embodiments, the hygroscopic composite is a self-supporting structure housed within the solar thermal unit.

Hygroscopic composites and composite assemblies of the present systems can comprise various components or constituents in a number of varied configurations (e.g., such that the hygroscopic composite is capable of continuous adsorption and desorption of water vapor). The following description of hygroscopic composites and composite assemblies is provided by way of example. In some implementations, a hygroscopic composite assembly is capable of sorption at a first temperature, relative humidity and/or pressure and desorption at a second temperature, relative humidity and/or pressure. The components of the hygroscopic composite assembly can be provided as a liquid, solid, and/or combinations thereof. The hygroscopic composite can be provided as a porous solid substrate impregnated with hygroscopic materials. For example, the hygroscopic material may comprise one or more materials selected from the group consisting of: silica, silica gel, alumina, alumina gel, montmorillonite clay, zeolites, molecular sieves, metal-organic frameworks, activated carbon, metal oxides, lithium salts, calcium salts, potassium salts, sodium salts, magnesium salts, phosphoric salts, organic salts, metal salts, ionic liquids, carbon, glycerin, glycols, hydrophilic polymers, polyols, polypropylene fibers, cellulosic fibers, derivatives thereof, and combinations of thereof. In some embodiments, the hygroscopic composite comprises a metal organic framework (MOF), for example UiO-66(Zr), CAU-1(Al), MIL-101(Cr), MIL-101(Al), MIL-53(Al), MIL-53(Cr), Al fumarate, derivatives thereof or combinations thereof.

In some embodiments, the hygroscopic material can be selected and/or configured to avoid sorption of certain molecules (e.g., those molecules that may be poisonous when consumed by a human). The term "sorption," as used herein, refers to absorption, adsorption or a combination thereof.

In various embodiments, the hygroscopic material, composite and/or assembly can include liquid or deliquescent components combined with retention or support substrates in a ratio determined by a maximum water uptake after a diurnal loading cycle in high relative humidity ambient air conditions (e.g. >40% RH, >60% RH, >80% RH). In various implementations, the hygroscopic composite comprises a hygroscopic salt, for example a deliquescent salt. Hygroscopic salts of the present disclosure can be selected from the group of potassium carbonate, calcium chloride, sodium chloride, lithium chloride, sodium carbonate, magnesium chloride, magnesium sulfate, potassium bromide, sodium sulfate, derivatives thereof or combinations thereof. In some embodiments, a combination of deliquescent salts can be dispersed on a support substrate. For example, a combination of calcium chloride and sodium chloride can be dispersed on a support substrate, with calcium chloride acting as a vapor uptake reservoir at low relative humidities and sodium chloride acting as a differential vapor pressure buffer at mid-range relative humidities. In some embodiments, the hygroscopic composite comprises a hygroscopic salt dispersed on a support substrate. For example, the hygroscopic composite can include a hygroscopic or deliquescent salt in an amount greater than 10% and less than 50% by weight of the total weight of the first hygroscopic composite. The amount of hygroscopic or deliquescent salt dispersed on a substrate can be selected based on its sorption/desorption kinetics for a diurnal water vapor loading/unloading cycle to facilitate water production and avoid weeping, swelling or other stability losses and/or improve system water production. It can be preferable to decrease or minimize the weight of the hygroscopic composite and the hygroscopic assembly, so the hygroscopic material or salt content can be increased to an upper limit set by weeping, swelling or other stability concerns and/or water production. A weeping, swelling or instability condition or state can occur when a hygroscopic composite absorbs a high enough amount of water to begin forming an aqueous solution and can irreversibly drive migration of a hygroscopic material from the pores or retaining surface features of a support substrate. Furthermore, a weeping, swelling or instability condition or state can increase the pressure drop through the hygroscopic composite or composite assembly and present a degradation or failure mode for the water generation system. As will be described in more detail below, an operational or cycling safety limit can be set before the onset of weeping, swelling or other instability to avoid system degradation or failure and/or improve the efficiency of water production. In some preferred implementations, the hygroscopic composite can include a hygroscopic salt in an amount greater that 20% and less than 30% by weight, or greater that 24% and less than 28% by weight, of the total weight of the hygroscopic composite such that the hygroscopic composite or body maintains a high water storage and release capability across global average diurnal atmospheric air conditions.

For illustrative purposes, various control approaches for efficient operation of a water generation system are described herein with regards to utilizing a hygroscopic salt or other hygroscopic material with a weeping potential, including system cycling between a weeping condition (i.e. an upper bound or limit of water content) and a low vapor pressure condition (i.e. a lower bound or limit for water content). However, a similar control approach can be employed for any material system having same or similar lower bound or limit and/or upper bound limit. Furthermore, additional or alternative water uptake and/or release cycling limits may exist depending on the particular material employed. For example, some materials used in water generation systems may have upper bound limits relating to swelling with excess water loading which can cause excess pressure drops in a water generation system. As another example, some material used in water generation systems may have stability issues at high water loading conditions, for example a metal organic framework can swell at higher water contents which can degrade cycling stability of the water generations system. Thus, the material design and control approaches described herein can be modified such that additional embodiments may be realized with operational, logical, chemical, and mechanical changes may be made without departing from the spirit and scope of the disclosure.

In an embodiment, a higher salt content in the hygroscopic composite can support sorption of a greater amount of water, however a higher salt content can also trigger a weeping, swelling or instability condition at lower total water loads and/or process gas relative humidities. Furthermore, at lower ratios of absorbed water to hygroscopic salt, the hygroscopic composite can bind water more strongly and as such, more energy can be required to desorb the 'lowergrade' or more strongly bound water during an unloading cycle. In other words, the water vapor pressure of the hygroscopic composite at a higher water content (e.g. at the beginning of an unloading cycle) may require less energy to desorb (i.e. has a lower binding energy) and the water vapor pressure of the hygroscopic composite at a lower water content (e.g. towards the end of an unloading cycle) may require more energy to desorb (i.e. has a higher binding energy).

Figure 11:
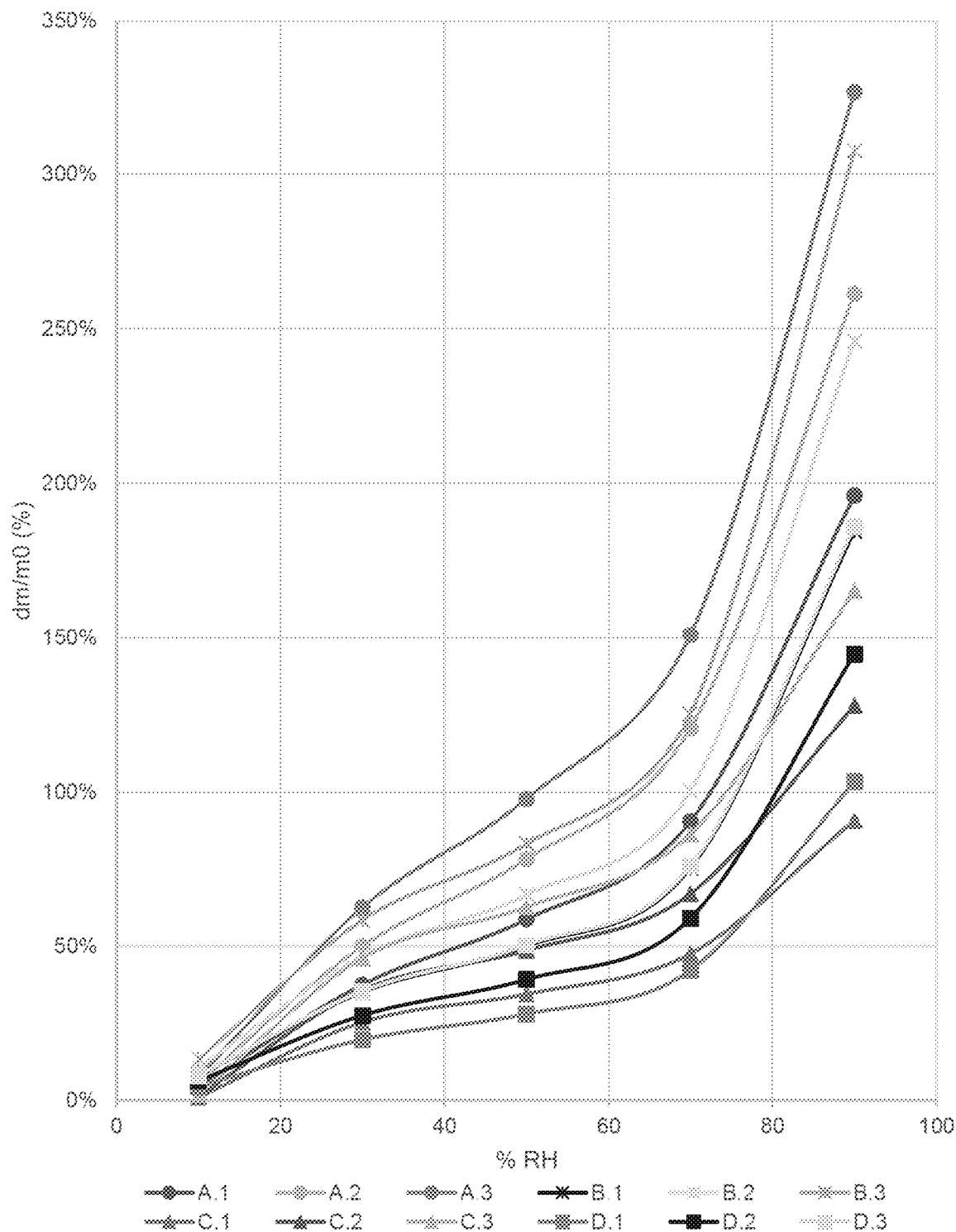
FIG. 11 shows isotherm plots for hygroscopic composites for a water generation system, according to an embodiment.

As an example, FIG. 11 shows isotherm plots at 25° C. for a set of hygroscopic composites for use in a water generation system. The isotherm plots show mass % water uptake ($m/m^o$) with increasing salt content for a hygroscopic composite of a first type (A.1 at low wt % salt, A.2 at a mid wt % salt and A.3 at high wt % salt); a hygroscopic composite of a second type (B.1 at low wt % salt, B.2 at a mid wt % salt and B.3 at high wt % salt); a hygroscopic composite of a third type (C.1 at low wt % salt, C.2 at a mid wt % salt and C.3 at high wt % salt); and a hygroscopic composite of a fourth type (D.1 at low wt % salt, D.2 at a mid wt % salt and D.3 at high wt % salt). As shown, for all hygroscopic composite types, an increasing amount of salt content increases the amount of water uptake or loading, however the selection of hygroscopic composite type can facilitate operation within a desired range of water production conditions for a water generation system, e.g. global average ambient relative humidities.

In various embodiments, it can be preferable to avoid or minimize reaching a 'low-grade' water condition wherein the thermodynamic state of the water in the hygroscopic composite or composite assembly is at a relatively low equilibrated RH because operating at lower equilibrated water content or water vapor pressure states in the hygroscopic composite can require more energy to extract residual or remaining water in the hygroscopic composite or composite assembly. One approach to minimize the amount of energy required to extract water from the hygroscopic composite is to increase the salt content of the hygroscopic composite, however there is an increased driving force towards a weeping, swelling or unstable condition. However, the water generation system can operate such that one or more properties of the hygroscopic composite in the solar thermal unit (e.g., deliquescent salt mass %, porosity, salt type, and/or the like) can be used to determine a system operational setpoint (e.g., setting a residual water limit or lower unloading limit during and unloading cycle, setting a weeping threshold limit, swelling threshold limit, instability limit or upper loading limit during a loading cycle, and/or the like). As will be described in more detail below, systems of the present disclosure can combine a hygroscopic composite and/or composite assembly design approach with an operational control approach to avoid weeping, minimize operation at low vapor pressures (i.e., minimize the amount of energy needed to desorb water), thereby improving system efficiency to produce liquid water.

Figure 12:
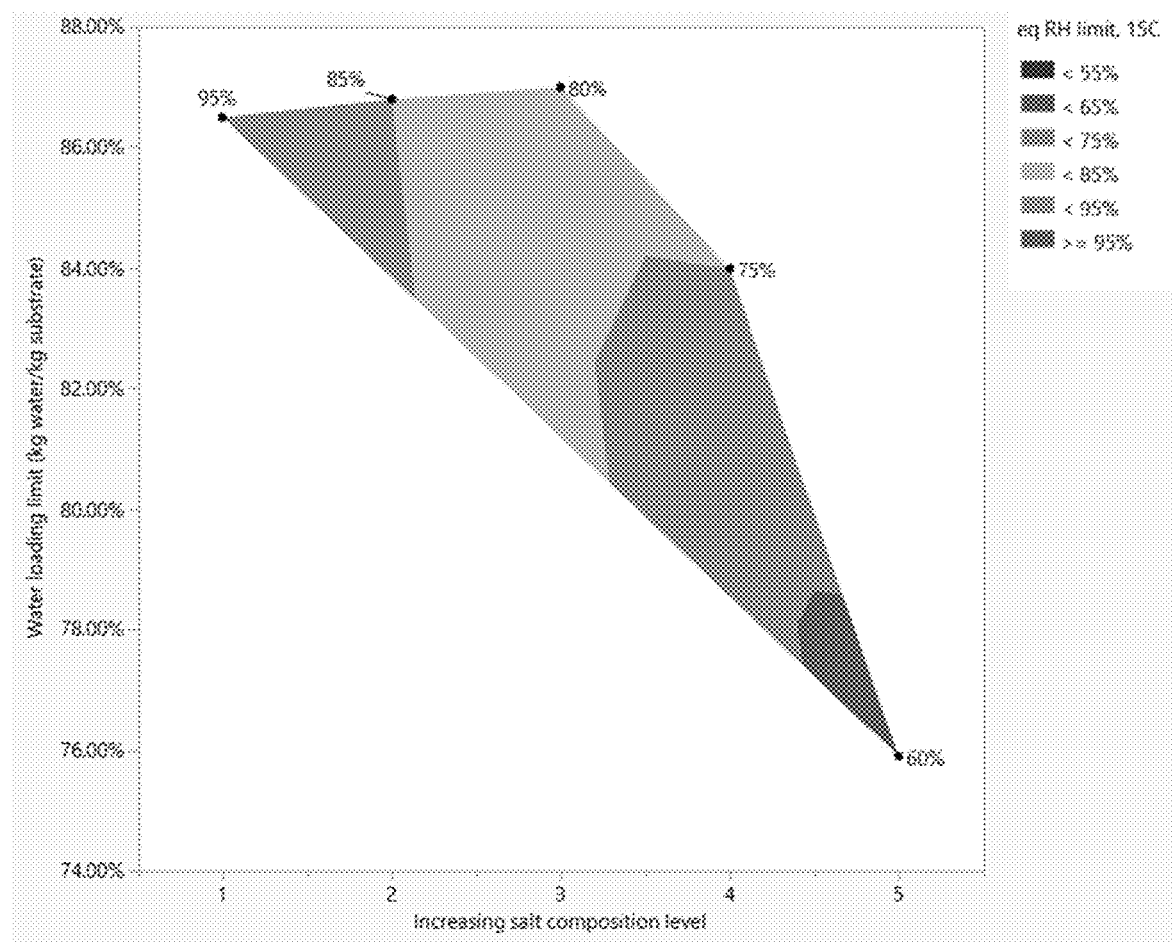
FIG. 12 shows a contour plot of water loading limit for increasing salt content of a hygroscopic composite, according to an embodiment.

To illustrate the variations in weeping or instability condition for a selected hygroscopic composite and the associated control approach, FIG. 12 shows a contour plot of weeping threshold failure limit or water loading limit (kg water uptake/kg substrate) for increasing salt composition of a hygroscopic composite. For each salt composition level (increasing from 1 to 5), the % relative humidity (% RH) at which weeping is observed (for a partial isotherm at 15° C.) is indicated at the upper portion of the contour plot. The contour shading is extrapolated to show an equivalent total water loading in the hygroscopic composite assembly. The equivalent water loading limit is a weeping failure limit which should be avoided during operation of the water generation system. As such, a weeping threshold indicated as an equilibrated RH limit (at 15° C. in this example for illustration) can be used to set an operational control setpoint e.g., the system controller can cease water loading of the hygroscopic composite if the equilibrated RH limit is reached.

As shown in the plot of FIG. 12, as the salt content increases, there is a decrease in the total amount of water the hygroscopic composite is capable of storing before weeping, swelling or becoming unstable. This may be, at least in part, due to additional salt not being dispersed into the interior of the support substrate but rather building up on external substrate surfaces meaning captured water may not be entrained in the hygroscopic composite such that weeping occurs at a lower water content. Alternatively or in addition, this may be, at least in part, due to swelling of the structural framework of the hygroscopic material such that captured water may not be encapsulated in the hygroscopic composite such that swelling occurs at a lower water content. In an embodiment, it can be preferable to operate a water generation system with a hygroscopic composite in a mid-range of salt composition to avoid reaching a weeping, swelling or other unstable condition while maintaining a high level of water production. Additionally, there can be an efficiency loss if the salt content is too high because a higher ratio of salt to entrained water in the hygroscopic composite can require more energy to release during an unloading cycle, i.e. it is preferable to operate an unloading cycle with a high ratio of water to salt content for the efficient use of thermal energy from the solar thermal unit.

In various embodiments, the hygroscopic composite comprises a hygroscopic salt or material dispersed on a substrate. The substrate can captively entrain the hygroscopic salt such that substrate retains or encapsulates the hygroscopic salt within its pore structure to facilitate stable loading/unloading cycling. The substrate and the dispersion of a deliquescent salt thereon can be selected to regulate a weeping, swelling or unstable state wherein moisture builds up on the surface of the hygroscopic composite in the form of droplets. The water generation system can operate such that one or more properties of the hygroscopic composite and/or composite assembly, for example a deliquescent salt to substrate ratio, can be used to determine a system operational setpoint, for example a loading cycle operational setpoint to avoid a weeping, swelling or unstable condition or state.

The hygroscopic composite can include a support substrate having a high surface area, a low density and a hierarchical and/or open pore structure. For example, the hygroscopic material, composite, support media and/or support substrates can be selected to have surface areas greater than 300 square meters per gram. Furthermore, the hygroscopic composite and/or support substrate can have a pore structure that is hierarchically porous, e.g. microporous, mesoporous and microporous with pores ranging from about <2 nm to about 50 micron and up to the millimeter scale. In an embodiment, the support media or substrate is in particulate form, and the average particle diameter of the particulates can be in the range of about 2 mm to about 10 mm. Non-limiting examples of substrates of hygroscopic composites described herein include perlite, expanded vermiculite, expanded clay, phyllosilicate clay, carbon fibers, activated carbon, graphite, expanded graphite, porous silica, porous alumina, derivatives thereof and combinations thereof.

In an embodiment, the hygroscopic composite can include a hierarchically structured pore matrix with a significant portion of macropores to serve as efficient transport pathways. As an example, the hygroscopic composite can include an activated carbon selected as a deliquescent salt composite substrate that minimizes the weight of the hygroscopic composite while maximizing water uptake and kinetic rates of the hygroscopic composite. There is wide variation in microstructural characteristics of activated carbons dependent on their precursor type. The particular activated carbon structure should be selected for high mass transport rates of water vapor within the composite and for high sorption kinetic rates as well as provide facile impregnation of the substrate with a hygroscopic salt solution.

In an embodiment, the hygroscopic composite assemblies can include a polymeric binder in an amount greater than 1% and less than 25% by weight of the first hygroscopic composite, or preferably greater than 5% and less than 55% by weight of the first hygroscopic composite. For example, the polymeric binder can be a thermoplastic polymer having a melting temperature greater than 200 degrees Celsius. In other embodiments, the hygroscopic composite assembly comprises a thermosetting polymer. Hygroscopic composite assemblies of the present disclosure can comprise a polymer selected from the group consisting of polyepoxides, polyamides, polyolefins, polyesters, polyacrylates, polyvinyl halides, polyvinyl alcohols, polyacrylonitriles, polyurethanes, polysulfones, and derivatives or combinations thereof.

Additional examples of thermoplastic resins that can be included in the hygroscopic composite assemblies include polyesters such as polyethylene terephthalate (PET), polybutylene terephthalate (PBT); polyolefins such as polyethylene (PE), polypropylene (PP), and polybutylene; styrenic resin; polyoxymethylene (POM); polyamide (PA); polycarbonate (PC); polymethylenemethacrylate (PMMA); polyvinyl chloride (PVC); poly(phenylenesulfide) (PPS); polyphenylene ether (PPE); modified PPE; polyimide (PI); polyamideimide (PAI); polyetherimide (PEI); polysulfone (PSU); polyethersulfone; polyketone (PK); polyetherketone (PEK); polyetheretherketone (PEEK); polyetherketoneketone (PEKK); polyarylate (PAR); polyethernitrile (PEN); phenolic resin; phenoxy resin; fluorinated resin such as polytetrafluoroethylene; thermoplastic elastomers such as polystyrene type, polyolefin type, polyurethane type, polyester type, polyamide type, polybutadiene type, polyisoprene type and fluoro type; copolymers thereof; modifications thereof; and combinations thereof. Moreover, other elastomers or rubbers can be added to the above thermoplastic resin to improve their mechanical strength.

In an embodiment, a hygroscopic composite assembly has a mechanical stability such that it is capable of being self-supporting. For example, a hygroscopic composite assembly can be provided as a fiber-reinforced composite comprising carbon fiber, fiber glass, woven fibers or combinations thereof. For example, the hygroscopic composite assembly can be provided with a tensile strength greater than 50 MPa, 100 MPa or 200 MPa.

In an embodiment, a hygroscopic composite assembly comprises an interconnected open porous structure having a porosity of at least 5%, or in the range of 5-30% open porosity. In one non-limiting example, the hygroscopic composite assembly has a pore structure of a range of pore sizes including pore sizes ranging from about 1 mm to 5 mm to maintain a gas flux greater than 50 CFM/m$^2$, greater than 100 CFM/m$^2$, greater than 200 CFM/m$^2$, greater than 300 CFM/m$^2$ or greater than 400 CFM/m$^2$ with a pressure drop less than about 0.5 inches water, 0.3 inches water, 0.2 inches water, 0.15 inches water or 0.1 inches water. In a preferred embodiment, the composite assembly has a pore structure to maintain a gas flux through the hygroscopic composite with a pressure drop less than about 0.2 inches water at a flow gas flux of greater than about 200 CFM/m$^2$.

It can be preferable that a hygroscopic composite assembly is chemically, structurally, thermally and psychrometrically stable at conditions the water generation system experiences so as to maintain water uptake and water release capabilities over consecutive loading and unloading cycles. As one non-limiting example, the hygroscopic composite assembly has an equilibrium water uptake capacity greater than 0.3 grams water per gram of hygroscopic composite at a 60% RH and 25 degrees Celsius atmospheric condition. As another non-limiting example, the hygroscopic composite assembly uptakes water at a rate greater than 0.1 grams water per gram of hygroscopic composite per minute at 60% RH, 25 degrees Celsius atmospheric condition, and a process gas flow of 60 cubic centimeters per minute.

Various methods can be used to produce or process hygroscopic composites of the present disclosure including but not limited to simple mixing, spray coating, dry mixing, blending, impregnation, incipient wetness method, similar derivate methods and a combinations thereof can be used to form hygroscopic composites.

In embodiments where the hygroscopic composite assembly comprises thermosetting resin or thermoplastic resin, thermoplastic resins can be preferable given molded assemblies can be manufactured effectively by molding process such as press molding and injection molding in addition to improved impact strength.

The carbon fiber reinforced resin composition or molding compounds of the present invention can be molded with a molding process, such as injection molding (injection compression molding, gas assisted injection molding and insert molding for example), blow molding, rotary molding, extrusion molding, press molding, transfer molding (RTM molding, RIM molding and SCRIMP molding for example), filament winding molding, autoclave molding and hand lay-up molding for example. In various embodiments, a preferred molding process is injection molding with high productivity.

From the aspect of moldability, economical manufacturability, mechanical properties and heat resistance, at least one thermoplastic resin selected from the group consisting of polyamide resin, styrenic resin, polycarbonate resin, polyphenylene ether resin, polyester resin, poly (phenylene sulfide) resin, polyolefin resin, liquid crystal resin, phenolic resin can be used. At least one thermoplastic resin selected from the group consisting of polyamide resin, polycarbonate resin, styrenic resin and polyester resin can be preferable. If resins with melting temperature equal to or above 200° C. is used, the hygroscopic composite assembly can have a high mechanical stand cycling stability.

Figure 13A:
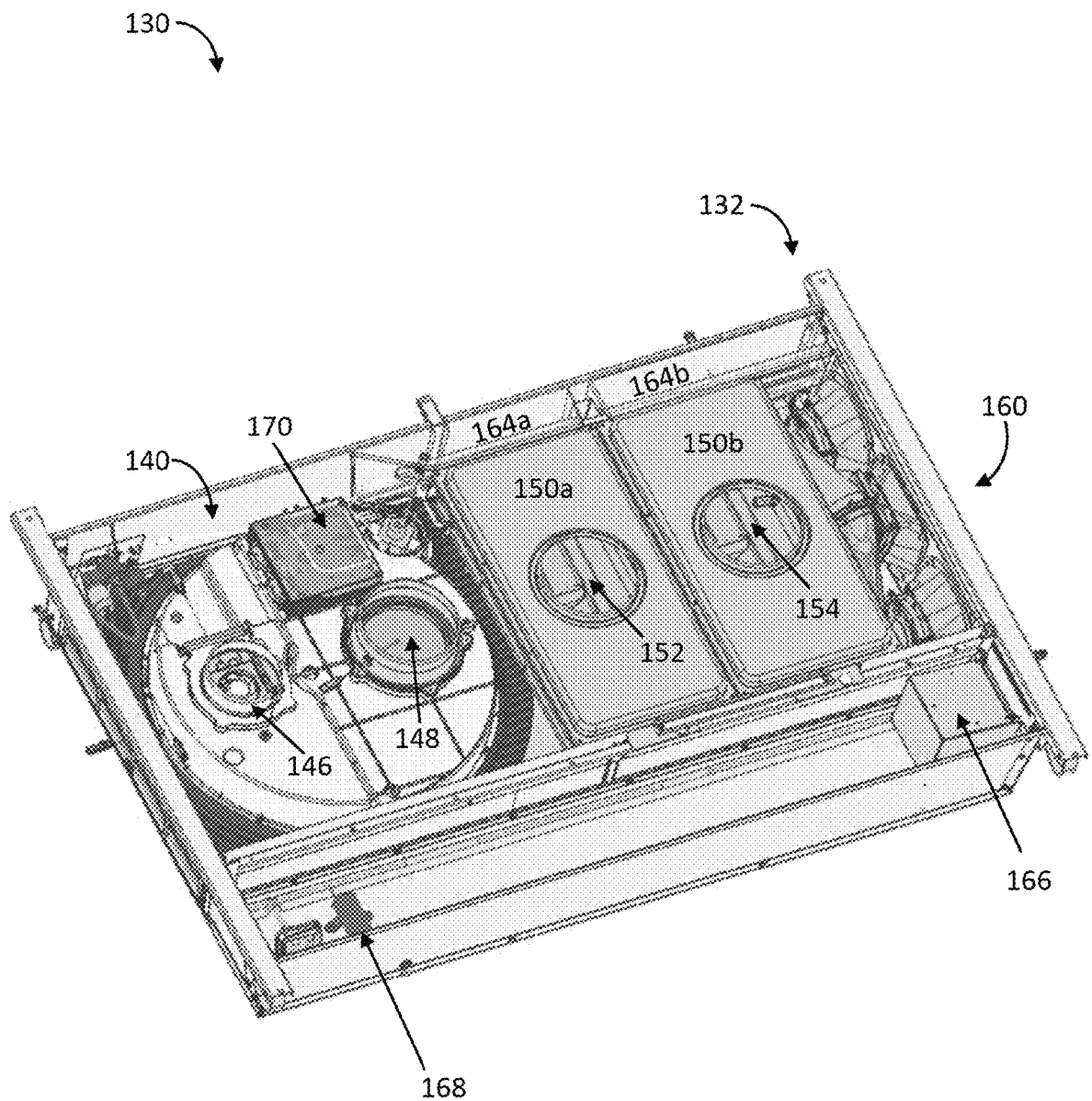
FIG. 13A illustrates a top-down perspective view of a lower housing assembly, according to an embodiment.
Figure 13B:
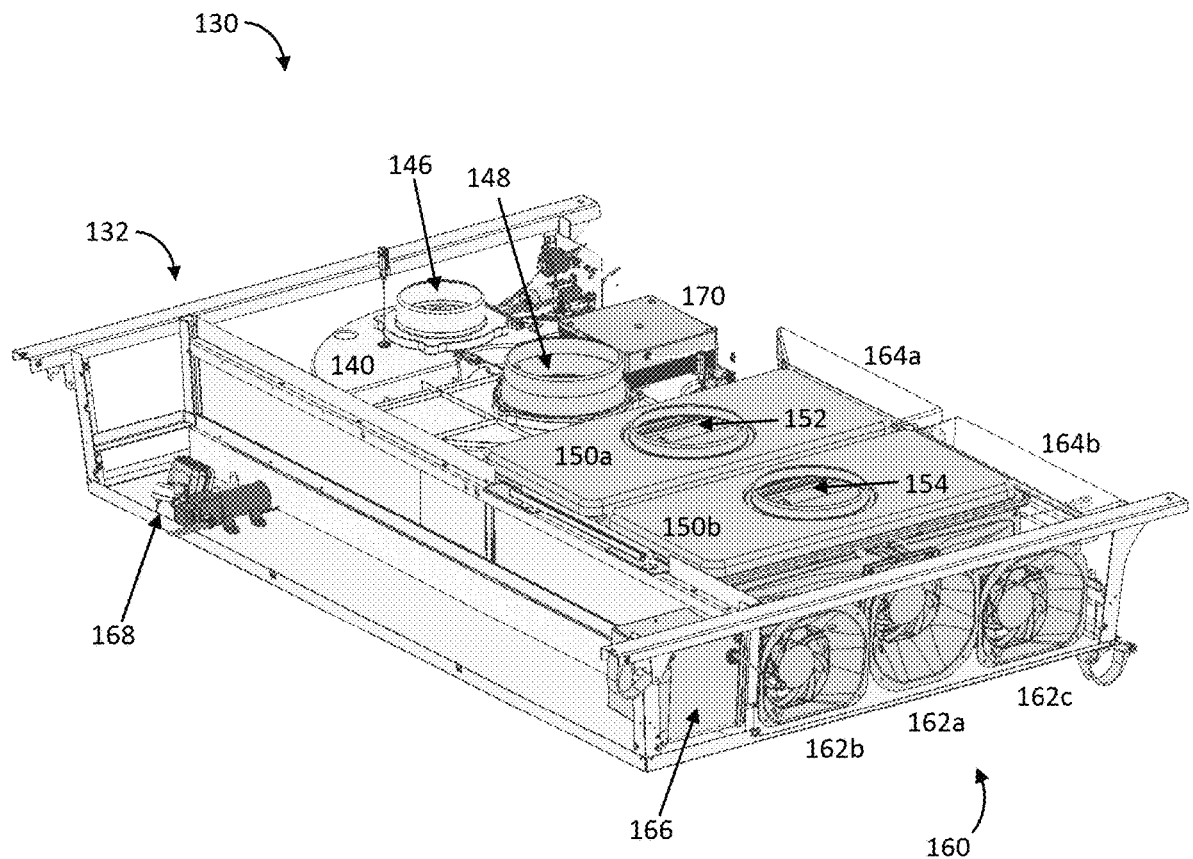
FIG. 13B illustrates a side perspective view of a lower housing assembly, according to an embodiment.

In various embodiments, system (e.g., 100) comprises a solar thermal unit (e.g., 110) coupled to a liquid water production assembly including a condenser (e.g., 144). As an illustrative example, FIG. 13A depicts a top-down perspective view and FIG. 13B depicts a side perspective view of lower housing assembly 130 of system 100. As shown in FIG. 13A-B, lower housing assembly 130 includes a low profile or integrated exchanger and condenser unit 140 inside a housing 132. The integrated exchanger and condenser unit 140 includes a condenser and/or exchanger inlet 148 configured to be coupled to the regeneration outlet port 128 of the solar thermal unit 110 and a condenser and/or exchanger outlet 146 configured to be coupled to the regeneration inlet port 126 of the solar thermal unit 110. The lower housing assembly 130 further comprises a first valve unit 150a comprising an outlet 152 configured to be coupled to the process inlet port 122 of the solar thermal unit 110 and a second valve unit 150b comprising an inlet 154 configured to be coupled to the process outlet port 124 of the solar thermal unit 110. As will be described in more detail below, valve units 150a and 150b can be configured to seal process ports 122 and 124 during a regeneration mode in an efficient manner so as to maintain a closed-loop regeneration path for the working fluid.

FIG. 13A only depicts two valve units 150a and 150b, however any desirable number or type of valves, separately or in combination, can be used to seal outlet 152 and inlet 154. For example, additional valves beyond valve units 150a and 150b could allow for additional flow bypass and/or fluid passageway configurations, as well as provide a system-wide or total ingress protection mode wherein the lower housing assembly 130 and/or the solar thermal unit 110 are partially or fully sealed, for example in response to a user input, predetermined program, control setpoint, internal or external condition, a weather event forecast and/or the like. In some embodiments, the system can include valve units that operate by inflating an inflatable member to seal the passageway or positioning or actuating a valve member to seal the passage way as will be described in some examples below. However, in other embodiments, inflatable valve units may not be employed and other valves operating under different mechanisms can be used. For example, an iris valve, a butterfly valve, a poppet valve, an actuated valve, a passive or active flow directing or restricting member and/or the like can be used.

Figure 14A:
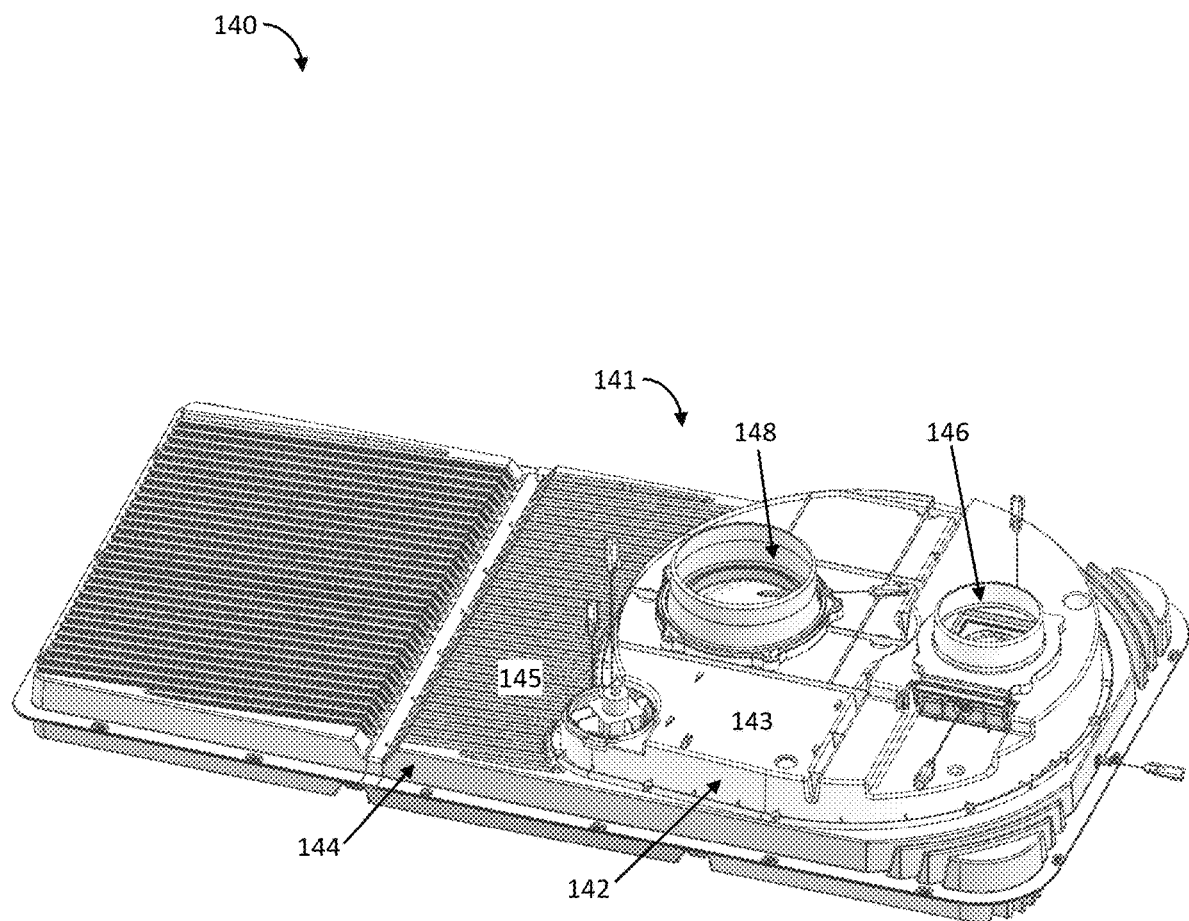
FIG. 14A illustrates a top-down perspective view of an integrated exchanger and condenser unit, according to an embodiment.
Figure 15A:
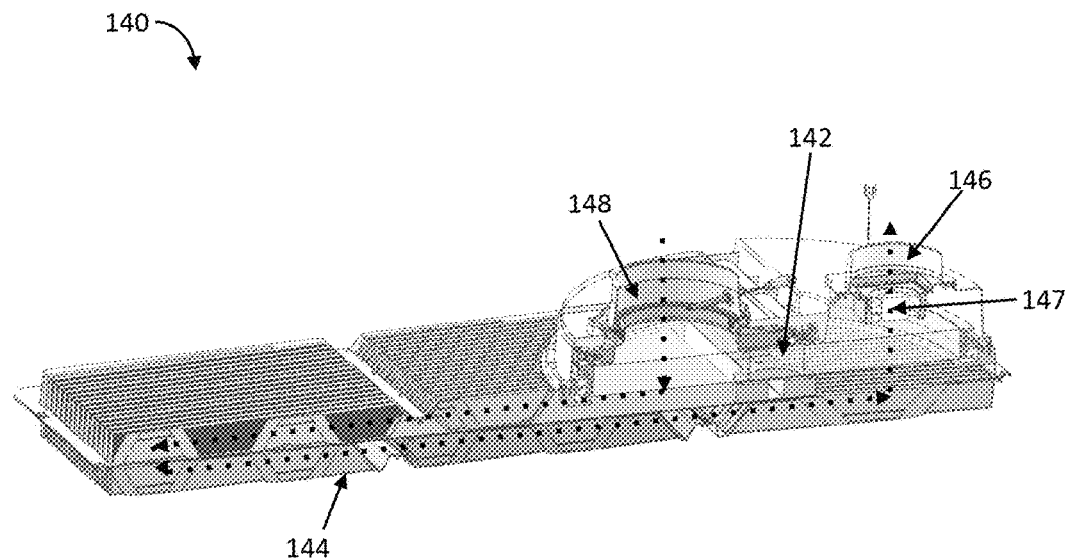
FIG. 15A illustrates a cross-sectional perspective view of an integrated exchanger and condenser unit, according to an embodiment.
Figure 15B:
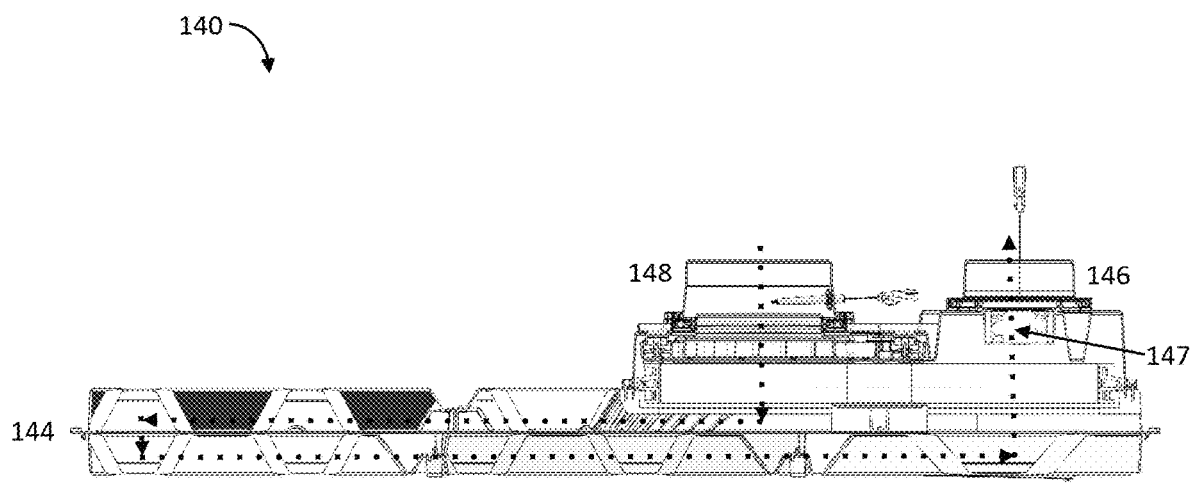
FIG. 15B illustrates a cross-sectional side view of an integrated exchanger and condenser unit, according to an embodiment.

FIG. 14A shows a top-down perspective view of the low profile or integrated exchanger and condenser unit 140 and FIG. 15A and FIG. 15B show cross-sectional views of the integrated exchanger and condenser unit 140. In various embodiments, the integrated exchanger and condenser unit 140 can comprise an energy exchanger sub-unit or component 142 and a condenser sub-unit or component 144 that are integrated or integrally formed, such that some structural components are formed or molded together, for example during the same manufacturing and/or assembly operation. The integrated exchanger and condenser unit can be formed as an integrated or combined structure, for example via extrusion, molding, casting or other desired manufacturing method. In one example, structural portions (e.g. outer integrated housing 141) of the enthalpy exchanger, energy exchanger or exchanger component (e.g., 142) and condenser or condenser component (e.g., 144) can be formed from the same material and/or during the same process. For example, a single molding process (e.g., injection molding, compression molding, thermoforming, etc.) and/or other manufacturing process can be used to produce at least a portion of an outer housing (e.g., 141) as a unitary piece. In another embodiment, a pre-formed top cover housing of an exchanger component (e.g., 143) is introduced into the manufacturing or assembly process and is permanently or removably secured to a lower housing portion of a condenser component (e.g., 144) (e.g., using a press, another molding apparatus, adhesive, screws, rivets, snap connections, other fasteners, force fit, friction fit or interference fit connections and/or the like).

In embodiments where at least a portion of the exchanger and condenser components are integrally formed, one or more benefits and advantages can be provided. For example, the integrated structure can provide a low profile or compact system. In some arrangements, integration of the exchanger component with the condenser component can reduce the overall thickness of the lower housing assembly (e.g., via a recessed rotary desiccant wheel seated in a portion of the condenser component). In addition, the integrated assembly can provide easy access to components of the lower housing assembly that may need to be serviced, replaced or maintained in the field. Furthermore, such integrated configurations can help reduce the number of portions or components of the lower housing assembly and simplify the manufacture, maintenance, complexity and/or other aspects associated with making and using the lower housing assembly. However, in other embodiments, system 100 can comprise a condenser assembly formed separately from an energy or enthalpy exchanger (if present).

In several embodiments the integrated exchanger and condenser unit 140 can be configured to transfer energy (e.g. sensible energy, latent energy, or a combination thereof) between a working gas input to the integrated exchanger and condenser unit 140 (e.g., via inlet 148) and a working gas flow output from the integrated exchanger and condenser unit 140 (e.g., via outlet 146) in a closed loop regeneration flow path. The integrated exchanger and condenser unit 140 can be configured such that energy transfer at the exchanger component 142 occurs between the uptake of water vapor by the working fluid in the solar thermal unit 110 and the condensation of water from the working fluid in the condenser or condenser component 144. As an example, the enthalpy or energy exchanger 142 can be configured to transfer heat from the working fluid entering exchanger inlet 148 to the working fluid exiting the exchanger outlet 146 such that the temperature of the working fluid is reduced prior to entering the condenser component 144. As another example, the enthalpy or energy exchanger 142 can be configured to transfer water vapor from the working fluid exiting the exchanger outlet 146 to the working fluid entering exchanger inlet 148 such that water vapor is retained within the integrated exchanger and condenser unit 140 rather than being transported back through solar thermal unit 110.

FIG. 6A depicts a block diagram of water generation system 100 comprising solar thermal unit 110 and lower housing assembly 130, for example during a regeneration operational mode. Assembled system 100 in operation is configured such that solar thermal unit 110 and lower housing assembly 130 are fixedly coupled together. In FIGS. 15A-B and FIG. 6A, a regeneration flow path (depicted in dashed lines) can be substantially closed-loop and can include multiple flow segments through system 100 including: a regeneration flow path segment within solar thermal unit 110 (e.g., as depicted in FIG. 4A-D); a regeneration flow path segment (e.g., indicated by downward dashed arrow in FIG. 6A) from the solar thermal unit 110 to the integrated exchanger and condenser unit 140, i.e. through the exchanger component 142 in advance of the condenser 144; a regeneration flow path segment (e.g., indicated by dashed lines in FIG. 15A-B) within the condenser 144; and a regeneration flow path segment (e.g., indicated by upward dashed arrow in FIG. 6A) from the condenser 144 to the solar thermal unit 110 via the exchanger component 142. During the regeneration operational mode, condenser 144 can include a liquid water production outlet 180 configured to output liquid water condensed at the condenser 144. System 100 can include one or more blowers or fans (e.g. removable cartridge fan 147) to increase or adjust the flow rate of the working fluid in the closed-loop regeneration flow pathway through the solar thermal unit 110 and integrated exchanger and condenser unit 140. During a release operational mode, the working fluid can accumulate both heat and water vapor upon flowing through solar thermal unit 110 and efficiently release the accumulated water vapor upon flowing through the integrated exchanger and condenser unit 140. A circulator, blower or fan (e.g. removable fan cartridge 147) can be seated in a portion of the integrated exchanger and condenser unit 140 and be configured to adjust the flow rate of the working gas during the release mode. Furthermore, the one or more removable fan cartridges can be configured to be easily accessible for reversible replacement, for example via an access panel or lateral panel of the lower housing assembly 130. Including removable fan cartridges may be preferable to improve serviceability of system 100.

As depicted in FIG. 6A, the exchanger component 142 is operatively coupled between the solar thermal unit 110 and the condenser 144. Furthermore, the regeneration inlet port 126 and the regeneration outlet port 128 are positioned towards a first side of a rear plane 120 of the solar thermal unit 110 above and in alignment with the regeneration inlet 148 and regeneration outlet 146 of the condenser 144, enthalpy exchanger 142 (if present), or in some implementations an integrated exchanger and condenser unit 140. The exchanger component 142 can exchange sensible energy (i.e. heat) and/or latent energy (i.e. moisture) between the working fluid in the working fluid pathways entering and exiting the exchanger component 142 (two regeneration path flow segments indicated by upward and downward dashed arrows in FIG. 6A). In other words, the exchanger component 142 can transfer energy (e.g., latent and/or sensible heat) and/or water vapor between the working fluid output from the solar thermal unit 110 and the working fluid input to the solar thermal unit 110. Furthermore, the exchanger component 142 can transfer energy between the working fluid output from the condenser 144 and the working fluid input to the condenser 144.

The exchanger component 142 can enable recovery of the sensible and/or latent energy for efficient production of liquid water by system 100. For example, the exchanger component 142 can transfer heat from a regeneration flow path segment having a higher temperature value to a regeneration flow path segment with a lower temperature value (e.g. working fluid entering exchanger inlet 148 having a greater temperature than working fluid exiting exchanger outlet 146). As another example, the exchanger component 142 can transfer water vapor from a regeneration flow path segment with a higher water vapor pressure to a regeneration flow path segment with a lower water vapor pressure (e.g. working fluid exiting exchanger outlet 146 having a greater water vapor pressure than working fluid entering exchanger inlet 148).

The exchanger component 142 can be a passive sensible heat transfer unit or component (e.g. a heat exchanger), a passive latent heat transfer unit or component (e.g. vapor transfer membrane), a passive total heat (i.e. sensible and latent heat) transfer unit or component (e.g. rotary desiccant wheel), or an active heat transfer unit or component (refrigeration unit, vapor compression cycling unit). In some implementations, both heat (i.e. sensible) energy and moisture (i.e. latent) energy is exchanged by the enthalpy exchanger 142. In other implementations, only sensible heat is exchanged, for example with a conventional heat exchanger. Sensible heat can be transferred in the form of a temperature difference between one or more regeneration flow path segments via the exchanger component 142. Latent heat can be transferred in the form of a moisture difference between different regeneration flow path segments via the exchanger component 142. In some implementations, the exchanger component 142 can comprise a plurality of sub-units, for example a separate heat exchange sub-unit and a moisture exchange sub-unit.

In various embodiments, an integrated exchanger and condenser unit can comprise one or more rotary desiccant wheels configured to transfer moisture, heat or a combination thereof from a plurality of regeneration flow path segments. In particular, the exchanger component of an integrated exchanger and condenser unit comprises a rotary desiccant wheel configured to transfer energy between the working fluid input via an exchanger inlet (e.g., 148) to the working fluid output via an exchanger outlet (e.g., 146). As depicted in FIG. 15A-B, enthalpy exchanger 142 comprises a hygroscopic wheel rotated between regeneration flow path segments, i.e. the working fluid input via exchanger inlet 148 and the working fluid output via exchanger outlet 146. The hygroscopic wheel can comprise a hygroscopic material or desiccant on a disk movable between a sorption zone and a desorption zone. In the sorption zone, the desiccant can uptake water vapor from the working fluid in a first regeneration flow path segment (e.g., working gas output via exchanger outlet 146). In the desorption zone, the working fluid in a second regeneration flow path segment (e.g., output via exchanger outlet 146) can release water vapor to the desiccant in the desorption zone of the hygroscopic wheel. In one implementation in which the system comprises an energy exchanger or component including a rotary desiccant wheel, the energy exchange rate can be varied by varying the rotation rate of the rotary desiccant wheel.

In some embodiments, solar thermal unit 110 can comprise hygroscopic material (e.g., at 118a and 118b) and enthalpy exchanger 142 is a hygroscopic wheel that can both comprise the same hygroscopic material(s). In other embodiments, hygroscopic materials are different based on the expected or intended operational ranges for each respective unit or zone of the system (e.g. the hygroscopic material(s) in the solar thermal unit 110 is different than the hygroscopic material(s) of the hygroscopic wheel of enthalpy exchanger 142). For example, the hygroscopic materials of the solar thermal unit 110 and the rotary desiccant of enthalpy exchanger 142 can have different characteristics based on water uptake mass percentage, water uptake and release rates or kinetics (in some cases as a function of exposed humidity and temperature), water uptake and release rates as a function of air flow rates, and so on. In one non-limiting example, the hygroscopic material in the solar thermal unit 110 has a higher water uptake capacity than the hygroscopic material in the rotary desiccant of enthalpy exchanger 142. In another non-limiting example, the hygroscopic material in the rotary desiccant of enthalpy exchanger 142 has a higher water uptake or release rate or faster kinetic behavior than the hygroscopic material in the solar thermal unit 110. In one non-limiting example, the hygroscopic absorber in the solar thermal unit can have slower kinetics but at a larger range of RH swing (dry to humid) with a large water vapor capacity, whereas the exchanger hygroscopic material can be tuned to operate at faster kinetics at higher RH ranges, with a lower overall mass uptake.

The condenser 144 can be configured to receive working fluid in the working fluid pathway and produce liquid water from the received fluid (e.g., by condensing water vapor in working gas in the regeneration flow path). Condensers of the present disclosure may comprise any desirable material and can be arranged into any desirable configuration (e.g., to efficiently condense water vapor in working fluid into liquid water). For example, suitable condenser structures may comprise polymers, metals, and/or the like. A condenser component or sub-unit can comprise coils, fins, plates, tortuous passages, and/or the like to improve heat dissipation of working gas flowing therethrough and improve production of liquid water.

Figure 14B:
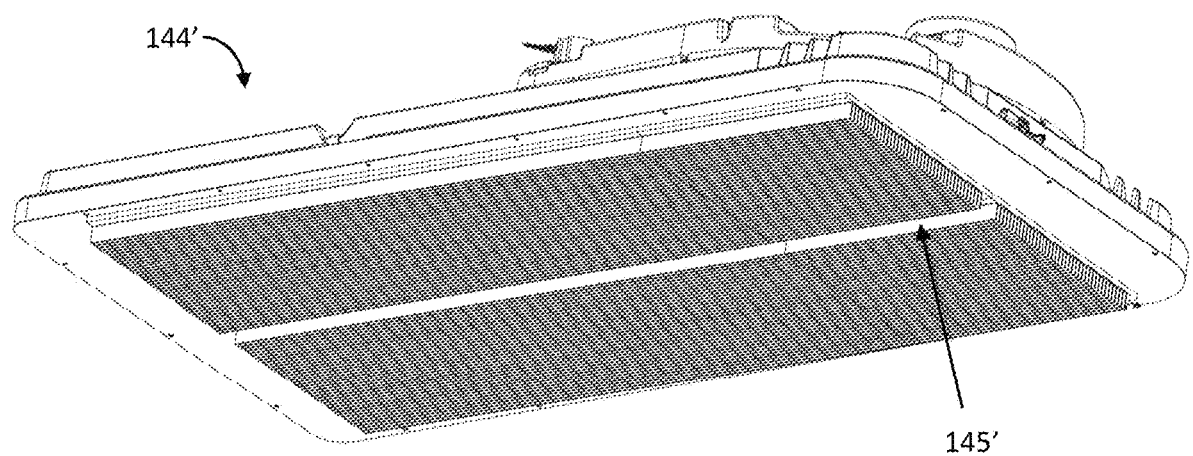
FIG. 14B illustrates a bottom-up perspective view of an integrated exchanger and condenser unit including a heat sink, according to an embodiment.
Figure 14C:
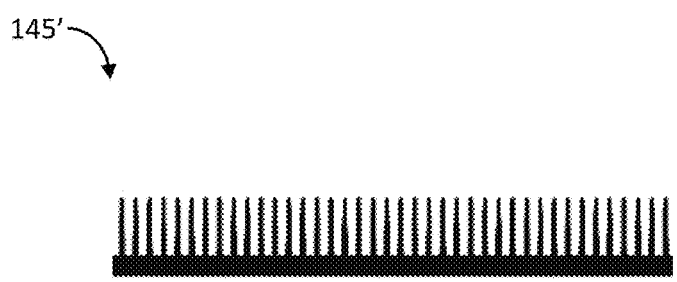
FIG. 14C illustrates a cross-sectional view of a heat sink including heat dissipating fins, according to an embodiment.

In some embodiments, the condenser (e.g., 144) and/or energy exchanger 142 (if present), can comprise a heat sink at one or more surfaces of the condenser housing (and/or exchanger housing if present). In one example, the heat sink can comprise a plurality of heat dissipating surfaces or fins. Furthermore, the water generation system can include any number of blowers or fans in any desirable location that can be in communication with the controller and configured to flow ambient air across the condenser and/or other components of the system, for example including the plurality of heat dissipating surfaces during operation. As an illustrative example, FIG. 14B illustrates a bottom-up perspective view of a condenser 144' including a heat sink 145a' having a plurality of outwardly extending heat dissipating fins at a rear surface of the condenser housing. A cross-sectional view of heat sink 145a' including a plurality of heat dissipating fins extending from a base portion is depicted in FIG. 14C. Heat sinks of the present disclosure can comprise similar or different materials as the associated condenser. In one example, the condenser housing can be formed from a polymeric material and coupled to a metallic heat sink (e.g., finned aluminum, copper, steel and/or the like) so as to maintain water quality of the produced water while exhausting heat at a high efficiency.

In the non-limiting example of FIG. 14A, a surface of condenser unit housing 145 comprises heat dissipating surface features including repeating ridges or ribs in a clamshell configuration to provide high surface area for heat transfer and condensation with minimal pressure drop. The non-limiting example of FIG. 14B depicts a heat sink (e.g., metallic heat sink) along a lower surface of the condenser housing (e.g., polymeric condenser body) to improve heat removal from the condenser. However other surface features and/or heat exhaust structures in various configurations and formed of various thermally conductive materials can be employed to improve heat dissipation for maximum heat transfer surface area and condensation collection by the condenser e.g., via ridges, ribs, protrusions, fins, heat sinks and/or the like, and in many implementations in combination with cooling fans, without departing from the spirit and the scope of this disclosure.

Turning again to FIG. 13A-B, lower housing assembly 130 includes first valve unit 150a positioned above the housing of condenser 144 and configured to be coupled to the process inlet port 122 of solar thermal unit 110. In addition, second valve unit 150b is positioned above the housing of condenser 144 and configured to be coupled to the process outlet port 124 of solar thermal unit 110. The first valve unit 150a comprises an outlet 152 configured to interface with and be coupled to process inlet port 122 and the second valve unit 150b comprises an inlet 154 configured to interface with and be coupled to process outlet port 124. The first and second valve units 150 and 150b are positioned towards one side of a top plane of lower housing assembly 130 opposite from regeneration inlet 148 and outlet 148 to provide a compact system 100 with improved accessibility of components in lower housing assembly, as will be discussed in more detail below. While the example of FIG. 13A-B shows only two valves, any desirable number of valves at every interface between the solar thermal unit and lower housing assembly can be provided without departing from the spirit and scope of this disclosure.

Each valve unit (e.g., valve unit 150a and 150b) can be configured to provide a low pressure seal (e.g. pressure less than 2 inches water or less than 500 Pa) of a corresponding port (e.g. process inlet port 122 and process outlet port 124) of a solar thermal unit (e.g., 110), for example during a regeneration operational mode wherein a working gas flows through the solar thermal unit (e.g., 110), an energy exchanger (e.g., 142) and a condenser (e.g. 144) in a closed-loop regeneration flow path. In one example depicted in FIGS. 16A and 16B, each valve unit 150a and 150b can include an inflatable valve member 156a and 156b within a valve housing 158a and 158b. FIG. 16A depicts a side cross-sectional view and FIG. 16B depicts a top-down view of valve units 150a and 150b. The inflatable valve members 156a and 156b can be configured inflate (e.g., via a connecting tube coupled to a pumping device) to restrict the flow of process gas, for example ambient air, through a passage defined by an interior member or wall 157a and 157b, thereby forming a seal, for example during a release operational mode.

As depicted in FIG. 16A-B, the inflatable valve members 156a and 156b can have an annular configuration and be formed from an elastomeric material that expands, upon inflation, to form a seal in annular passage 159a and 159b of valve housing 158a and 158b, for example during a release operational mode. However, other configurations and shapes of actuatable, compressible and/or inflatable valves are also possible without departing from the scope and spirit of the disclosure.

During a loading operational mode, one or more valve member(s) (e.g., 156a and 156b) can be in a deflated state so as to provide an open annular passage (e.g., 159a and 159b) for process gas (e.g., ambient air) to pass therethrough. As an illustrative example, a process flow path is indicated by dashed lines in FIG. 16A and FIG. 5. depicting solar thermal unit 110 and lower housing assembly 130 fixedly coupled together.

In FIG. 16A and FIG. 5, a process flow path (indicated by dashed lines in FIGS. 10A and 5) can direct ambient air into valve unit 150b via fan assembly 160. Process gas from outside system 100 can be transported into system 100, for example via fan assembly 160. In various embodiments, one or more filters can be provided to filter process gas (e.g., remove contaminants like dust and the like from ambient air) in advance of inputting into valve unit or solar thermal unit 100. For example, a porous filter layer can be included as part of the valve unit, for example filter layer 151 at inlet of valve unit 150a. During the loading operational mode, inflatable valve member 156a is in a deflated state so as to provide an open annular passage for ambient air to pass through valve unit 150a and enter process inlet port 122 of solar thermal unit 110 via valve outlet 152. Upon entering process inlet port 122, process gas can be transported through solar thermal unit 110 along a process flow path (e.g., process flow path indicated by dashed lines in FIG. 3). Upon exiting solar thermal unit 110, process gas is directed into valve unit 150b via valve inlet 154. The inflatable valve member 156b in a deflated state provides an open annular passage for process gas to pass through valve unit 150b and exit system 100, for example via another passage of fan assembly 160 or a different system exhaust location.

Another example of valving for use in a water generation system is depicted in FIGS. 16C and 16D, wherein valve unit 150' includes a movable or actuatable valve member 156' (e.g., poppet type valve) positioned within valve housing 158'. FIG. 16C depicts a perspective cross-sectional view of valve unit 150' comprising valve member 156' in an open state. FIG. 16D depicts a side cross-sectional view of valve unit 150' comprising valve member 156' in an open state (left) and a closed or sealed state (right).

During a system operation or cycling, one or more valve members (e.g., valve member 156') can be positioned in an open state so as to provide an open passage (e.g., passage 159') for process and/or regeneration gas to pass therethrough. Furthermore, valve member 156' can be configured to be positioned or move (e.g., via a central axis linear actuator 156A') to restrict the flow of process and/or regeneration gas, as depicted in the dashed lines) through passage 159' defined by an interior member or wall 157', thereby forming a seal, such as depicted in the right hand side of FIG. 16D. Valve members (e.g., valve member 156') of the present disclosure can include one or more elements or features to improve sealing, for example polymeric components or rings, compressible lips, or other surface features that sealing between two surfaces, for example a compressible ring 1560' depicted in FIG. 16C-D can be included.

Turning again to FIG. 13A-B, fan assembly 160 is positioned along an access panel or a lateral panel (e.g., east-facing side) of the lower housing assembly 130. Fan assembly can comprise a plurality of individual fans or blowers that can be activated together or separately, for example under different operational modes. In one example, a central fan 162a can be activated during a loading operational mode to transport ambient air into valve unit 150a. In another example, condenser 144 can be cooled by an ambient air flow with the aid of fans 162b and 162c which can transport air across a surface (e.g. condenser housing 145 comprising heat dissipating surface features) of the integrated exchanger and condenser unit 140, for example during the regeneration mode. In some embodiments, one or more removable flow-directing elements can be positioned in housing 132 to direct input ambient air from the lateral fan assembly 160 towards a portion of the integrated exchanger and condenser unit 140. For example, removable flow-directing elements like flow blockers 164a and 164b made of foam or a similar material, can be positioned along another access or lateral panel (e.g., north side panel 134N) and be configured to be reversibly removed, for example during a maintenance or servicing action of components within lower housing assembly 130. Furthermore, positioning fan assembly 160 along an access or lateral panel can be preferable to facilitate maintenance of compact system 100 in the field.

Figure 17:
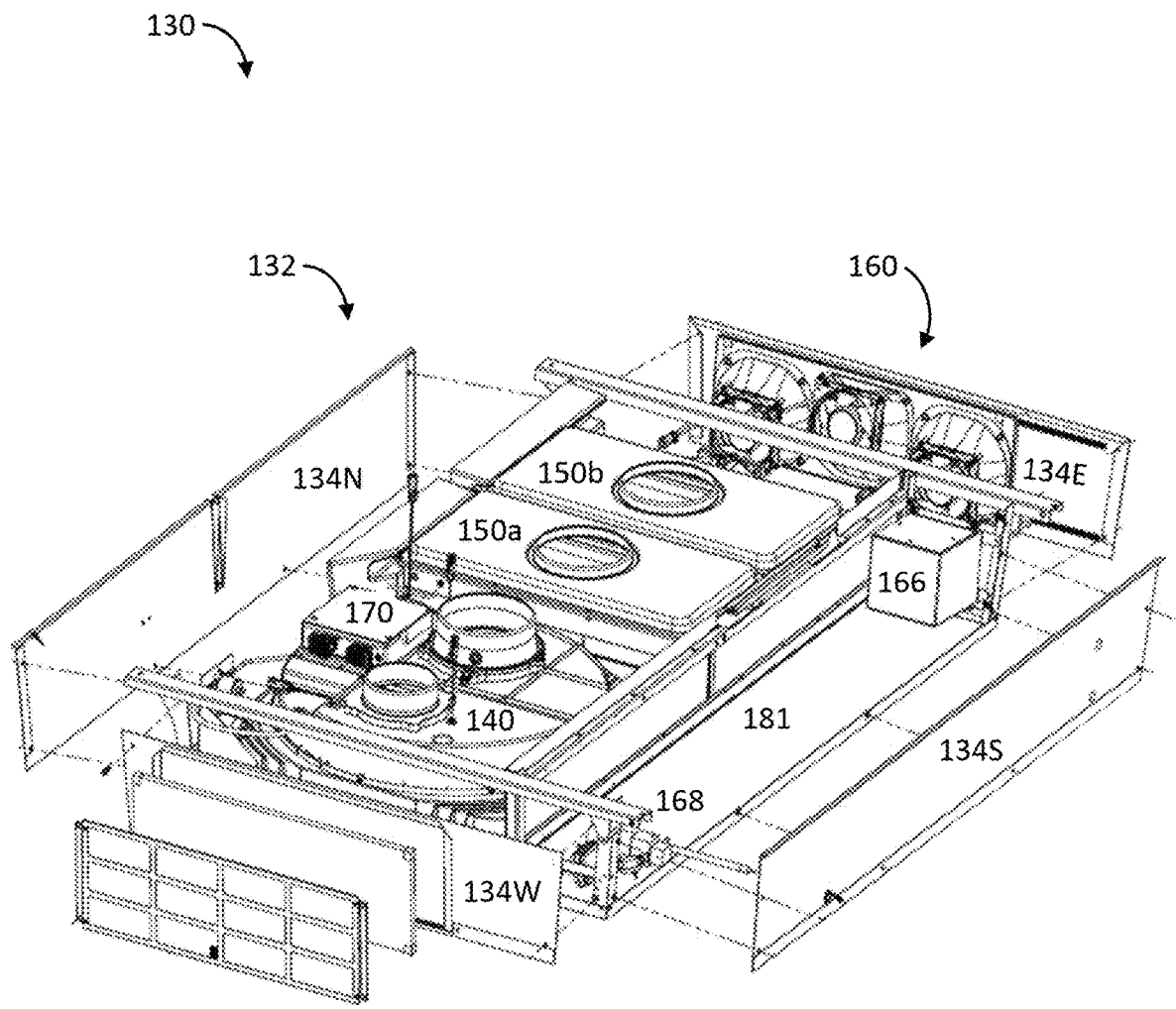
FIG. 17 illustrates an expanded view of components of a lower housing assembly, according to an embodiment.

As depicted in the expanded view of a lower housing assembly in FIG. 17, the components of lower housing assembly 130 can be arranged and configured to facilitate access for service and maintenance via lateral or access panels 134 of housing 132. For example, components commonly needing replacement or service can be accessible from a north side panel 134N, east side panel 134E, and west side panel 134W of lower housing assembly 130. As another example, a battery 166 and dispenser pump 168 for dispensing liquid water from the condenser 144 or from a water reservoir (e.g., water reservoir tank positioned at 181) for storing liquid water produced from condenser 144, can be positioned along east and west side panels, respectively. Lateral or access panels 134 of housing 132 can be provided as a solid continuous panel (e.g., 134N, 134S) or comprise permeable portion(s) for cooling or exhaust (e.g. 134W). Furthermore, components can be built into or directly facing a lateral or access panel, for example fan assembly configured to be outward facing component of lateral or access panel 134E.

The water generation systems described herein can improve the level of on-site serviceability such that failure of an internal component does not require the entire water generation system to be removed for repair or replacement. The water generation system allows improved access to components that may tend to fail due to the internal configuration of components in relation to lateral or access panels (e.g., compact integrated exchanger and condenser unit in interior of lower housing assembly) in addition to using removable elements or components (e.g., flow blockers, removable fan cartridges). As such, the water generation system offers a high level of serviceability and a robust design providing reliability even in relatively harsh or highly variable operating conditions.

The efficiency and power usage of water generation systems of the present disclosure can depend on the ambient conditions (solar insolation, ambient relative humidity and/or the like), it can be desirable to dynamically operate the water generation system and its components so as to adjust the amount of power input to system fans, pumps, heat exchangers, condensers and so on.

In various embodiments, process and/or regeneration fluid flow paths may vary based on desired system operational states (e.g., user setpoints, programmatically, water production targets, relative to other water production systems, and/or the like), variations in system operational conditions (e.g., water production rate or amount, system power state, power availability, system configuration and/or the like) and/or environmental variations (e.g., season, time of day, weather, solar irradiation and/or the like) to improve water production characteristics, for example to increase a water generation efficiency, balance or reduce a pressure drop within the system, balance efficiency of water uptake and release operations and so on.

Figure 18:
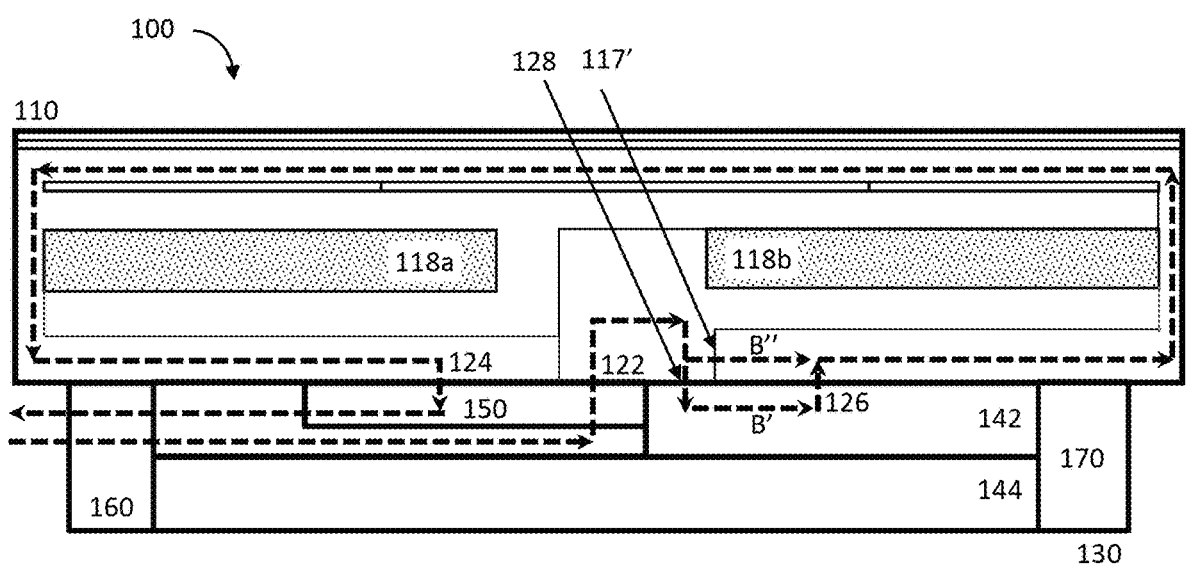
FIG. 18 illustrates a block diagram of a water generation system including a process flow path with optional flow bypass, according to an embodiment.

As an example, FIG. 18 illustrates a block diagram of a water generation system including a process flow path (indicated by dashed lines) with a flow bypass (indicated by flow segments B', B"). As depicted in FIG. 18, system 100 can be operated in a process bypass mode wherein process gas is directed through some or all of the regeneration or working fluid flow path. In a first example, ambient air can be directed from the process inlet port 122 and through the regeneration inlet port 126 to pass across an external surface of solar thermal unit 110, for example through a portion of the regeneration flow path in the lower housing assembly 130 as depicted by flow path segment B'. In some implementations, process gas can flow through at least a portion of portion of exchanger component 142 (if present) and/or condenser 144. The process gas can re-enter the solar thermal unit 110 via regeneration inlet 126, through the top glazing layers and exit the solar thermal unit 110 via process outlet port 124. In the process bypass mode, a regeneration fan (e.g., fan 147 of lower assembly 130) can be activated to transport process gas into at least a portion of the regeneration flow path (e.g., valve units 150a and 150b can be in an unsealed or open state). As another example, system 100 can operate in a bypass mode wherein process gas (e.g., ambient air) is directed from the process inlet port 122, across one or more openings in a flow director (e.g., baffle 117') as depicted by flow path segment B". In one operational example, if the ambient relative humidity is greater that the humidity of the regeneration fluid exiting the solar thermal unit (e.g., at regeneration outlet port 128), it may be preferable to generate water directly from ambient air (rather that via hygroscopic material in the solar thermal unit from a prior loading mode).

Figure 19:
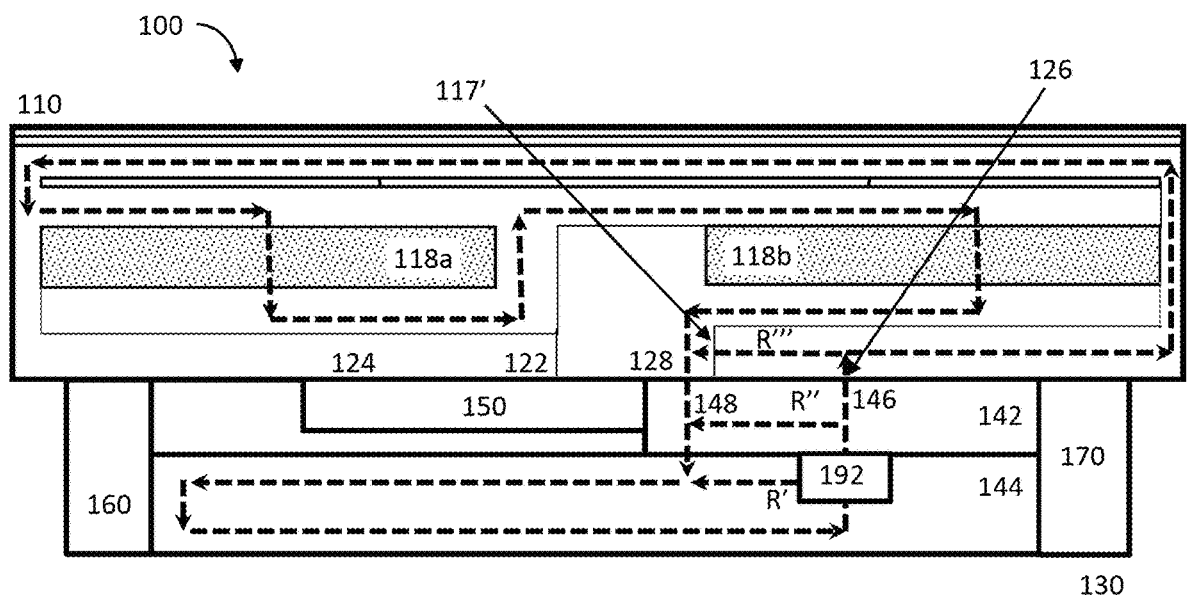
FIG. 19 illustrates a block diagram of a water generation system including an optional recirculation or bypass regeneration flow path, according to an embodiment.

As another example depicted in the block diagram of FIG. 19, a water generation system can include one or more recirculation or bypass regeneration flow paths wherein at least a portion of regeneration gas is redirected or recirculated through condenser 144 (and/or energy exchanger 142 if present) in advance of flowing through the full regeneration flow path of solar thermal unit 110. In one implementation, at least a portion of regeneration fluid can be directed to recirculate in condenser 144 in advance of flowing into solar thermal unit 110 via inlet 126, for example as indicated by optional flow segment R' or R". In implementations where the system comprises an enthalpy exchanger (e.g., 142), at least a portion of regeneration fluid can be directed back to condenser either before enthalpy exchanger 142, as indicated by optional flow path segment R', and/or subsequent to flow through enthalpy exchanger 142, as indicated by optional flow segment R". In some implementations, at least a portion of regeneration fluid can be directed back to condenser 144 via a partial segment of recirculation fluid flow path in solar thermal unit 110, for example as indicated by optional flow segment R'''.

Various configurations and flow directing elements are possible. In one illustrative example, a baffle (e.g., 117') can include openings or slots to allow at least a portion of the recirculation fluid flow back towards lower assembly 130, and more particularly condenser 144. Openings or slots in baffle 117' can be static or dynamic. For example, baffle 117' can be configured as a static vertical bar with slots and a circulating fan can drive a portion of the regeneration fluid flow through slots, for example such that higher power to a recirculating fan increases the portion of regeneration fluid flowing back towards condenser. The particular location and configuration of fan(s) and flow elements (like baffles, porous absorbers, etc.) can force or drive the regeneration fluid to recycle or recirculate back to the condenser (for example, backpressure or resistance to flow from absorber 118b can force regeneration fluid toward condenser rather than upwards through solar thermal unit). Additionally, the rate of flow circulation directed by system fan(s) can be modulated to change the recirculating flow rate and/or amount of regeneration fluid returned to the condenser. As another example, one or more system fans or circulators can be operated to impose or drive different regeneration fluid flow rates at different segments of the regeneration fluid flow path. For example, the regeneration fluid flow rate through the solar thermal unit can be lower than regeneration fluid flow through the condenser.

In some embodiments, moisture or water vapor in regeneration fluid can be recycled or recirculated back to the condenser by mixing the outlet of the condenser with incoming new moisture flux from the solar thermal unit. As an illustrative example, the flow rate of the regeneration fluid through the condenser can be set at approximately 100 CFM. At the outlet of the condenser, approximately 50% or 50 CFM could be directed back to the condenser with the balance 50 CFM continuing to the solar thermal unit. A system controller can modify the ration of regeneration flow between condenser and solar thermal unit, for example based on ambient conditions and/or system conditions (e.g., regeneration fluid temperature, regeneration fluid humidity, water production, etc.). As an illustrative example, a controller can determine if the regeneration fluid output from the condenser is above a predetermined humidity threshold and, in response, increase or divert flow of the regeneration fluid into the condenser so as to circumvent or "disadvantage" water uptake of the regeneration fluid in the solar thermal unit. As another example, a controller can determine if the regeneration fluid output from the condenser is below a predetermined humidity threshold and, in response, increase flow through the solar thermal unit and/or decrease or stop recycling regeneration flow back into the condenser so at to enable more water uptake into regeneration fluid in the solar thermal unit, thereby cycling more moisture out of the system, while reducing the regeneration flow through the condenser to increase humidity in the condenser.

In some implementations, the system can compromise an active or passive flow diverters (e.g., 192) configured to direct at least a portion of regeneration fluid output from the condenser unit back into the regeneration fluid flow input to the condenser unit so as to recycle or recirculate regeneration fluid in advance of flowing into the solar thermal unit. In one example, flow diverter 192 can comprise a T-valve, door, flap or other flow element operable to selectively or automatically move, swing, or alternate between a plurality of states (e.g., open, partially open, closed and so on) in order to allow at least a portion of regeneration fluid to pass from outlet of condenser to inlet of condenser 144 rather than flowing into solar thermal unit 110. The flow diverter can be programmatically, automatically, or selectively controlled (e.g., between an open, partially open and closed positions) by signals sent from controller 170. In some embodiments, one or more flow diverters (e.g., 192) can be opened by incremental amounts to allow more or less regeneration fluid to return (e.g., via a return duct) into the condenser 144. By controlling when and in what amount of regeneration fluid is returned or recirculated to condenser 144, the system can control for greater amounts of water condensate from water vapor that would be normally sent to the solar thermal unit for additional heating and/or water uptake, thereby enabling the water generation system to handle increased amounts of water or absolute humidity in the regeneration fluid, and therefore increased water production, without requiring an increase in additional heat or water transfer into regeneration fluid from solar thermal unit, water uptake and/or greater operational power requirement.

The operation of recirculating regeneration fluid from an outlet to an inlet of the condenser can increase the total amount of water produced by the system or water production rate instantaneously, periodically and/or over the course of a time period or cycle, for example a day. For example, the system can operate by recirculating regeneration fluid to the condenser (e.g., by activating flow diverter 192) during an initial or mid-portion of an unloading cycle (e.g., morning or midday hours) when the absolute humidity of the regeneration fluid flowing in regeneration fluid flow path and/or temperature of the regeneration fluid may be highest. Towards the end of the unloading cycle (e.g., late afternoon hours), the system can decrease or end recirculation of regeneration fluid to the condenser (e.g., by inactivating flow diverter 192) when the absolute humidity of the regeneration fluid flowing in regeneration fluid flow path is reduced, for example after the majority of water over the cycle has been released and condensed.

As an example, a recirculation flow diverter can direct greater than 10% or 20% of the regeneration fluid flow back to the condenser. In another example, the recirculation flow diverter can direct approximately between 20-80% of the regeneration fluid flow back to the condenser. In some embodiments, the system can initially direct a higher amount (e.g. 50-100%) of the regeneration fluid flow back to the condenser and then decrease the amount of recirculating regeneration fluid flow (e.g., 0-50%) over the course of an unloading cycle, at a predetermined time later in the unloading cycle and/or after a threshold system operational state is reached (e.g., humidity of regeneration fluid, power availability, and/or the like). Alternatively, the system can direct a limited amount (e.g., 0-50%) of the regeneration fluid flow back to the condenser and then increase the amount of recirculating regeneration fluid flow (e.g., 50-100%) over the course of an unloading cycle, at a predetermined time later in the unloading cycle and/or after a threshold system operational state is reached (e.g., humidity of regeneration fluid, power availability, and/or the like). Furthermore in some implementations, a recirculation flow diverter can vary the portion of recirculation fluid recirculated to condenser over the course of an unloading cycle, for example based on varying environmental conditions (e.g., solar irradiance) or system operational states (e.g. system water content and/or power availability). In yet another example, the flow diverter can direct approximately between 40-60% or about 50% of the regeneration fluid flow back to the condenser during a predetermined time lapse in the unloading cycle or the full duration of an unloading.

In some embodiments, a controller (e.g., 170) can determine if and/or when at least a portion of regeneration fluid should be directed or diverted back to the condenser unit (e.g., 144), for example based on a change or reaching a threshold humidity of the regeneration fluid, time of day and so on. Furthermore, a controller (e.g., 170) can determine a recirculation portion, amount or flow rate of regeneration fluid to direct or divert back to (e, g. via flow diverter 192) the condenser unit (e.g., 144). The controller (e.g., 170) can activate or actuate the flow diverter (e.g., 192) to direct the determined portion of the regeneration fluid back to the condenser (e.g., 144) in advance of flowing through the solar thermal unit (e.g., 110). In various implementations, the controller can be configured to determine if, when and to what extent a recirculation portion of regeneration fluid is diverted back to the condenser based on a temperature of the regeneration fluid, a relative humidity of the regeneration fluid, an absolute humidity of the regeneration fluid, a pressure of the regeneration fluid, a solar insolation, a solar irradiance, an ambient temperature, an ambient humidity, a water production rate, an amount of water produced, a time of day, an elapsed time, a predetermined schedule, a system water content, a system power state, or combinations thereof. For example, the controller can estimate or determine an absolute humidity or temperature of the regeneration fluid flowing in the regeneration fluid path is above a predetermined threshold (e.g., via a sensor, via a calculation or estimation based on amount of produced water and/or the like). In response to determining the absolute humidity of the regeneration fluid or temperature is above the predetermined threshold, the controller can actuate the flow diverter (e.g., 192) to direct at least a portion (e.g., 50%) of the regeneration fluid back to the condenser.

In addition to alternative flow paths, heat dissipating features, heat exhaust approaches and/or active or passive flow directing elements, additional components can be included to improve water production efficiency, for example, to improve the efficiency of the condenser for the production of water from the regeneration flow path. This can be advantageous, for example when the system is in a high system water content states such that the hygroscopic materials of the system and/or the regeneration fluid are water rich (e.g., high absolute humidity, high equilibrated humidity or equilibrated water content of hygroscopic materials) to balance the efficiency of water release relative to water uptake. In some operational conditions or system states, water condensation can limit water production rather than water uptake or other system functions being limiting. In such states, it may be preferable to boost or improve the systems water condensation efficiency, for example by providing additional power to the condenser and/or enthalpy exchanger (if present).

In some embodiments, an air-cooled condenser (e.g., formed from plastic and/or metallic materials) can condense water from the regeneration fluid of the regeneration flow path, and in some implementations, the system powers (e.g., via onboard PV or battery) one or more blowers or fans (e.g., fan assembly 160) to flow ambient air over the condenser, thereby improving heat transfer, condenser efficiency and therefore water production. In such implementations, ambient air cools (via heat transfer across condenser housing) hot regeneration fluid flowing through the condenser in order to extract water and excess heat is exhausted to the outside environment.

In other embodiments, the condenser can be cooled via liquid water or coolant flow inside and/or outside the condenser. Coolant or water-cooled condensers can be configured as conventional tube-and-fin, shell-and-tube, plate-type or similar heat exchangers in which a radiator, cooling tower and/or other external cooling source cools the regeneration fluid flowing in condenser. Tube-and-fin heat exchange condensers can be formed from highly thermally conductive materials such as copper and aluminum. In such implementations, the regeneration fluid and the cooling water do not directly contact each other, but rather flow in separate passageways within the heat exchanger or condenser having designed for close contact for efficient heat transfer. The coolant or cooling water can flow over and/or inside conduits or tubes to absorb the heat from the regeneration fluid so as to reduce the regeneration fluid flow temperature to below the dew point of the regeneration fluid, thereby condensing water on the regeneration fluid-side of the condenser.

While ambient air-cooled condensers of the present disclosure can be simple in design and easy to manufacture, low heat transfer performance can limit water production rates of the system. Some systems can therefore include condenser units having improved heat transfer performance in order to improve water production rates. For example, systems of the present disclosure can include a liquid coolant or water-cooled condenser, for example provided in a cross-flow heat exchange configuration. Such condensers can include metallic (e.g., copper, aluminum) conduits, tubes and/or heat dissipating surfaces (e.g., fins) to cool the regeneration fluid more efficiently than air-cooled condensers and/or condensers formed from polymeric materials, thereby improving water production.

In various embodiments, water generations systems of the present disclosure include a condenser or condenser assembly configured for high water production efficiency via water vapor condensation from a regeneration fluid. Unless otherwise specified below, the numerical indicators used to refer to components in FIG. 20-25 can be similar to those used to refer to components or features in FIGS. 1-10 and 13-19 above, except that the index has been incremented by a multiple of 100.

Figure 20:
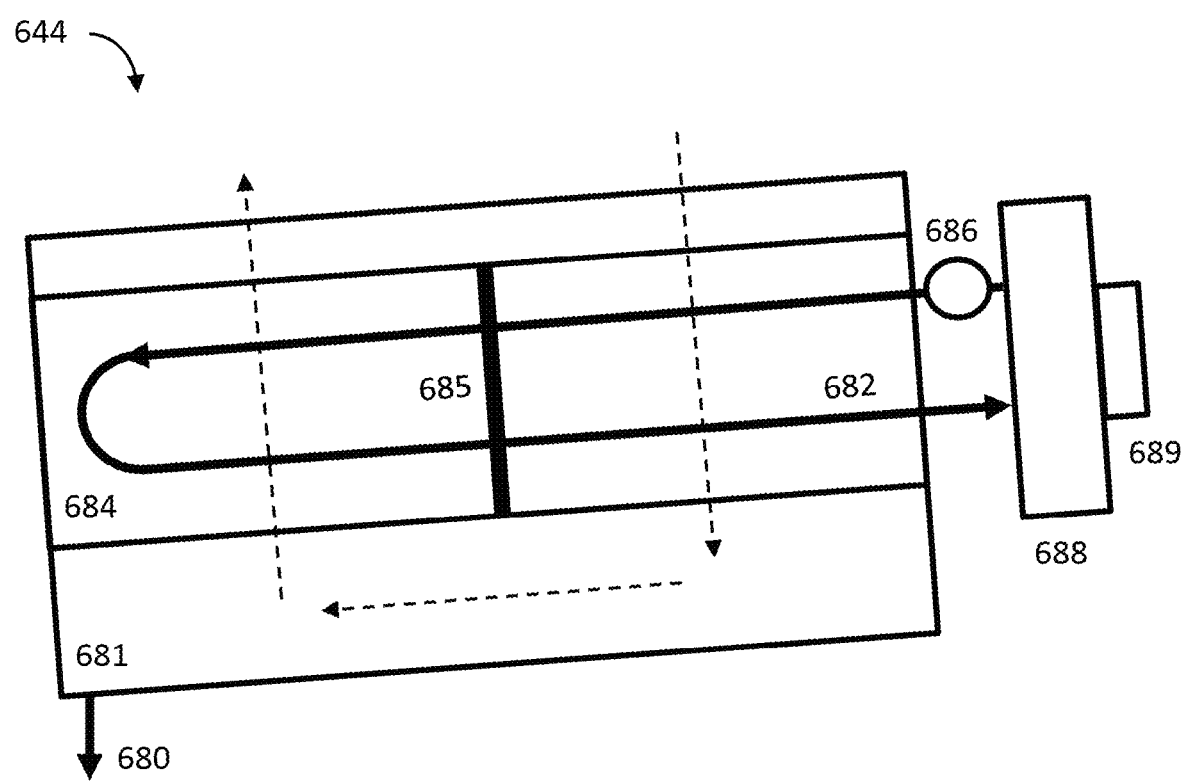
FIG. 20 illustrates a block diagram of a lower assembly including a condenser with a cooling fluid conduit during a release or unloading operational cycle, according to an embodiment.

FIG. 20 illustrates a block diagram of a condenser 644 including a cooling fluid cooling fluid distribution network configured to direct a cooling fluid (e.g., cooling liquid like water or a water-based solution) flowing in a cooling fluid path through cooling conduit, tube(s) or coil(s) 683 extending in the regeneration fluid flow path (indicated by dashed lines) of the condenser 644. During a release or unloading operational cycle, condenser assembly 644 can cool regeneration fluid flowing in the regeneration fluid path below the dew point so as to condense water vapor therefrom and collect liquid water in reservoir 681. Accordingly, the regeneration fluid transfers heat to the cooling fluid flowing in cooling conduit 682 upon flow through regeneration fluid flow chamber 684 of condenser 644 configured to allow condensate from the regeneration fluid to flow downward to produced water reservoir 681. The cooling fluid can be directed through cooling conduit 682 via one or more pumping devices, such as pump 686, configured to pump the cooling fluid through the cooling fluid distribution network. In some embodiments, the system can comprise a radiating unit 688 configured to exhaust heat collected by the cooling fluid to an exterior of the system via thermal radiation, convection, phase change and/or conduction. In operation, heat can be collected from the regeneration fluid flowing through the condenser by the cooling fluid flowing through cooling conduit loop, then released to the ambient environment through the radiating unit 688. Radiating units of the present disclosure can circulate the cooling fluid through conduits with or without heat dissipating surfaces increasing surface area for heat transfer (e.g., fins) that can be exposed to the ambient environment and/or cooler portions of the system and can be provided in any desirable configuration. Furthermore, in some implementations, one or more blowers or fans (e.g., 689) can actively flow ambient air across the radiating unit 688, for example by actively cooling the cooling fluid via radiator fan 689. Various cooling fluids can be employed including but not limited to liquid water produced by the system, a water-based coolant solution, a glycol solution, an organic oil, a mineral oil, a refrigerant or a combination thereof.

Figure 21:
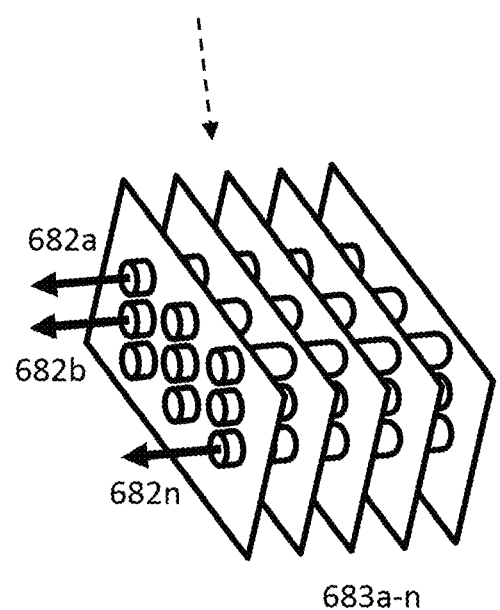
FIG. 21 illustrates a portion of a cooling fluid distribution network during a release or unloading operational cycle, according to an embodiment.

FIG. 21 illustrates a portion of a cooling fluid distribution network, such as provided within regeneration fluid flow chamber 684, wherein a plurality of cooling conduits 682*a-n* are arranged perpendicular to a plurality of fins 683*a-n* extending parallel to the regeneration fluid flow direction (indicated by dashed line) within regeneration fluid flow chamber (e.g., 684) of condenser assembly (e.g., 644). During operation, the fluid in cooling conduits is at a temperature lower than the regeneration fluid dew point temperature such that water vapor in regeneration fluid condenses on the regeneration fluid flow side of the cross-flow heat exchanger. While FIG. 21 depicts a cross-flow heat exchange implementation wherein cooling conduits 682*a-n* are situated in a plane perpendicular to the regeneration fluid flow direction (indicated in dashed line), other configurations are also possible. In addition, cooling fluid flow through conduits 682*a-n* may not be unidirectional as depicted for simplicity, but cooling fluid flow can alternate back and forth across fluid distribution network, for example via winds, turns or coils along one or more cooling fluid conduits.

In various embodiments, condenser cooling fluid distribution networks of the present disclosure can comprise one or more metallic (e.g., Al, Cu, Fe, alloys thereof) finned cooling conduits arranged into one or more cooling circuits within a regeneration fluid flow chamber, each cooling circuit comprising an inlet port for inputting cooling fluid to the cooling circuit and an outlet for outputting cooling fluid from the cooling circuit.

Figure 22A:
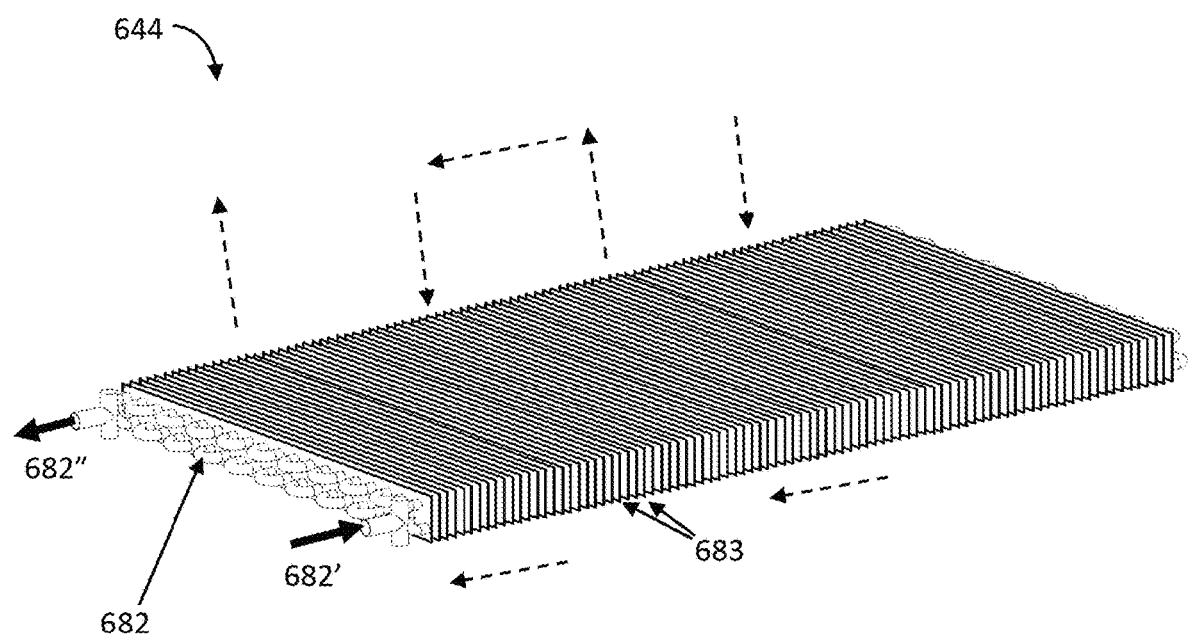
FIG. 22A illustrates a portion of a condenser including horizontal cooling conduits in a tube-and-fin configuration, according to an embodiment.

As another example, FIG. 22A illustrates a portion of a condenser, such as condenser 644, including a tube-and-fin configuration. As illustrated, cooling fluid enters conduit network 682 via inlet 682' to flow through cooling fluid distribution network comprising conduit 682 before exiting via outlet 682". Conduit 682 can be provided as a circuitous coil of alternating conduit rows spaced through a plurality of heat dissipating fins 683 (e.g., metal like aluminum or aluminum alloy fins). In the non-limiting example shown, inlet 682' can split cooling fluid flow between two layers of conduits (e.g., upper and lower copper tubes) and rejoin at outlet 682', for example to minimize pressure drop and/or work required by pump for cooling fluid flow.

The exemplary embodiment depicted in FIG. 20 shows the regeneration fluid flow path (indicated by dashed lines) including a single turn or reversal through regeneration fluid flow chamber 684 of condenser assembly 644 for simplicity. Another exemplary embodiment depicted in FIG. 22A shows the regeneration fluid flow path (indicated by dashed lines) including three turns or reversals, for example directed via three flow directing elements or baffles in condenser 644. However, many other configurations are also possible. It can be preferable for the regeneration fluid and/or cooling fluid to flow through tortuous, alternating, and/or high surface area features in regeneration fluid flow chamber 684 of condenser assembly 644, for example via multiple winds, turns, coils, tortuous passages, walls, baffles and/or high surface area features to maximize water vapor condensation.

Figure 22B:
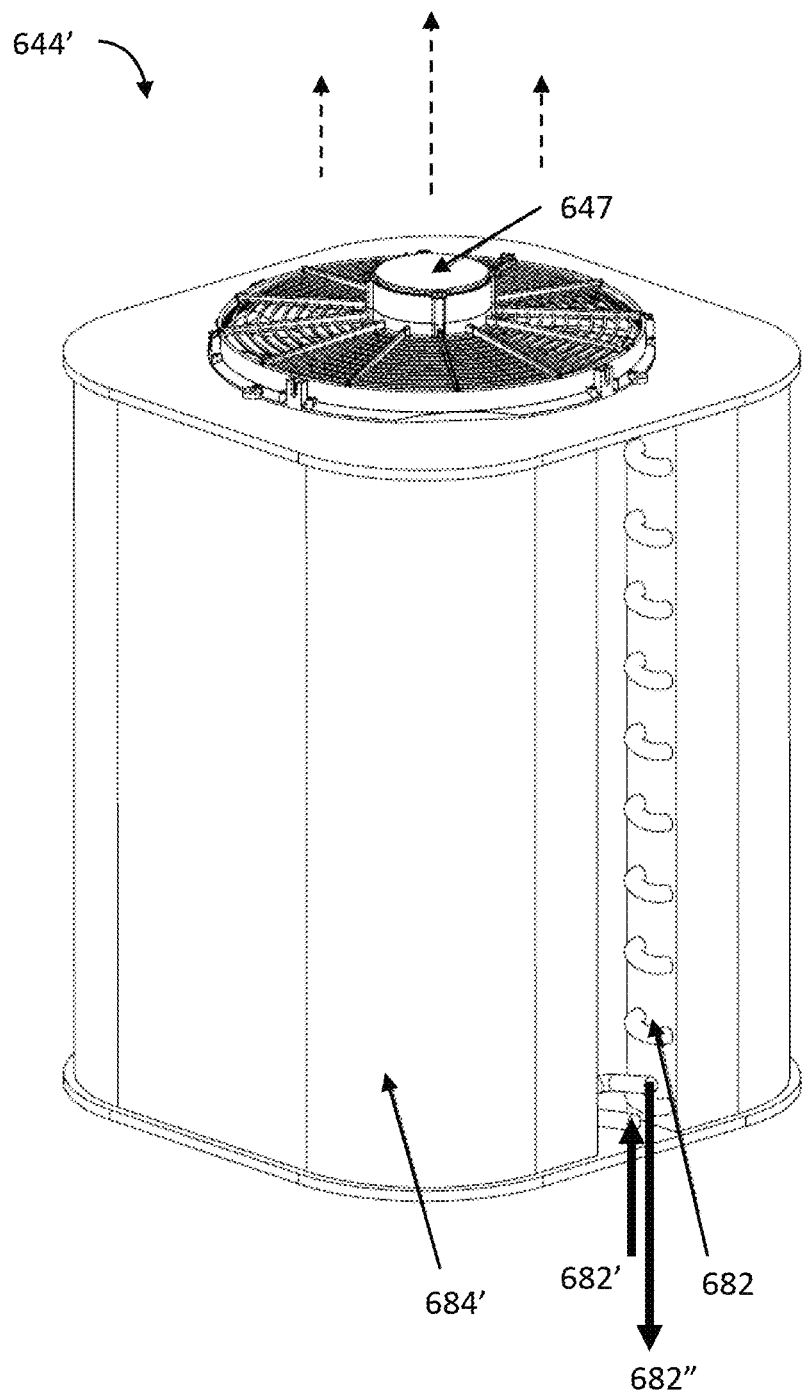
FIG. 22B illustrates a portion of a condenser including a vertical coil configuration, according to an embodiment.

As another illustrative example, FIG. 22B illustrates a portion of a condenser having a vertical coil configuration. As illustrated, the regeneration fluid flows upward, via fan 647, through condenser assembly 644' such that at least a portion of the regeneration fluid flow path (indicated by dashed lines) flows through a center portion of regeneration fluid flow chamber 684' surrounded by a cooling fluid distribution network. As illustrated, cooling fluid enters conduit network 682 via inlet 682' to flow through cooling fluid distribution network before exiting via outlet 682". Conduit 682 can be provided as a circuitous coil of vertically spaced conduit rows as depicted, although other configurations are also possible. In some embodiments, it may be preferable to provide larger or "oversized" cooling conduits in combination with a smaller, low power or "undersized" fan to for system operation with reduced or minimal power consumption by fan(s) for circulating regeneration fluid. For example, the cost of "oversized" cooling conduit materials provided in a small or compact system can be acceptable to reduce power consumption for circulating the regeneration fluid therethrough. However in other embodiments, it can be preferable to utilize smaller or "undersized" cooling conduits, for example in a larger system, in combination with a larger or "oversized" fan(s) to reduce material cost and/or when system operational conditions allow for higher power consumption of fan(s).

Condensers and condenser assemblies of the present disclosure may comprise any desirable material and can be arranged into any desirable configuration to maximize water vapor from regeneration fluid while maintaining high water quality or purity. Suitable condenser structures can be formed from various types of polymers, metals, and combination thereof. Furthermore, condensers of the present disclosure can comprise coils, loops, fins, plates, tortuous passages, high surface areas and/or the like to improve heat dissipation of regeneration gas flowing therethrough, thereby improving production water from air.

Figure 23:
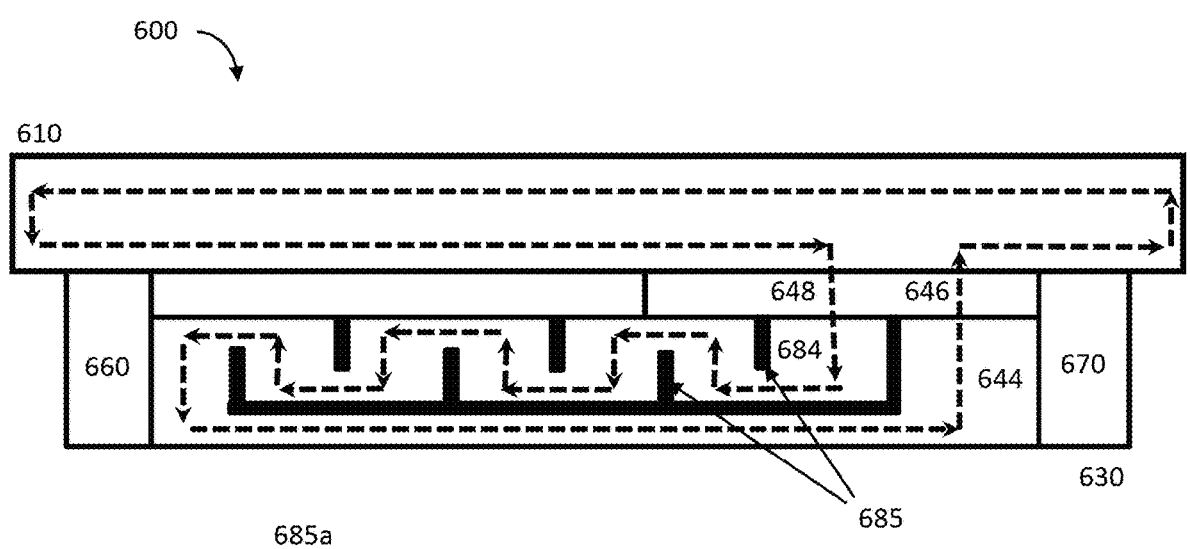
FIG. 23 illustrates a block diagram of a water generation system including a regeneration flow path through a condenser during a release or unloading operational cycle, according to an embodiment.

As another illustrative example, FIG. 23 illustrates a block diagram of water generation system 600 including regeneration flow path (indicated by dashed lines) through solar thermal unit 610 and condenser 644 during a release or unloading operational cycle. As depicted, regeneration fluid flows through the regeneration fluid flow chamber 684 divided into a plurality of parallel or alternating flow sections or channels defined by separators, surfaces, walls, or baffles 685 arranged to increase condensation of water from regeneration fluid flowing through regeneration fluid flow

684 of condenser 644 in a closed-loop regeneration flow path, for example during the release operational mode.

In addition to heat dissipating features, heat transfer features, tortuous flow paths, heat exhaust approaches and active or passive flow directing elements within the system, the present disclosure provides for various control approaches for maximizing water production via condensation of captured water from the working or regeneration fluid. This can be particularly advantageous as the ambient environmental conditions and system states vary over the course of operation. Across different operational conditions and system states, different system functions can limit or constrict water production. Therefore, a system controller (e.g., 170) can alter system operational setpoint(s) in response to a user input, programmatically, changes or forecasts in internal or external conditions so as to increase water production, for example by providing additional power to fans, circulators, pumps and/or the like.

In one example, a system controller (e.g., 670) can determine if and/or when a cooling fluid is directed through a condenser assembly (e.g., 644), for example based on or in response to a change or threshold temperature or humidity of the regeneration fluid, time of day, amount of water produced, a solar insolation or irradiance and/or the like). Additionally, the controller can determine a cooling fluid flow rate or power input level, for example applied to a pump (e.g., 686) and/or cooling fan (e.g., 689). The controller can actuate a pump and/or fan to direct the cooling fluid across or through cooling conduits of the condenser at the determined cooling fluid flow rate.

In various implementations, the controller can be configured to determine if, when and/or to what extent a condenser is cooled, for example via pumping a cooling liquid and/or cooling gas flow, based on a temperature of the regeneration fluid, a relative humidity of the regeneration fluid, an absolute humidity of the regeneration fluid, a pressure of the regeneration fluid, a solar insolation, a solar irradiance, an ambient temperature, an ambient humidity, a water production rate, an amount of water produced, a time of day, an elapsed time, a predetermined schedule, a system water content, a system power state, or combinations thereof.

In an example, the controller can determine if a solar insolation, system water content (e.g., absolute humidity of regeneration fluid, equilibrated water of hygroscopic materials or the like) or temperature of the regeneration fluid flowing in the regeneration fluid flow path is above a predetermined threshold (e.g., via a sensor, via calculation or estimation based on amount of captured or produced water and/or the like). In response to determining the solar insolation, system water content or regeneration fluid temperature is above the predetermined threshold, the controller can actuate a pump (e.g., 686) and/or fan (e.g., 689) to flow a cooling fluid across or through the condenser.

As another example, the controller can determine a system power availability or if a system power state is above a predetermined threshold, for example, if a system battery state-of-charge (SOC) is above a predetermined threshold, if PV power is above a predetermined threshold, if a forecast solar insolation is above a predetermined threshold and/or the like. In response to determining the system power state is above the predetermined threshold, the controller can actuate a pump (e.g., 686) and/or fan (e.g., 689) to flow the cooling fluid across or through the condenser.

Figure 24:
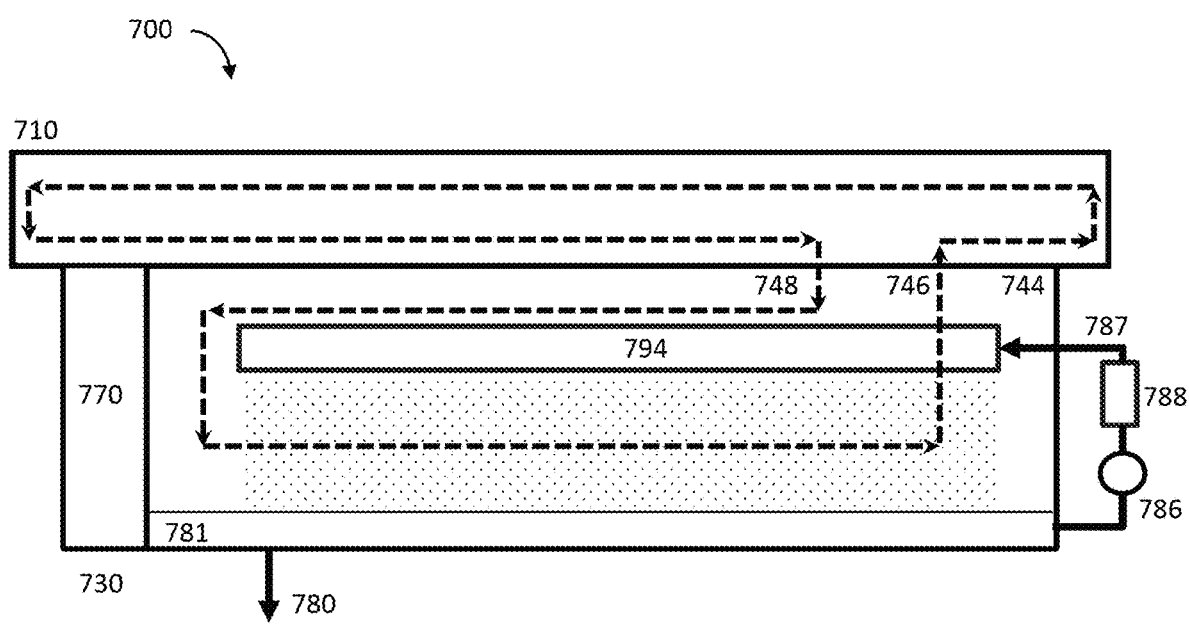
FIG. 24 illustrates a block diagram of a water generation system including a regeneration flow path through a condenser including an atomization unit during a release or unloading operational cycle, according to an embodiment.

The present disclosure provides for various operational approaches to drive condensation of water vapor from the regeneration fluid, thereby maximizing water production of the system across a range of environmental conditions. As another example, FIG. 24 illustrates a block diagram of a water generation system 700 including a regeneration flow path (indicated by dashed lines) through a solar thermal unit 710 and a condenser 744 including an atomization assembly. The atomization unit 794 can be configured to spray a liquid, for example liquid water, into at least a portion of the regeneration fluid flow path of the condenser 744 upon flow of regeneration fluid therethrough. In some implementations, the atomization unit 794 can spray liquid water, for example water produced by the system, into the regeneration fluid. Upon contact or mixing with the regeneration fluid, the regeneration fluid can be cooled such that water condensate from the regeneration fluid is collected, for example via downward flow to liquid water reservoir 781. In some embodiments, a pumping device, such as pump 786, can flow the liquid water, for example from reservoir 781, to atomization unit 794. In some implementations, the atomization fluid or liquid water can be cooled before atomization or spraying, for example via radiating unit and/or fan assembly indicated by unit 789.

In the present disclosure, various types and configurations of atomization units or spray devices can be employed. For example, atomization units of the present disclosure can include one or more spray, mist or fogging nozzle(s), mechanical plate atomizers(s), mechanical disk atomizer(s), perforated plate mixer(s), corrugated plate mixer(s) and/or the like. Spray-type atomization units can comprise spray nozzle(s) coupled to a water pump configured to circulate water, such as water from reservoir 781. Regeneration fluid entering the condenser chamber contacting cooled sprayed water from the nozzle(s) results in heat transfer between the sprayed water and the regeneration fluid such that water vapor in the regeneration fluid is chilled below the dew point. It can be preferable for the atomization unit to be configured to spray cooler water and/or smaller droplet sizes to improve heat transfer efficiency.

Figure 25A:
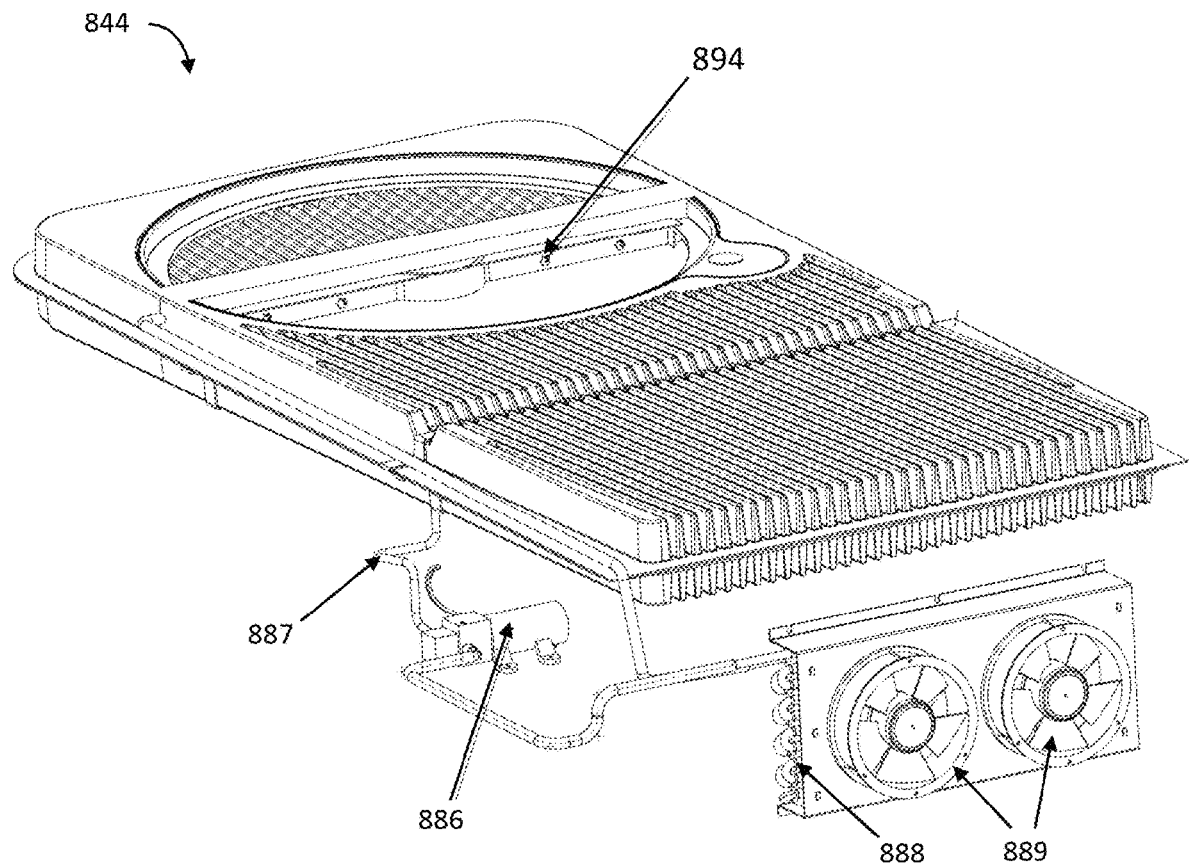
FIG. 25A illustrates a top-down side perspective view of a condenser comprising an atomization unit, according to an embodiment.
Figure 25B:
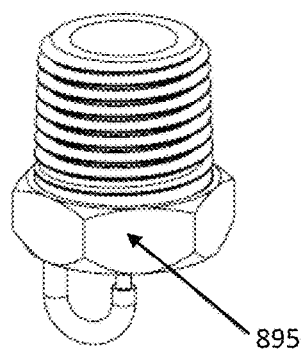
FIG. 25B illustrates an atomization nozzle, according to an embodiment.

An atomization unit can be integrated with a condenser or condenser assembly in a compact, low profile and/or modular format or configuration. An example of an atomizing condenser comprising atomization nozzles is shown in FIG. 25A and FIG. 25B. FIG. 25A illustrates a top-down side perspective view of atomizing condenser 844, FIG. 25B illustrates a magnified view of atomization nozzle 895. Condenser 844 comprises an atomization unit 894 including four spray nozzles provided along regeneration fluid inlet of the condenser, a pump 886 configured to direct water through nozzles 895 and a radiating unit 888 with cooling fan 889. The atomizing condenser 844 can be operable to flow liquid water through one or more atomization conduits 887 into spray nozzles 895 of atomization unit 894. As depicted, the liquid water can be cooled via radiating unit and/or fan 889 before atomization or spraying into regeneration fluid entering or within condenser.

In various embodiments, a system controller (e.g., 170) can set or adjust system operational setpoints in response to a user input, programmatically, and/or changes or forecasts in internal or external conditions so as to increase water production, for example by providing additional power to atomization devices, fans, circulators, pumps and/or the like. For example, a system controller can be configured to actuate the atomization unit, for example during an unloading cycle, to atomize liquid water in the condenser at a determined atomization rate. Furthermore, the controller can determine or adjust the atomization rate or atomization characteristics like droplet size, for example via adjusting power to pump 886 and/or cooling system 888/889, based on a temperature of the regeneration fluid, a relative humidity of the regeneration fluid, an absolute humidity of the regeneration fluid, a pressure of the regeneration fluid, a solar insolation, a solar irradiance, an ambient temperature, an ambient humidity, a water production rate, an amount of water produced, a time of day, an elapsed time, a predetermined schedule, a system power state, or a combination thereof.

As an illustrative example, the controller (e.g., 170) can be configured to determine if a temperature, absolute humidity and/or relative humidity of the regeneration fluid flowing in the regeneration fluid path is above a predetermined threshold. In response to determining the humidity of the regeneration fluid is above the predetermined threshold, actuate the atomization unit to atomize liquid water in the condenser. As another illustrative example, the controller (e.g., 170) can be configured to determine if a system power state (e.g., battery SOC, PV availability and/or the like) is above a predetermined threshold. In response to determining the system power state is above the predetermined threshold, actuate or adjust the atomization unit to atomize liquid water in the condenser, increase the flow rate of liquid water to atomization nozzles 895 (e.g., via increasing power to pump 886) so as to reduce a median droplet size of the liquid spray in the regeneration fluid flow path.

Various approaches can be employed to control or maximize the production of water from air by driving the water vapor captured by a hygroscopic material during the loading mode towards vapor pressure saturation in the regeneration fluid during a regeneration, release or unloading cycle. The controller can operate the water generation system between a plurality of operational modes including a loading mode wherein the solar thermal unit captures water vapor from the process gas upon flow in the process flow path through the solar thermal unit. During a release mode, the regeneration fluid flows in the regeneration fluid path to accumulate heat and water vapor upon flow through the solar thermal unit and then flows into the condenser to release or produce liquid water. During a regeneration, release or unloading cycle, the controller can operate the system and its components between a plurality of release modes. For example, the controller can operate the condenser between a plurality of modes based on ambient conditions and/or system conditions. In one example, the controller can set or adjust the system to operate in a regeneration flow recirculation mode wherein at least a portion of the regeneration fluid output from the condenser is recirculated back through the regeneration fluid flow path of the condenser.

As another example, the controller can operate the condenser in a power save mode wherein electrical power is not being consumed by the condenser, for example when PV power and/or battery power is limited. Alternatively, the system can operate the system in a water production boost mode wherein electrical power of the system is directed to or consumed by the condenser and/or enthalpy exchanger (if present). In a condenser boost mode, the controller can operate the water generation system in an air-cooling mode wherein the system directs power to one or more cooling fans to flow air across heat dissipating surfaces of the condenser so as to exhaust heat to the ambient environment. Alternatively or in addition, the controller can operate the condenser in a fluid cooling mode wherein a cooling fluid is directed in a cooling fluid path through one or more cooling conduits extending in the regeneration fluid flow path of the condenser. Alternatively or in addition, the controller can operate the condenser in an atomization mode wherein liquid water sprays into the regeneration fluid path of the condenser such that water condenses from the regeneration fluid upon contact with the sprayed water.

In various embodiments, controller (e.g., 170) is configured to operate the water generation system between a loading mode and a release mode, for example according to the diurnal cycle. During a release mode, the controller can be configured to actuate one or more valves to seal one or more passages (e.g. inflate the inflatable valve members 156a and 156b by supplying a filling gas to the inflatable members 156a and 156b, for example via one or more fluid transfer ports connected to the inflatable members and a pumping device). Once actuated or inflated, the valve member(s) (e.g., valve members 156', 156a and 156b) form a seal in the interior passage of the valve housing(s) (e.g., valve housings 158', 158a and 158b) during the release operational mode. At least one actuating or pumping device in communication with the valve unit(s) (e.g., valve units 150', 150a-b) and an actuating mechanism (e.g. electromechanical device, solenoid device, linear actuator) in communication with the controller 170 can activate the actuating or pumping device during the release mode. The controller 170 can activate the actuating or pumping device via the actuating mechanism to re-position, move or inflate the valve member(s)(e.g., valve members 156', 156a-b) to a predetermined sealing position or fill pressure. Furthermore, the controller can regulate the sealing power, force or pressure in the valve member(s) (e.g., valve members 156', 156a-b) to maintain a seal during the release mode. Exemplary predetermined fill pressure thresholds for inflatable seal members can be in the range of 5 to 30 psi.

In various embodiments, the controller 170 is configured to determine an operational condition of the first or second valve units 150a-b by their duty cycle during the release mode. In response to determining the operational condition of the first valve unit 150a or second valve unit 150b is below a predetermined threshold (e.g., time fan is activated to maintain a seal is greater than a predetermined threshold), the controller can communicate a maintenance or error indication.

The controller 170 can operate the water generation system between a plurality of operational modes, for example over the course of a diurnal cycle or in response to environmental conditions. The controller can operate the system in a loading operational mode wherein the solar thermal unit captures water vapor from the process gas upon flow in the process flow path from the process inlet port, through the solar thermal unit, and to the process outlet port. Additionally, the controller can operate the system a regeneration or release mode wherein a working fluid (e.g. air) accumulates heat and water vapor upon flow in the regeneration flow path from the regeneration inlet port, through the solar thermal unit, and to the regeneration outlet port. Upon input of the working gas to the integrated exchanger and condenser unit 140, energy can be exchanged between regeneration flow path segments and liquid water can be produced by condensing liquid water from the working gas.

Additional operational modes can include a purge mode wherein the process gas flows in a bypass flow path through at least a portion of the regeneration flow path, for example as described in relation to FIG. 17. Furthermore, the controller 170 can operate system 100 in an ingress protection mode, wherein the process inlet port and the process outlet port are in a closed state, for example in response to user command, a measured or forecast environmental condition and the like. In addition, the controller 170 can set system 100 in a power save or inactive mode wherein electrical power is not being consumed by system 100, for example in response to user command, a measured or forecast environmental condition and the like.

Figure 26:
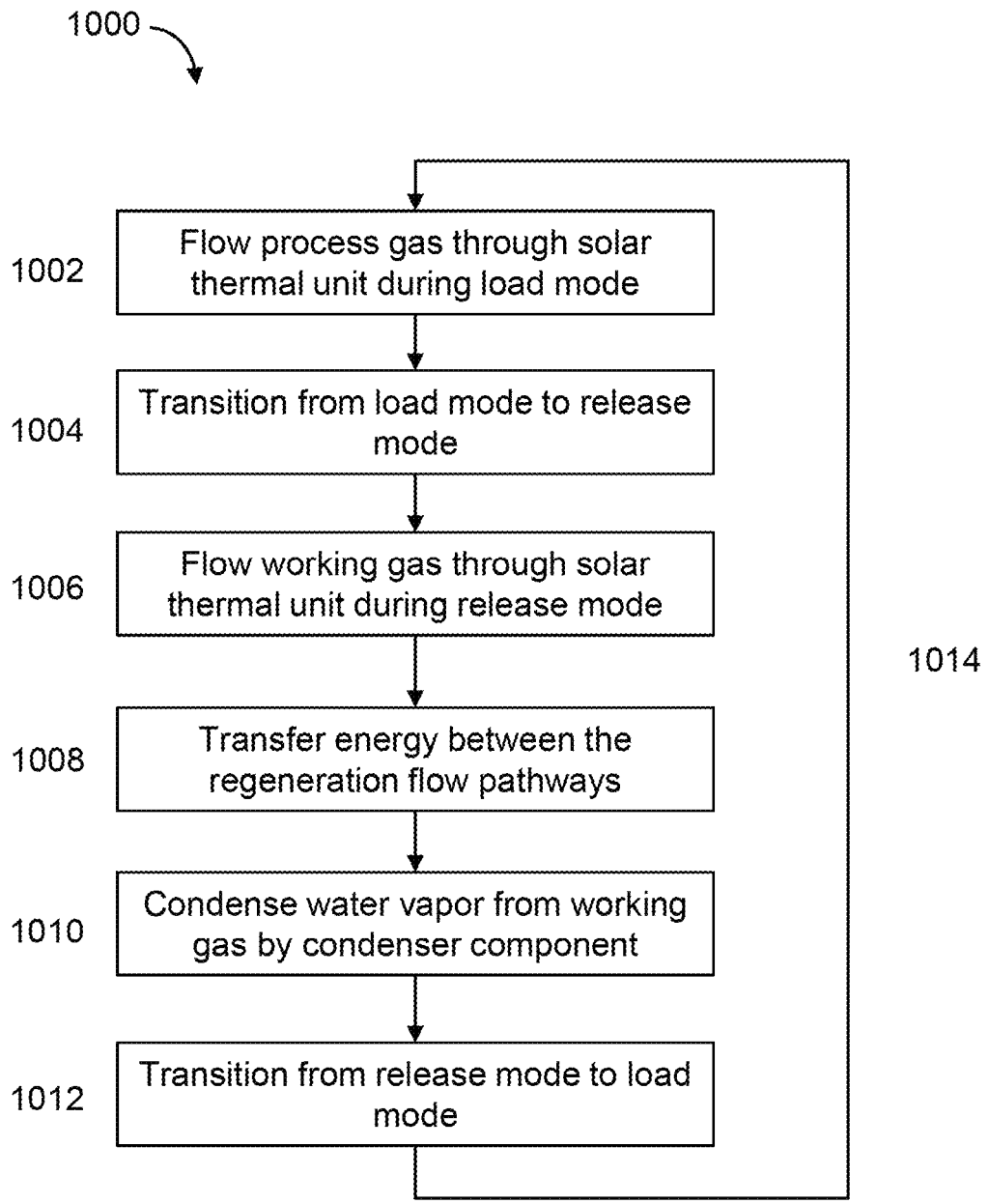
FIG. 26 illustrates a method of operating a water generation system, according to an embodiment.

The present disclosure further provides methods or processes operating a system for generating liquid water from air. Referring to FIG. 26, a flowchart 1000 of a method of operating a water generation system is shown in accordance with an embodiment of the present disclosure.

At operation 1002, a process gas (e.g., ambient air) flows through a solar thermal unit that can comprise a porous hygroscopic material, for example during a loading operational mode or cycle (e.g. nighttime). At operation 1002, the process gas flows to first valve unit 150a coupled to process inlet port 122 of solar thermal unit 110, through a process flow path of the solar thermal unit (e.g., as shown in FIG. 3) and to second valve unit 150b coupled to process outlet port 124 of solar thermal unit 110. At operation 1002, porous hygroscopic material in the solar thermal unit can capture water vapor from the process gas. At operation 1002, valve member(s) of valve unit(s) can be in an open (e.g., deflated state) during the loading operational mode.

At operation 1004, the method includes transitioning from the load mode to a regeneration or release mode (e.g. daytime or morning). In one example, the method comprises monitoring ambient conditions (e.g. solar irradiance, relative humidity, temperature) and/or actual or estimated amount of water in the water generation system (e.g. loading equivalent relative humidity of the hygroscopic material in the thermal desiccant unit) and, based on the monitored or estimated data, transitioning from the load mode to the release mode. At operation 1004, the method can comprise actuating or positioning valve member(s) (e.g., actuating a linear actuator, inflating inflatable valve member(s) of valve unit(s)) to seal a passage defined by an interior wall of the valve housing(s).

As depicted in flowchart 1000, the method comprises flowing working gas along a regeneration flow path including through the solar thermal unit at operation 1006. At operation 1006, the working fluid can accumulate both heat and water vapor from the solar thermal unit upon flowing therethrough. Operation 1006 can also include directing the working gas to an upper interior portion of the solar thermal unit in advance of one or more lower hygroscopic layers or bodies in the solar thermal unit.

At operation 1008, the method can comprise transferring, via the integrated exchanger and condenser unit, heat from the working gas output from the solar thermal unit to the working gas input to the solar thermal unit. Furthermore, at operation 1008, the method can comprise transferring, via the integrated exchanger and condenser unit, water vapor from the working gas input to the solar thermal unit to the working fluid output from the solar thermal unit.

At operation 1008, the rate of energy exchange between regeneration flow path segments can be varied based on one or more of: a user selection, data received from one or more sensors (e.g. data relating to one or more ambient conditions, data relating to working fluid water content, water content in thermal desiccant unit, etc.), forecast conditions, programmatic control, an algorithm, and/or by any other desirable bases. In on example, the method comprises continuous monitoring of ambient conditions (e.g. solar irradiance, relative humidity, temperature) and/or actual or estimated amount of water in the working fluid or thermal desiccant unit and, based on the monitored or estimated data.

At operation 1010, the method includes condensing, via the integrated exchanger and condenser unit, water vapor from the working gas. According to an embodiment, operations 1008 and 1010 can occur simultaneously in an integrated exchanger and condenser unit.

At operation 1012, the method further comprises transitioning from the regeneration or release operational mode to the uptake or load mode. Operation 1012 can include activating a process fan (e.g. 162a) and actuating or positioning one or more valves (e.g., deflating inflatable valve members of valve units) to provide an open passage for process gas to flow therethrough.

At operation 1014, the process can be repeated or cycled. Transitioning between the load mode and the release mode can be based on one or more of: a user selection, data received from one or more sensors (e.g. data relating to one or more ambient conditions, data relating to working fluid water content, water content in thermal desiccant unit, etc.), forecast conditions, programmatic control, an algorithm, and/or by any other desirable bases. In on example, the method comprises continuous monitoring of ambient conditions (e.g. solar irradiance, relative humidity, temperature) and/or actual or estimated amount of water in the working fluid or thermal desiccant unit and, based on the monitored or estimated data, transitioning from the load time to the release time. In various implementations, the method can include determining if a water mass uptake by the desiccant in the thermal unit is greater than a predetermined mass associated with a nighttime relative humidity (e.g. average relative humidity at the panel) during a during nighttime or load time.

The control system can dynamically and efficiently produce liquid water based on ambient environmental conditions (e.g. solar insolation, solar irradiance, temperature, RH) in combination with system operational properties or status (e.g. water content in solar thermal unit, battery state of charge (SOC), and so on). For example, the operational ranges and/or setpoints of system 100 can be determined and dynamically adjusted (e.g. according to the diurnal cycle) so as to efficiently drive water vapor from the hygroscopic material (e.g., in the solar thermal unit 110) towards vapor pressure saturation in the working fluid and condensation at the condenser.

Figure 27:
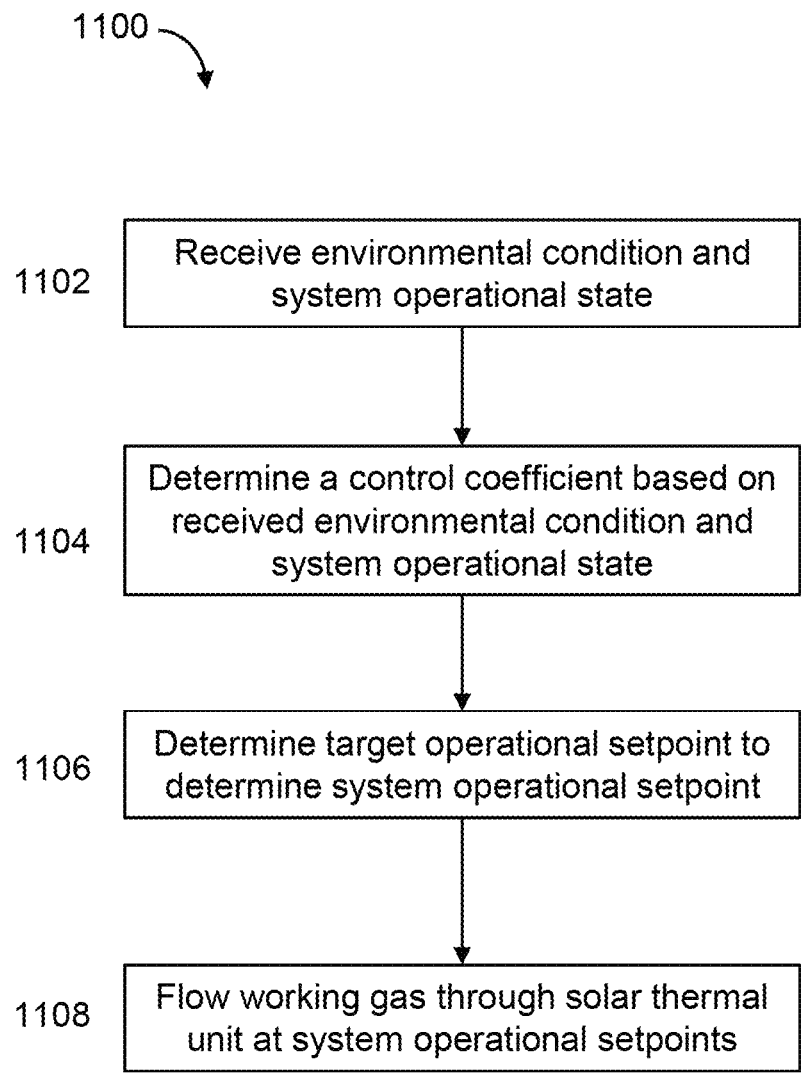
FIG. 27 illustrates a method of operating a water generation system, according to an embodiment.

As an illustrative example, FIG. 27 depicts a method flow chart 1100 for determining the operational setpoint for flow rate of the working fluid (e.g., in the closed-loop regeneration flow pathway through the solar thermal unit 110, integrated exchanger and condenser unit 140). At step 1102, controller 170 can receive one or more environmental input conditions (e.g., solar insolation, solar irradiance, temperature, RH) and one or more system operational states (e.g., water content of hygroscopic material in solar thermal unit, battery SOC). At step 1104, controller 170 can determine a control coefficient or parameter, for example from a look up table or control algorithm (e.g., deterministic algorithm, machine learning algorithm, neural net empirical model, parameter goal seek, and the like) based on the received environmental input conditions and system operational states. At step 1106, the controller 170 can calibrate or determine physical target operational setpoints (e.g., working fluid flow rate, rotary desiccant rotation rate, and the like) to determine one or more system-specific or unit operational setpoints (e.g., fan power, rotary motor voltage, and the like) based on the control coefficient. At step 1108, system 100 can execute the determined operational setpoint to flow working gas through solar thermal unit during an unloading cycle.

In various embodiments, the method can include determining operational setpoints for efficient production of water based on the amount of energy (current and/or forecast) available to the system. For example, the control system can determine if a minimum amount of energy is available (e.g. from an onboard battery charged during a daytime unloading cycle) to support a loading cycle (e.g. power the process fans to flow process air over the hygroscopic material in the solar thermal unit during nighttime) and if so, initialize and/or maintain the loading operation until the amount of power is below a predetermined threshold.

Figure 28:
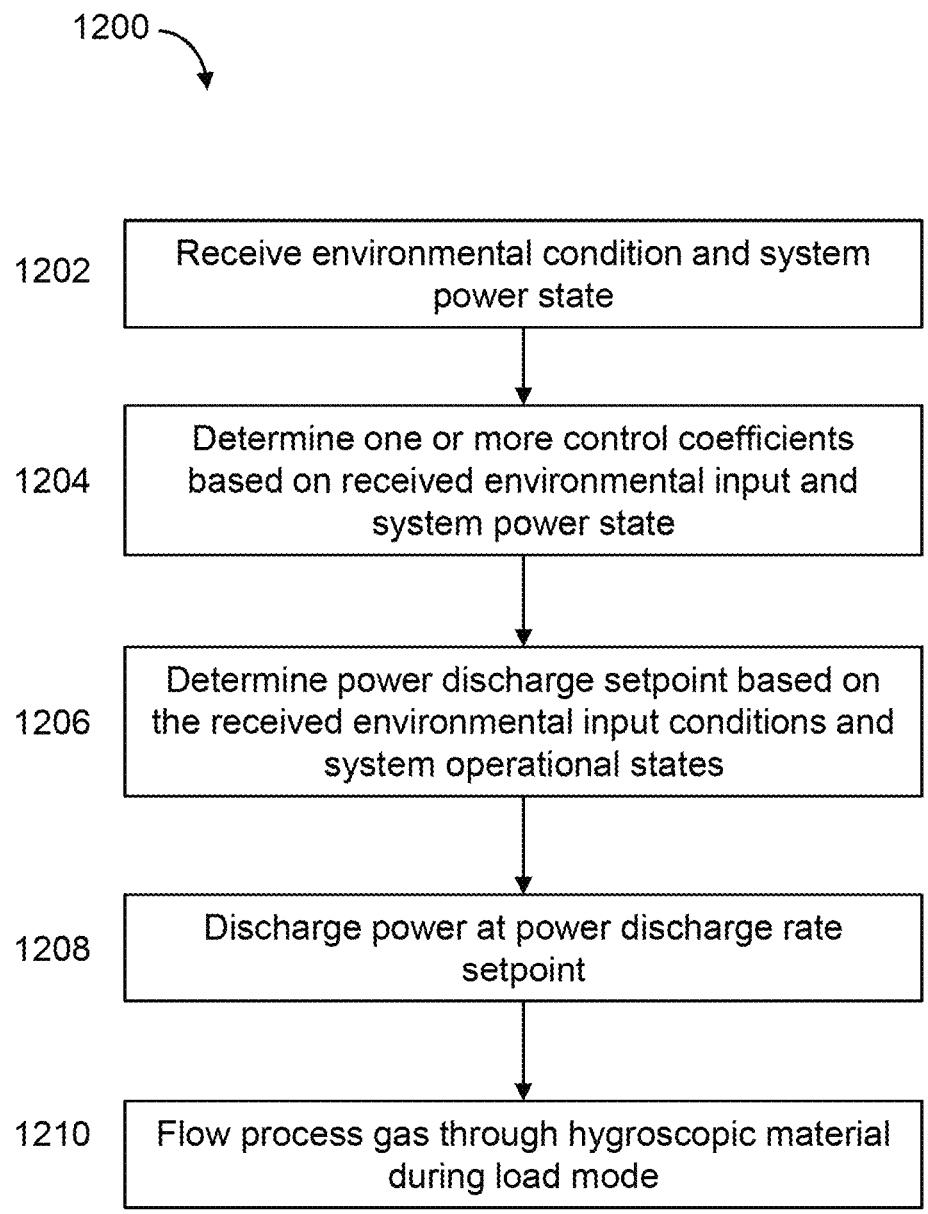
FIG. 28 illustrates a method of operating a water generation system, according to an embodiment.

As an illustrative non-limiting example, FIG. 28 depicts a method flow chart 1200 for improving system efficiency during loading water vapor in a hygroscopic material (e.g., in a solar thermal unit) based on environmental conditions and system state. At step 1202, controller 170 can receive one or more environmental input conditions (e.g., solar insolation or irradiance, forecast of solar insolation or irradiance, temperature, temporal forecast temperature, RH, temporal forecast RH, and the like) and a system power state (e.g., onboard battery SOC). At step 1204, controller 170 can determine one or more control coefficients based on the received environmental input condition and system power state. At step 1206, controller 170 can determine a variable power discharge setpoint (e.g., battery current discharge rate as a function of time) from a mathematical formula or control algorithm based on the received environmental input conditions and system operational states. At step 1208, controller 170 can discharge power at the variable power discharge rate setpoint, for example the battery can be discharged at a discharge current setpoint that varies as a function of time so as to power the process fans to flow process air over the hygroscopic material in the solar thermal unit at step 1210.

Figure 29:
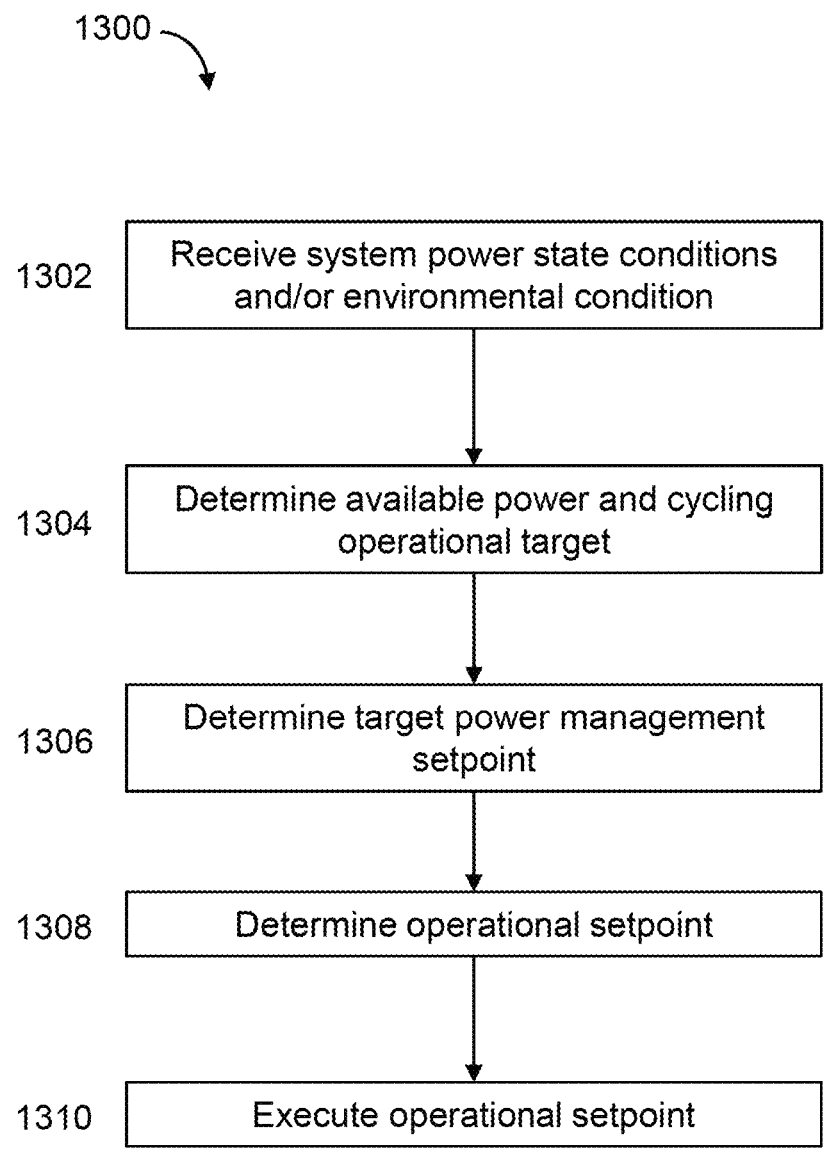
FIG. 29 illustrates a method of operating a water generation system, according to an embodiment.

As yet another non-limiting example, FIG. 29 depicts a method flow chart 1300 for operating the system with improved water production efficiency during an unloading cycle (i.e., releasing water from a hygroscopic material, for example in a solar thermal unit) based on predicted load/unload cycling power needs, environmental conditions and/or system state. At step 1302, controller 170 can receive one or more one or more environmental input conditions (e.g., time of day, current or forecast solar insolation or irradiance) and/or system state conditions (e.g., system power state, onboard battery SOC and the like). At step 1304, controller 170 can determine available PV power (e.g., PV power maximum power point tracking (MPPT)) and hygroscopic material unloading operational targets (e.g., minimum regeneration fluid flow rate, minimum enthalpy exchanger power, and the like).

At step 1306, controller 170 can determine an efficient power management setpoint or power distribution setpoint for unloading (i.e. water release) and loading (i.e. water uptake) cycles. In one example, controller 170 can determine a target battery charging rate and/or boundaries (e.g., charging current, SOC target, charging end time, SOC limit and the like) so as to direct available power between an active unloading cycle and energy storage for a future loading cycle. As an illustrative example, the controller 170 can determine if the measured battery charging current is less than a predetermined threshold, and if so, the controller can determine (e.g. via an algorithm) to decrease power to one or more active unloading units (e.g., decrease condenser cooling fan speed), thereby diverting more PV power to charge an onboard battery (e.g. for a future loading cycle). As another illustrative example, the controller 170 can determine if the measured battery charging current is greater than a predetermined threshold, and if so, the controller 170 can determine (e.g., via an algorithm), to increase power to one or more actively powered unloading units (e.g., condenser cooling fan speeds and the like), thereby diverting more PV power to the active unloading cycle.

At step 1308, controller 170 can determine an operational setpoint (e.g. battery charge rate) to implement the determined power management distribution setpoint (e.g., increase energy storage and reduce power to unloading function or decrease energy storage and increase power to unloading function). At step 1312, controller 170 can execute the operational setpoint (e.g. charge onboard battery at determined battery charge rate).

Figure 30:
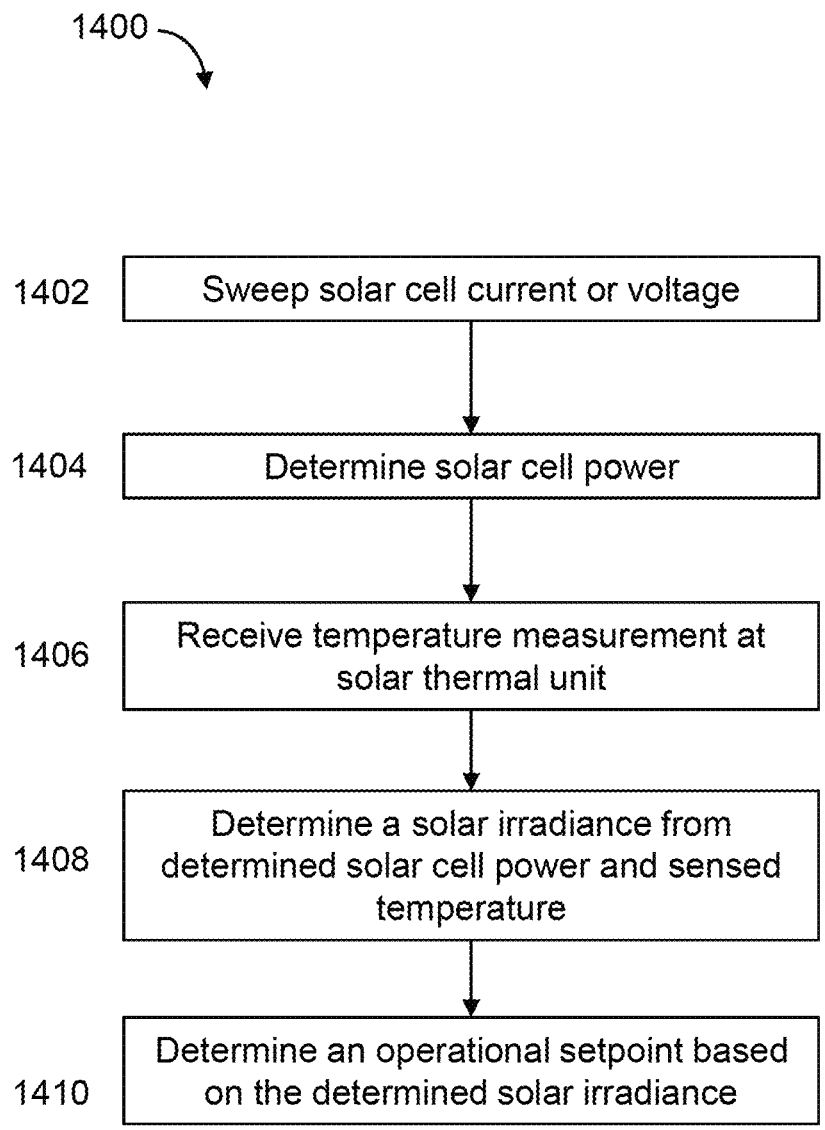
FIG. 30 illustrates a method of operating a water generation system, according to an embodiment.

The current disclosure further provides methods for operating a water-from-air system with improved approaches for measuring or sensing environmental and system conditions to facilitate the dynamic production of liquid water over the diurnal cycle with minimal and/or low-cost accessory components (e.g., avoiding additional sensors by using a combination of onboard components in a multi-functional sensing approach). As a non-limiting example, FIG. 30 depicts a flowchart 1400 for a method of operating a water generation system with onboard determination of solar irradiance is shown in accordance with an embodiment of the present disclosure. At step 1402, controller 170 can perform a current sweep (or voltage sweep) while measuring the resulting voltage (or current). At step 1404, controller 170 can determine the PV or solar cell power from based on the output of step 1402. At step 1406, controller 170 can receive a sensed temperature in or at the solar thermal unit, for example via the working fluid during unloading of the hygroscopic material in the solar thermal unit. At step 1408, controller 170 can determine the solar irradiance from the determined solar cell power and temperature measurement (that is associated with the solar thermal unit). At step 1410, the controller can adjust or determine one or more system operational ranges and/or setpoints based on the determined solar irradiance so as to efficiently drive water vapor from the hygroscopic material (e.g., in the solar thermal unit 110). For example, controller 170 can adjust the exchange rate of the exchanger component 142 (e.g. rate of rotation for a rotary desiccant, rate of enthalpy or heat transfer for a rotary desiccant or passive enthalpic exchange mechanism), the flow rate of the working fluid in the working fluid pathway (e.g. via fan 147) or a combination thereof based on the determined irradiance.

While in many embodiments, the regeneration flow path is a closed loop through solar thermal unit, a condenser and an energy or enthalpy exchanger (if present), for example as part of an integrated exchanger and condenser unit, some implementations can feed in ambient air into the regeneration flow path during a release cycle, for example under predetermined environmental conditions. In one such method, the specific humidity or relative humidity of ambient air can be measured by a sensor in communication with the controller. The controller can determine if the specific humidity or relative humidity of ambient air is below a predetermined threshold, for example below the specific humidity or relative humidity of working gas entering the solar thermal unit, for example at inlet 126. If the specific humidity or relative humidity of ambient air is determined to be below the predetermined threshold, the system can input a small amount of "drier" ambient air to the regeneration flow path such that a mixture of working gas and the input ambient air flow through the regeneration flow path of the solar thermal unit.

In various embodiments, water generation systems of the present disclosure include a controller (e.g., 170) that can operate a water generation system between a plurality of operational modes, for example over the course of a diurnal cycle and/or in response to environmental conditions. The controller can operate the system in a loading operational mode or cycle wherein the solar thermal unit captures water vapor from a process gas (e.g., ambient air) upon flow in the process flow path through the solar thermal unit. Additionally, the controller can operate the system in a regeneration or unloading operational mode or cycle wherein a working fluid (e.g. air) accumulates heat and water vapor upon flow in a regeneration flow path through the solar thermal unit. Upon output of the working gas from the solar thermal unit, water vapor from the working fluid can be condensed, by a condenser, to form liquid water. In various embodiments, energy can be exchanged between regeneration flow path segments, for example via an enthalpy exchanger.

Figure 31:
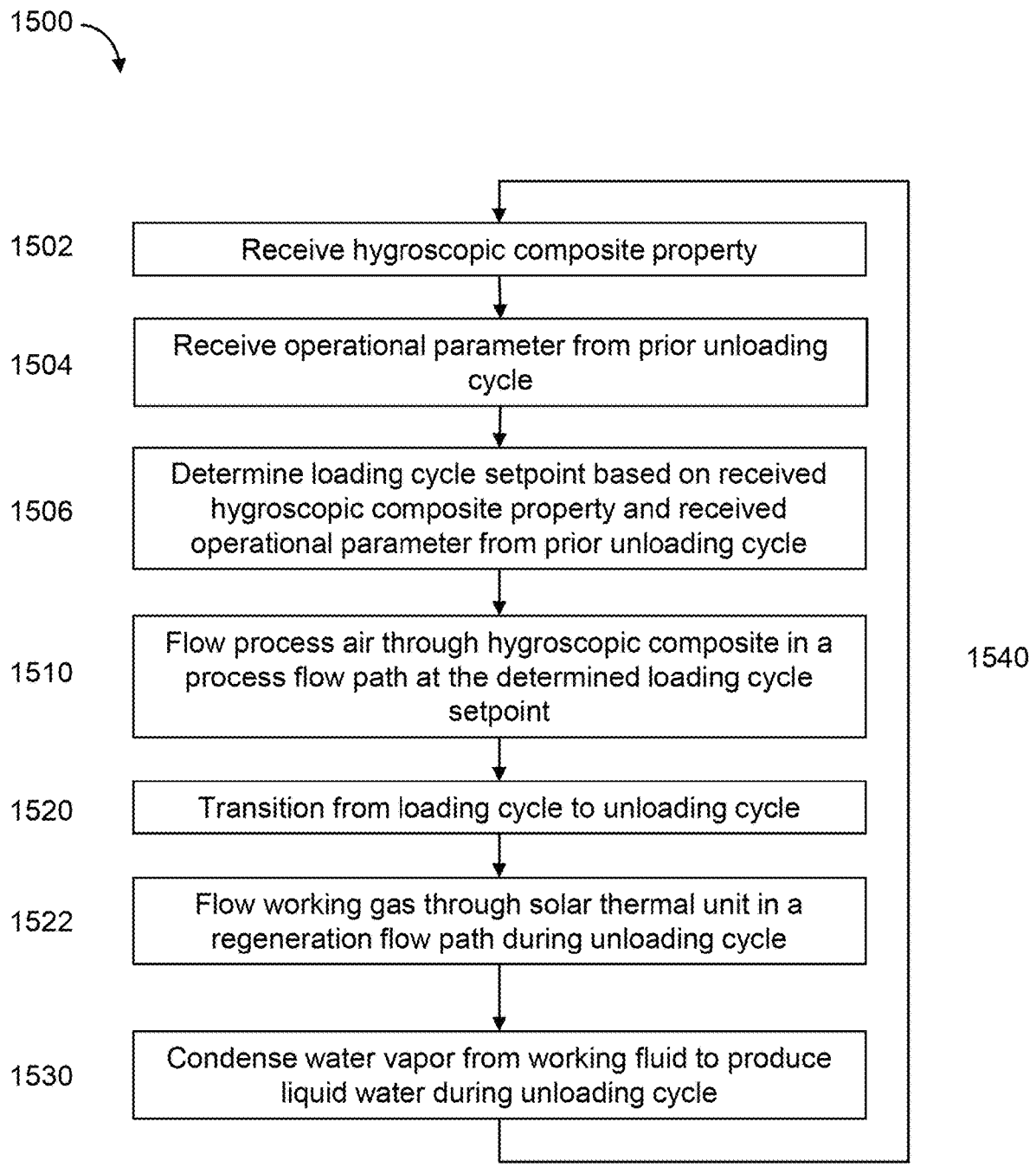
FIG. 31 illustrates a method of operating a water generation system, according to an embodiment.

The present disclosure further provides methods or processes operating a system for generating liquid water from air that comprises a hygroscopic material composite or composite assembly. Referring to FIG. 31, a flowchart 1500 of a method of operating a water generation system is shown in accordance with an embodiment of the present disclosure.

At operation 1502, a system controller can receive a hygroscopic composite property of a hygroscopic composite and/or assembly in a solar thermal unit. For example, the hygroscopic composite property can include a hygroscopic material type, a hygroscopic salt content, a hygroscopic composite porosity, a composite assembly porosity, a hygroscopic composite weeping threshold, a hygroscopic composite swelling threshold, a hygroscopic composite instability threshold, or combinations thereof. In an embodiment, the hygroscopic composite property is a constant or static parameter or set of coefficients that does not change over the course of load/unload cycling.

At operation 1504, a system controller can receive or determine an operational parameter from a prior unloading cycle of the solar thermal unit. For example, the controller can receive or determine an amount or total volume of water produced by the condenser in a prior unloading cycle, an environmental condition during the prior unloading cycle, an amount of solar energy or solar irradiation in the prior unloading cycle, a system power state, a system battery state of charge, or combinations thereof.

At operation 1506, a system controller can determine a loading operational setpoint based on the received hygroscopic composite property from operation 1502 and the received or determined operational parameter from prior unloading cycle at operation 1504. For example, the controller can determine a loading cycle setpoint relating to a maximum water uptake limit of the hygroscopic composite or composite assembly, a weeping threshold, a swelling threshold, an instability threshold, a maximum or minimum ambient relative humidity input to the solar thermal unit, a maximum or minimum relative humidity output from the solar thermal unit, a system power state or availability, a system battery state of charge, a flow rate of the process gas, a loading cycle duration, a loading cycle start time, a loading cycle end time and combinations thereof. In some embodiments, operation 1506 comprises determining the power state or availability of the system based on the received solar irradiation during the prior unloading cycle.

In various embodiments, operation 1506 can include an operation of determining an initial loading water content, equilibrated water content, water vapor pressure or equivalent relative humidity of the hygroscopic composite and/or composite assembly based on the received operational parameter from the prior unloading cycle and the received hygroscopic composite and/or assembly property. For example, the controller can determine an equilibrated water content or relative humidity of the hygroscopic composite assembly from the prior unloading cycle. The equilibrated water content can reflect the final water content at the end of the unloading cycle and/or the residual water or 'well' of water remaining in the hygroscopic composite assembly. The equilibrated water content can also be considered an initial water content or equilibrated water content at the beginning of the subsequent loading cycle.

In various embodiments, it can be preferable to maintain a relatively high residual water content in the composite assembly (i.e., maintain a residual water content in the composite assembly that is not extracted to produce liquid water) during load/unloading cycling. This may avoid or minimize reaching a 'low-grade' water condition or a low water vapor pressure state of the hygroscopic composite wherein more energy is required to extract residual or remaining water in the hygroscopic composite. As an illustrative example, a low water vapor pressure state of the hygroscopic composite can be related to the ratio of absorbed water to the hygroscopic material, hygroscopic salt content, or open water sorption sites. At a lower ratio of absorbed water to hygroscopic salt, the hygroscopic composite holds or binds water tighter and therefore, can require more energy to desorb. In other words, at a lower ratio of absorbed water to hygroscopic salt, the hygroscopic composite has a higher differential water vapor pressure. A higher salt content can support a greater amount of water which can be extracted at a lower energy and/or can have a lower differential water vapor pressure, however a hygroscopic composite with a higher salt content can reach a weeping, swelling or unstable condition at lower total water loads, e.g., total volume or mass of water in the composite assembly. Therefore, control approaches of the present disclosure can include an operation of determining a weeping, swelling or instability threshold for a hygroscopic composite or assembly so as to maintain a high level of water production while avoiding weeping, swelling or other instability.

At operation 1510, a process gas flows through the hygroscopic composite assembly in a process flow path during a loading cycle at the determined loading operational setpoint. At operation 1010, hygroscopic composite assembly absorbs or captures water vapor from the process gas upon flowing therethrough.

At operation 1520, the method includes transitioning from the loading cycle to an unloading cycle. In one example, the method comprises monitoring ambient conditions (e.g. solar irradiance, relative humidity, temperature) and/or actual or estimated amount of water in the water generation system (e.g. loading equivalent relative humidity, equilibrated water content or present water content) of the hygroscopic composite assembly in the solar thermal unit) and, based on the monitored or estimated data, transitioning from the load mode to the release mode.

As depicted in flowchart 1500, the method comprises flowing a working gas through the hygroscopic composite assembly in a regeneration flow path during the unloading cycle at operation 1522. At operation 1522, the working fluid can accumulate both heat and water vapor from the hygroscopic composite assembly upon flowing therethrough. Operation 1022 can also include directing the working gas to an upper portion or layer of the solar thermal unit in advance of the hygroscopic composite assembly in the solar thermal unit.

In some embodiments, the method can comprise transferring, via an energy exchanger, heat from the working gas output from the solar thermal unit (i.e., in advance of the condenser) to the working gas output from the condenser in advance of input to the solar thermal unit at operation 1522. Furthermore, at operation 1522, the method can comprise transferring, via an energy exchanger (e.g. rotary desiccant), water vapor from the working gas output from the condenser in advance of the solar thermal unit to the working gas output from the solar thermal unit in advance of the condenser.

At operation 1522, the rate of energy exchange between regeneration flow path segments (e.g. flow segment rom solar thermal unit to condenser and flow segment from condenser to solar thermal unit) can be varied based on one or more of: a user selection, data received from one or more sensors (e.g. data relating to one or more ambient conditions, data relating to working fluid water content, water content in solar thermal unit, working fluid temperature, etc.), forecast conditions, programmatic control, an algorithm, and/or by any other desirable bases. In on example, the method comprises continuous monitoring of ambient conditions (e.g. solar irradiance, relative humidity, temperature) and/or actual or estimated amount of water in the working fluid or thermal desiccant unit and, based on the monitored or estimated data.

At operation 1530, the method can include an operation of condensing water vapor from the working fluid in the regeneration flow path to produce liquid water during the unloading cycle. According to an embodiment, operations 1522 and 1530 can occur simultaneously during an unloading cycle.

At operation 1540, the method can be repeated or cycled. Transitioning between the loading cycle and the unloading cycle can be based on one or more of: a user selection, data received from one or more sensors (e.g. data relating to one or more ambient conditions, data relating to working fluid water content, water content in solar thermal unit, etc.), forecast conditions, programmatic control, an algorithm, and/or by any other desirable bases. In on example, the method comprises continuous monitoring of ambient conditions (e.g. solar irradiance, relative humidity, temperature) and/or actual or estimated amount of water in the working fluid or thermal desiccant unit and, based on the monitored or estimated data, transitioning from the load time to the release time. In various implementations, the method can include determining if a water mass uptake by the desiccant in the thermal unit is greater than a predetermined mass associated with a nighttime relative humidity (e.g. average relative humidity at the panel) during a during nighttime or load time.

The control system can dynamically and efficiently produce liquid water based on ambient environmental conditions (e.g. solar insolation, solar irradiance, temperature, RH) in combination with system operational properties or status (e.g. water content in solar thermal unit, battery state of charge (SOC), and so on). For example, the operational ranges and/or setpoints of system 100 can be determined and dynamically adjusted (e.g. according to the diurnal cycle) so as to efficiently drive water vapor from the hygroscopic material (e.g., in the solar thermal unit 110) towards vapor pressure saturation in the working fluid and condensation at the condenser.

Figure 32A:
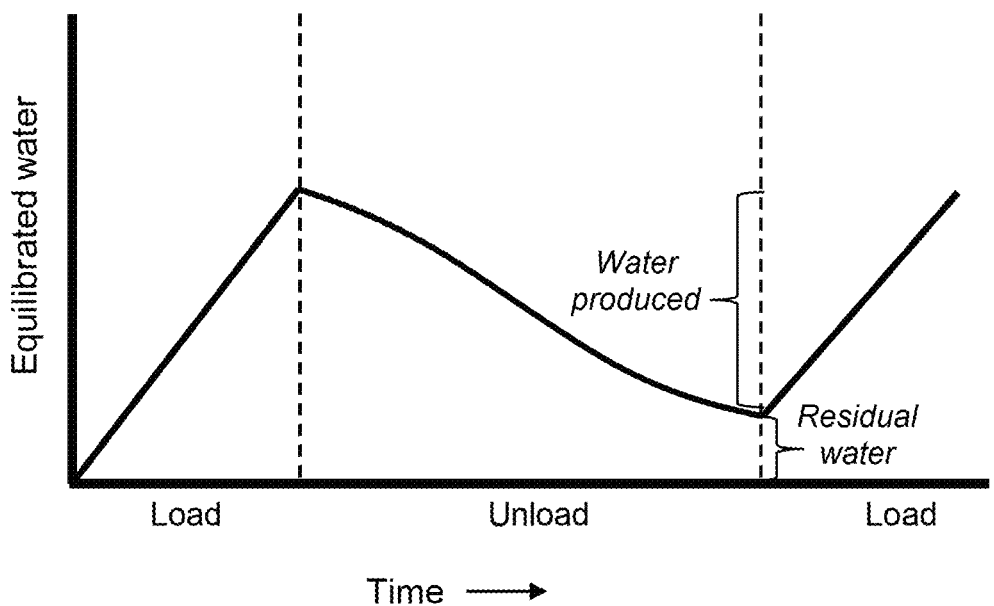
FIG. 32A shows a plot of equilibrated water in a hygroscopic composite or composite assembly for loading and unloading operational cycles during operation of a water generation system, according to an embodiment.

As an illustrative example, FIG. 32A shows a plot of equilibrated water in a hygroscopic composite assembly for an initial or commissioning loading cycle, an unloading cycle and a subsequent loading cycle during operation of a water generation system for a hygroscopic composite assembly comprising a low hygroscopic salt content (e.g., less than 22 wt %). For comparison, FIG. 32B shows a plot of equilibrated water content in a hygroscopic composite assembly for an initial or commissioning loading cycle, an unloading cycle and a subsequent loading cycle during operation of a water generation system for a hygroscopic composite assembly comprising a higher hygroscopic salt content (e.g., greater than 25 wt %).

Figure 32B:
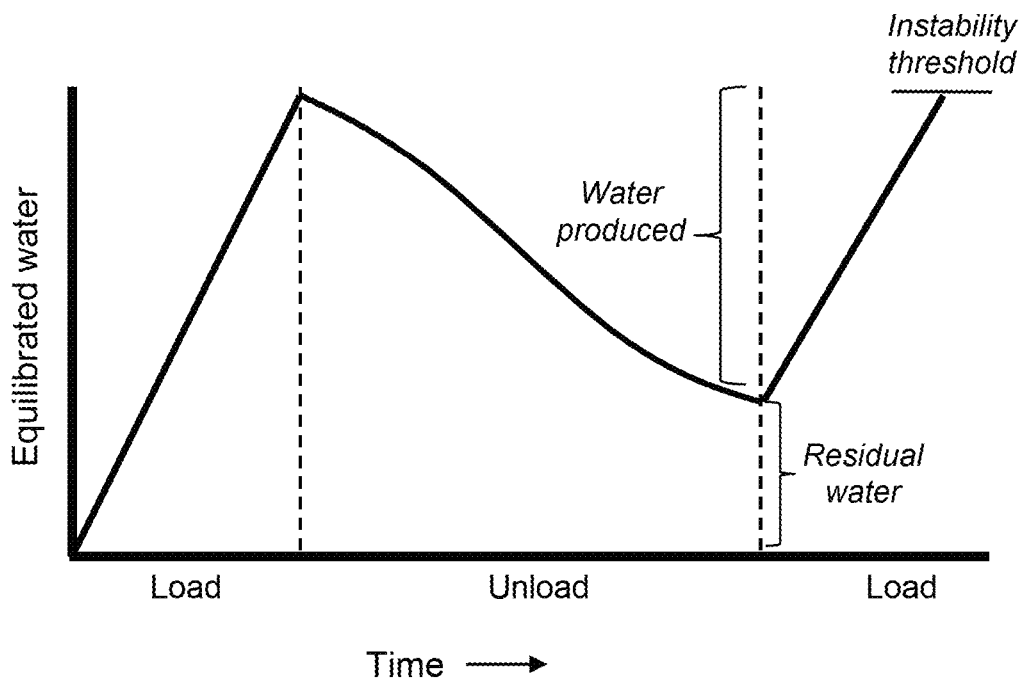
FIG. 32B shows a plot of equilibrated water in a hygroscopic composite or composite assembly for loading and unloading operational cycles during operation of a water generation system, according to an embodiment.

During the first load cycle of FIG. 32B, the hygroscopic composite assembly equilibrates a greater amount of water than the hygroscopic composite assembly of FIG. 32A during the first load cycle (assuming conditions of the process gas during loading are equivalent). As such, the initial equilibrated state of the water on the hygroscopic composite of FIG. 32B at the beginning of the subsequent unloading cycle is higher than that of the hygroscopic composite of FIG. 32A.

During the first unloading cycle of FIG. 32A, the hygroscopic composite assembly releases less water vapor, and in turn the system produces less liquid water, than the hygroscopic composite assembly of FIG. 32B during the load cycle. The production of water over the course of an unloading cycle may be a function of both the amount of water present in the hygroscopic composite, and also the equilibrated state of the water that is in the hygroscopic composite. It is important to make this distinction because the equilibrated state of the water in the hygroscopic composite may relate to the amount of energy needed to extract the water from the hygroscopic composite. In many embodiments, it may be preferable to operate the water generation system in a regime where the equilibrated state of the water in the hygroscopic composite is more favorable to extraction of water at a lower energy cost, and thus to produce more efficient water production.

In FIG. 32A, the starting equilibrated water content in hygroscopic composite assembly at the beginning of the subsequent loading cycle is lower than the starting equilibrated water content of the hygroscopic composite assembly of FIG. 32B. Furthermore, there is a significantly more water remaining or residual water in hygroscopic composite of FIG. 32B. Furthermore, the hygroscopic composite of FIG. 32B equilibrate water to reach a higher relative humidity or than the hygroscopic composite of FIG. 32A. In various embodiments, it can be preferable to maintain a relatively high residual water content in the composite assembly (i.e., maintain a residual water content in the composite assembly that is not extracted to produce liquid water) during load/unloading cycling. This can reduce or minimize operation at low water vapor pressure states wherein more energy is required to extract residual or remaining water in the hygroscopic composite. However, in such embodiments, operation or cycling at higher equilibrated water content may result in weeping, swelling or other instability relating to water uptake.

In an embodiment, the methods of operating water generation systems of the present disclosure can allow for continuous cycling at high water vapor pressure states while avoiding weeping, swelling or other degradation or failure for the highly efficient production of water. As shown in the example of FIG. 32B, a weeping, swelling or instability control limit or predetermined weeping, swelling or instability threshold can be determined for the loading cycle operation such that once the equilibrated water or present water content in the hygroscopic composite reaches the weeping, swelling or instability threshold, the system can cease loading of more water in the hygroscopic composite. In an embodiment, the predetermined weeping, swelling or instability threshold can be based on a hygroscopic composite property, for example, hygroscopic material content, porosity or a combination thereof.

Figure 33:
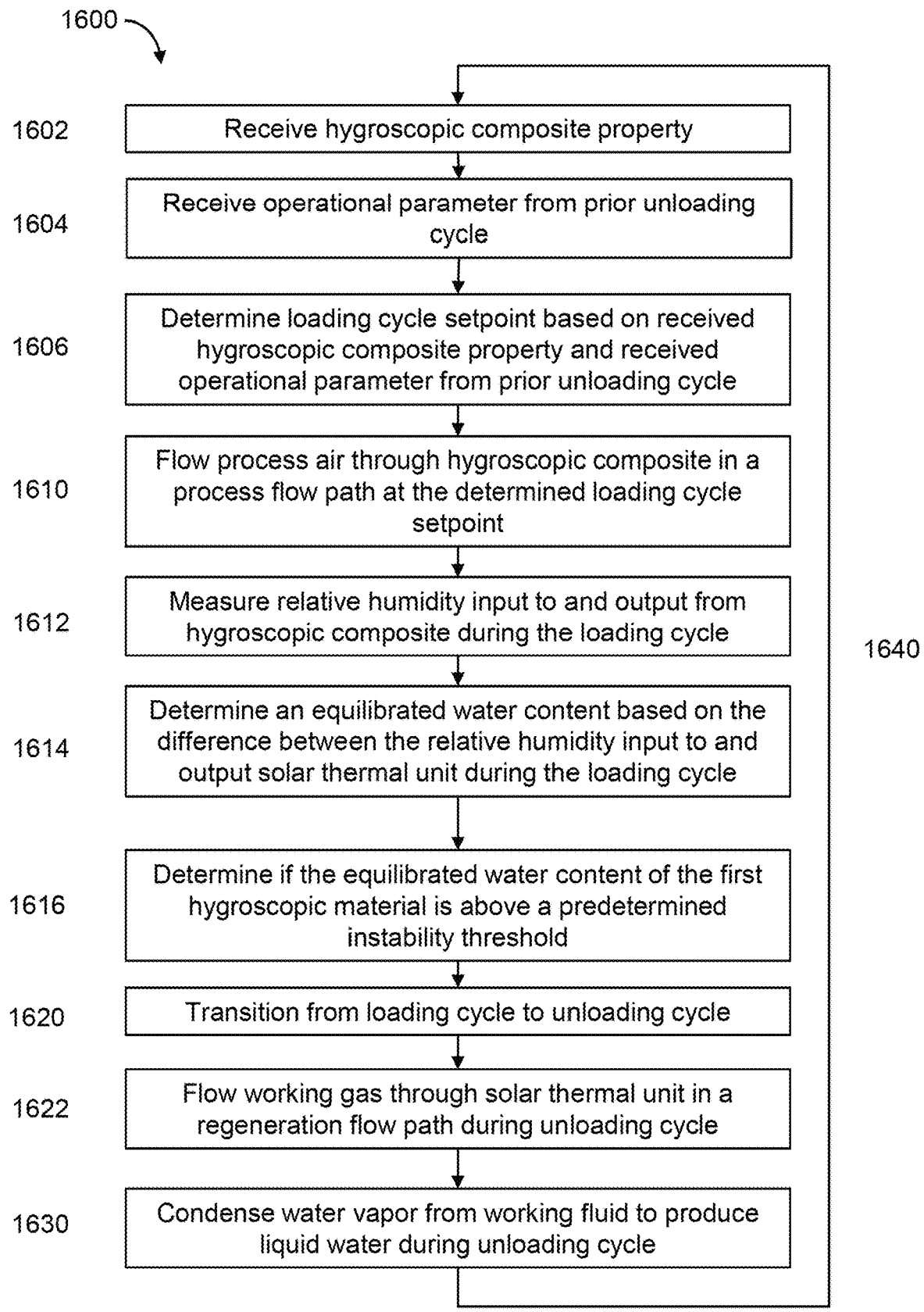
FIG. 33 illustrates a method of operating a water generation system, according to an embodiment.

As another example, FIG. 33 illustrates a method of operating a water generation system comprising a hygroscopic material, composite or composite assembly. Unless otherwise specified below, the numerical indicators used to refer to operations of FIG. 33 are similar to those used to refer to operations in FIG. 31 above, except that the index has been incremented by 100.

As depicted in FIG. 33, a water generation system controller can receive a hygroscopic composite property of a hygroscopic composite and/or assembly in a solar thermal unit at operation 1602. At operation 1604, a system controller can receive or determine an operational parameter from a prior unloading cycle of the solar thermal unit. For example, the controller can receive or determine an amount or total volume of water produced by the condenser in a prior unloading cycle, an environmental condition during the prior unloading cycle, an amount of solar energy or solar irradiation in the prior unloading cycle, a system power state, a system battery state of charge, or combinations thereof. In some embodiments, the method can comprise determining an equilibrated water content or relative humidity of the hygroscopic composite assembly at the end of the prior unloading cycle at operation 1604.

At operation 1606, a system controller can determine a loading operational setpoint based on the received hygroscopic composite property from operation 1602 and the received or determined operational parameter from prior unloading cycle at operation 1604. For example, the controller can determine a loading cycle setpoint relating to a weeping, swelling or instability threshold (e.g. maximum equilibrated water in hygroscopic composite assembly) and/or the power state of the system (e.g. battery SOC, received solar irradiance during prior day, and/or the like). In an embodiment, operation 1606 can comprise determining the loading operational setpoint based on a received system power state. In some embodiments, the method comprises measuring an ambient solar irradiance, cloudy condition or weather event and determining a loading operational setpoint in response to the measured ambient solar irradiance, cloudy condition or weather event. In some embodiments, operation 1606 can comprise forecasting an ambient solar irradiance, cloudy condition or a weather event; and, determining the loading operational setpoint in response to the forecast ambient solar irradiance, cloudy condition or weather event. In various embodiments, the method can comprise receiving an environmental condition and/or a system operational state; and determining a power discharge setpoint during the loading cycle based on the received environmental condition and/or system power state.

At operation 1610, a process gas can flow through the hygroscopic composite assembly in a process flow path during a loading cycle at the determined loading operational setpoint. At operation 1610, the hygroscopic composite assembly absorbs or captures water vapor from the process gas upon flowing therethrough.

At operation 1612, the method can comprise the operation comprises the operation of measuring or determining an ambient condition external to the solar thermal unit. In one example, operation 1612 comprises measuring a relative humidity input to the solar thermal unit (e.g. ambient air RH) and/or a relative humidity output from the solar thermal unit during the loading cycle.

At operation 1614, the method can comprise the operation of determining the equilibrated water content of the hygroscopic composite assembly as the loading cycle proceeds. In one embodiment, operation 1614 includes determining the equilibrated water content of the hygroscopic composite assembly based on based on the measured ambient environmental condition, for example the difference between the specific or relative humidity input to the solar thermal unit and the specific or relative humidity output from the solar thermal unit during the unloading cycle.

At operation 1616, the method can comprise the operation of determining if the equivalent relative humidity, equilibrated water content or present water content of the hygroscopic composite assembly is above a predetermined weeping, swelling or instability threshold. If the equivalent relative humidity, equilibrated water content or present water content of the hygroscopic composite assembly is above the predetermined weeping, swelling or instability threshold, the system can cease flow of the process gas through the hygroscopic composite assembly at operation 1616. In some embodiments, the method can comprise determining a final equilibrated water content of the hygroscopic composite assembly at the end of the loading cycle. Additionally, some embodiments can include determining an unloading operational setpoint to set an initial water content or residual water content for a subsequent loading cycle. In one example, the method comprises determining an unloading operational setpoint based on a measured or forecast solar irradiance. As another example, the method can comprise determining if an accumulation of the difference between the specific humidity input to the solar thermal unit and the specific humidity output from the solar thermal unit is above a predetermined threshold. If the difference between the specific humidity input to the solar thermal unit and the specific humidity output from the solar thermal unit is above the predetermined threshold, the system can cease flow of the process gas through the hygroscopic composite assembly at operation 1616.

In one embodiment, operation 1616 can comprise an operation of measuring an electrical conductivity of the hygroscopic composite assembly. The equilibrated water content of the hygroscopic composite assembly can be determined from the measured electrical conductivity, for example a conductivity increase can be calibrated to an increase in equilibrated water content. As another example, operation 1616 can include measuring a weight of the hygroscopic composite assembly and, determining the equilibrated water content of the hygroscopic composite assembly based on the measured weight, for example a weight increase can be calibrated to an increase in equilibrated water content. As yet another example, operation 1616 can include measuring formation of a liquid droplet below the hygroscopic composite assembly; and, determining the equilibrated water content and/or a weeping, swelling or unstable condition of the hygroscopic composite assembly based on the measured liquid water droplet.

At operation 1620, the method can comprise transitioning from the loading cycle to an unloading cycle. In one example, the method comprises monitoring ambient conditions (e.g. solar irradiance, relative humidity, temperature) and/or actual or estimated amount of water in the water generation system (e.g. loading equivalent relative humidity of the hygroscopic composite assembly in the solar thermal unit) and, based on the monitored or estimated data, transitioning from the load mode to the release mode. In various embodiments, the method can comprise receiving an environmental condition and/or a system operational state; and determining a power discharge setpoint during the unloading cycle based on the received environmental condition and/or system power state.

As depicted in flowchart 1600, the method can comprise flowing a working gas through the hygroscopic composite assembly in a regeneration flow path during the unloading cycle at operation 1622. At operation 1622, the working fluid can accumulate both heat and water vapor from the hygroscopic composite assembly upon flowing therethrough. Operation 1622 can also include directing the working gas to an upper portion or layer of the solar thermal unit in advance of the hygroscopic composite assembly in the solar thermal unit.

At operation 1630, the method can include an operation of condensing water vapor from the working fluid in the regeneration flow path to produce liquid water during the unloading cycle. According to an embodiment, operations 1622 and 1630 can occur simultaneously during an unloading cycle.

Figure 34:
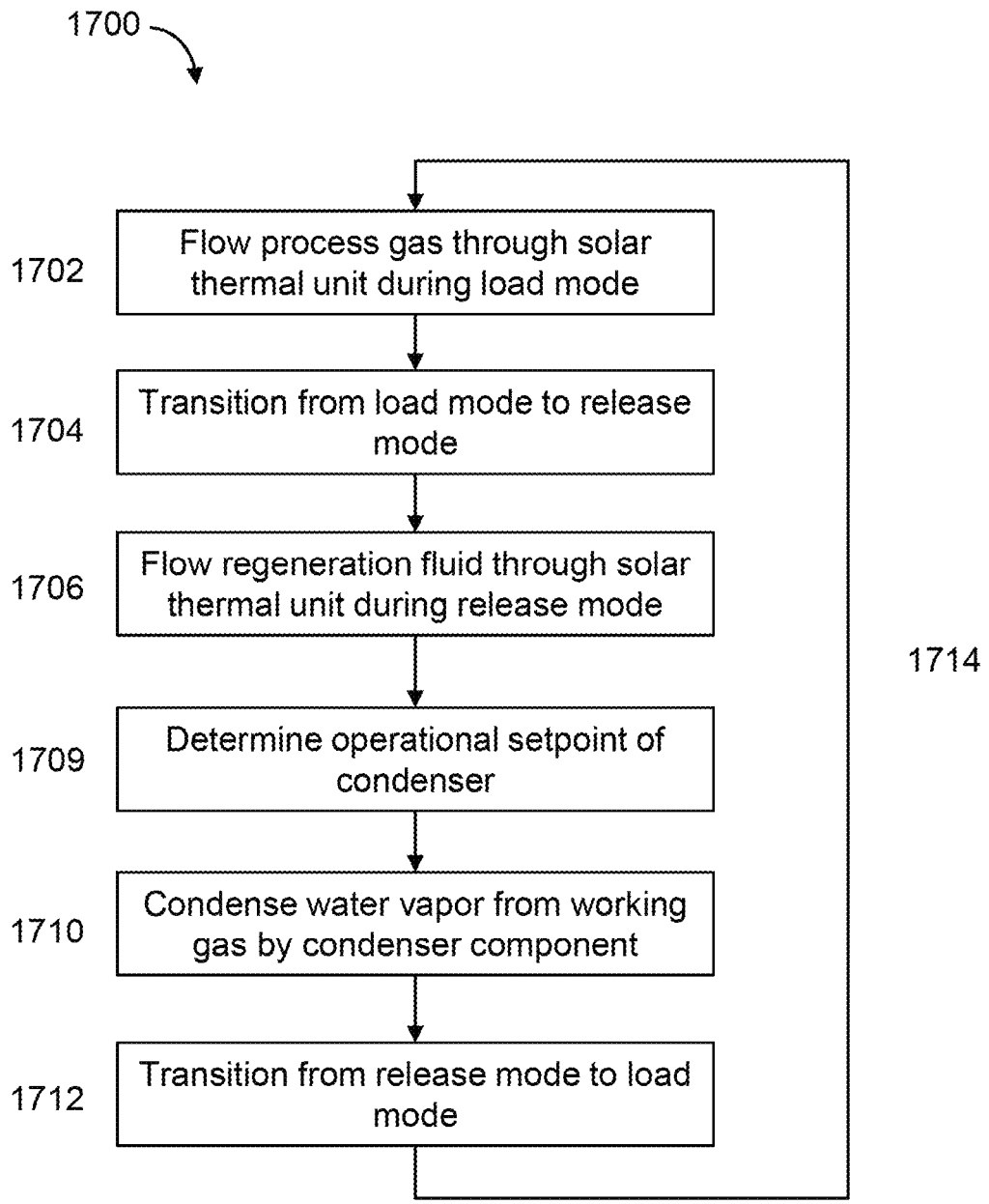
FIG. 34 illustrates a method of operating a water generation system, according to an embodiment.

In an embodiment, the methods of operating water generation systems of the present disclosure can allow for continuous cycling at high water vapor pressure system states while maintaining high condenser efficiency for production of water, for example responsive to varying system operational states and/or environmental conditions. As an example, FIG. 34 illustrates a method of operating a water generation system comprising a condenser. Unless otherwise specified below, the numerical indicators used to refer to operations of FIG. 34 can be similar to those used to refer to some operations in FIG. 26 above, except that the index has been incremented by a multiple of 100.

FIG. 34 illustrates a flowchart 1700 of a method of operating a water generation system including a condenser. At operation 1702, a process gas (e.g., ambient air) flows through a solar thermal unit that can comprise a hygroscopic material, composite or assembly during a loading operational mode or cycle (e.g., nighttime). At operation 1702, hygroscopic material, composite or assembly captures water vapor from the process gas.

At operation 1704, the method includes transitioning from the load mode to a regeneration or release mode (e.g., daytime or morning). In one example, the method comprises monitoring ambient conditions (e.g., solar irradiance, relative humidity, temperature) and/or system conditions or states, for example actual system temperature and/or system states like an estimated amount of water in the water generation system (e.g., loading equivalent relative humidity of the hygroscopic material in the system). Based on the monitored or estimated information, the method includes the operation of transitioning from the load mode to the release mode. For example, if the solar irradiance, ambient temperature, system temperature, and/or loaded water in the system is above a predetermined threshold, the controller can transition the system from the load mode and can immediately or with a delay, place the system in an unloading or release mode.

As depicted in flowchart 1700, the method further comprises operating the system in a release mode including flowing a regeneration gas along a regeneration flow path including through the solar thermal unit and the condenser at operation 1706. At operation 1706, the regeneration fluid can accumulate both heat and water vapor from the solar thermal unit upon flowing therethrough.

At operation 1709, the method can comprise determining, by a controller, an operational setpoint of the system. In this example, the controller can determine an operational setpoint of the condenser based on one or more of: a temperature of the regeneration fluid, a relative humidity of the regeneration fluid, an absolute humidity of the regeneration fluid, a pressure of the regeneration fluid, a temperature of a cooling fluid flowing through the condenser, a pressure of a cooling fluid flowing through the condenser, a solar insolation, a solar irradiance, an ambient temperature, an ambient humidity, a water production rate, an amount of water produced, a time of day, an elapsed time, a predetermined schedule, a system power state or a combination thereof. For example, if the amount of water produced over a prior time period is below a desired threshold, the controller can provide additional power to the condenser (e.g., increase power to cooling fans or pumps associated with the condenser). As another example, if the temperature or absolute humidity of the regeneration fluid is above a predetermined threshold, the controller can provide additional power to the condenser and/or increase a recycled portion of the regeneration fluid back to the condenser.

In some implementations, operation 1709 can comprise receiving an environmental condition and a system operational state, for example a system power state (e.g., PV generation, battery SOC and/or the like). In addition, the method can comprise the operation of determining a power consumption setpoint of the condenser based on the received environmental condition and/or system power state. In some implementations, operation 1709 can comprise operating the system in one or more operational modes including: 1) an air-cooling mode comprising flowing, via a fan, ambient air across heat dissipating surfaces of the condenser to exhaust heat from the condenser; 2) a regeneration flow recirculation mode wherein at least a portion of the regeneration fluid output from the condenser is recirculated back through the regeneration fluid flow path of the condenser; 3) a fluid cooling mode wherein a cooling fluid is directed in a cooling fluid path through one or more cooling conduits extending in the regeneration fluid flow path of the condenser; and, 4) an atomization mode wherein liquid water sprays into the regeneration fluid path of the condenser such that water condenses from the regeneration fluid upon contact with the sprayed water. Furthermore, operation 1709 can comprise adjusting the setpoints or operational states of each mode, for example adjusting the recycled portion of the regeneration fluid back to the condenser and/or adjusting the power input to fans or pumps associated with the condenser.

At operation 1710, the method includes condensing, via the condenser, water vapor from the regeneration gas. According to an embodiment, operations 1709 and 1710 can occur simultaneously. Additionally, operations 1709 and 1710 can occur in a repeated or continuous manner such that the operational setpoint or states of the condenser and/or system as a whole are continuously being adjusted for maximum water production by the system.

At operation 1712, the method further comprises transitioning from the regeneration or release operational mode to the uptake or loading mode. In one example, the method comprises monitoring ambient conditions (e.g., solar irradiance, relative humidity, temperature) and/or system conditions or states, for example actual system temperature and/or system states like an estimated amount of water in the water generation system (e.g., loading equivalent relative humidity of the hygroscopic material in the system). Based on the monitored or estimated information, the method includes the operation of transitioning from the release mode to the loading mode. For example, if the solar irradiance, ambient temperature, system temperature, and/or loaded water in the system is below a predetermined threshold, the controller can transition the system from the release mode and can immediately or with a delay, place the system in an loading or water uptake mode.

At operation 1714, the process can be repeated or cycled. Transitioning between the load mode and the release mode can be based on one or more of: a user selection, a predetermined schedule, data received from one or more sensors (e.g., data relating to one or more ambient conditions, data relating to regeneration fluid water content, water content in hygroscopic materials of the system, etc.), forecast conditions, programmatic control, an algorithm, and/or by any other desirable bases. In on example, the method comprises continuous monitoring of ambient conditions (e.g., solar irradiance, relative humidity, temperature) and/or actual or estimated amount of water in the working fluid or thermal desiccant unit and, based on the monitored or estimated data, transitioning from the load time to the release time. As yet another example, the method can include determining if a water mass uptake by the hygroscopic material in the thermal unit and/or an amount of produced water by the condenser over a prior cycle is greater than a predetermined amount associated with a nighttime relative humidity (e.g. average relative humidity at the panel) and/or daytime solar insolation. In response the determining the water uptake and/or water production is less than a predetermined amount, the system can adjust its operational setpoints on a subsequent cycle and/or communicate a service or maintenance request.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions and addressing the same or different problems. Similarly, it will be understood that the benefits and advantages described above may relate to one embodiment or may relate to several embodiments.

Furthermore, the materials selection and controls approach can be employed for any material systems used in water generators that having a lower and/or upper operational bound or limit relating to a weeping potential, swelling potential, low vapor pressure condition, swelling, a pressure drop on water uptake, mechanical instability, chemical instability, cycling stability, or combinations thereof. Accordingly, the material design and control approaches described herein can be modified such that additional embodiments may be realized with operational, logical, chemical, and/or mechanical changes without departing from the spirit and scope of the disclosure. The claims are not intended to include, and should not be interpreted to include, means-plus- or step-plus-function limitations, unless such a limitation is explicitly recited in a given claim using the phrase(s) "means for" or "step for," respectively. The term "about" or "substantially," as used herein, is intended to encompass minor deviations rather define an exact value.

The invention claimed is:

1. A system for generating water from air comprising:
a hygroscopic material to capture water vapor from air during a loading operational mode, and release water vapor to a working fluid during an unloading operational mode;
a condenser configured to condense water vapor released in the working fluid to produce liquid water during the unloading operational mode; and
a controller configured to:
operate the system between the loading operational mode and the unloading operational mode based on a condition of the hygroscopic material, the condition of the hygroscopic material being a weeping, swelling or instability condition of the hygroscopic material; and,
set a system operational limit before an onset of weeping, swelling or other unstable condition.

2. The system of claim 1, wherein the controller is further configured to:
receive an operational parameter of the water generation system;
determine, based on the operational parameter, a loading operational setpoint, an unloading operational setpoint, or a combination thereof.

3. The system of claim 1, wherein the controller is configured to determine a residual water limit, a lower unloading limit, an upper loading limit, a weeping threshold limit, a swelling threshold limit, an instability threshold limit, or a combination thereof.

4. The system of claim 1, wherein the condition of the hygroscopic material is based on an equilibrated water content of the hygroscopic material.

5. The system of claim 1, wherein:
the hygroscopic material comprises a metal organic framework (MOF),
the condition is a swelling condition, and
the controller operates the system between the loading operational mode and the unloading operational mode based on a swelling threshold limit.

6. The system of claim 1, wherein:
the hygroscopic material comprises a deliquescent salt in a support media,
the condition is a weeping condition, and
the controller operates the system between the loading operational mode and the unloading operational mode based on a weeping threshold limit.

7. The system of claim 1, wherein a regeneration flow path flows through a solar thermal unit and the condenser in a closed-loop regeneration flow path during the unloading operational mode.

8. The system of claim 1, further comprising a solar thermal unit to heat the hygroscopic material, heat the working fluid, or heat both the hygroscopic material and working fluid during the unloading operational mode.

9. The system of claim 1, wherein the controller is further configured to operate the condenser in a boost mode wherein electrical power is directed to the condenser to exhaust heat to the ambient environment.

10. The system of claim 1, further comprising an exchanger component to transfer sensible energy, latent energy, or both sensible and latent energy between the working fluid after uptake of water vapor and the working fluid after condensation of water vapor.

11. The system of claim 10, wherein the exchanger component is a heat exchanger, a vapor transfer membrane, a rotary desiccant wheel, a refrigeration unit, a vapor compression cycling unit, or a combination thereof.

12. A system for generating water from air comprising:
a hygroscopic material to capture water vapor from air during a loading operational mode, and release water vapor to a working fluid during an unloading operational mode;
a binder to bind particles of the hygroscopic material so as to form a rigid self-supporting hygroscopic composite;
a condenser configured to condense water vapor released in the working fluid to produce liquid water during the unloading operational mode; and,
a controller configured to operate the system between the loading operational mode and the unloading operational mode based on a condition of the hygroscopic material.

13. A system for generating water from air comprising:
a hygroscopic material to capture water vapor from air during a loading operational mode, and release water vapor to a working fluid during an unloading operational mode, the hygroscopic material comprising carbon fiber, fiber glass, woven fibers or combinations thereof to form a self-supporting hygroscopic composite;
a condenser configured to condense water vapor released in the working fluid to produce liquid water during the unloading operational mode; and
a controller configured to operate the system between the loading operational mode and the unloading operational mode based on a condition of the hygroscopic material.

14. A system for generating water from air comprising:
a hygroscopic material to capture water vapor from air during a loading operational mode, and release water vapor to a working fluid during an unloading operational mode;
a condenser configured to condense water vapor released in the working fluid to produce liquid water during the unloading operational mode; and
a controller configured to operate the system between the loading operational mode and the unloading operational mode based on a condition of the hygroscopic material;
wherein the condenser is configured to exhaust heat to an exterior of the system via thermal radiation, convection, conduction, a phase change, or a combination thereof.

15. A method for generating water from air comprising:
flowing air in a process flow path including a hygroscopic material to capture water vapor from air during a loading operational mode;
transitioning, via a controller, between the loading operational mode and an unloading operational mode based on a condition of the hygroscopic material, the condition of the hygroscopic material being a weeping, swelling or instability condition of the hygroscopic material;
setting, via the controller, a system operational limit before an onset of weeping, swelling or other unstable condition;
absorbing, by the hygroscopic material, thermal energy to release water vapor to a working fluid during the unloading operational mode; and,
condensing, via a condenser, water vapor in the working fluid to produce liquid water during the unloading operational mode.

16. The method of claim 15, further comprising transferring sensible energy, latent energy or both sensible and latent energy between the working fluid after uptake of water vapor and the working fluid after condensation of water vapor.

17. The method claim 15, further comprising:
receiving an operational parameter of the water generation system;
determining, based on the operational parameter, a loading operational setpoint, an unloading operational setpoint, or a combination thereof.

18. The method of claim 17, wherein receiving an operational parameter comprises:
receiving a property of the hygroscopic material;
receiving an amount of liquid water produced by the condenser;
receiving an environmental condition;
receiving a system power state; or a combination thereof.

19. The method of claim 15, wherein the method further comprises:
determining a power availability of the system;
determine if a system power state is above a predetermined threshold;
determining a water content of the hygroscopic material;
determining if a water content of the hygroscopic material is above a predetermined threshold; or, a combination thereof.

20. A system for generating water from air comprising:
a hygroscopic material to capture water vapor from air during a loading operational mode, and absorb thermal energy to release water vapor to a working fluid during an unloading operational mode;
a condenser configured to condense water vapor released in the working fluid to produce liquid water during the unloading operational mode; and
a controller configured to:
flow air in a process flow path including the hygroscopic material to capture water vapor from air during the loading operational mode;
transition the system between the loading operational mode and the unloading operational mode based on a condition of the hygroscopic material; and,
receive a property of the hygroscopic material, an amount of liquid water produced by a condenser, an environmental condition, a system power state, or a combination thereof;
flow a working fluid in a regeneration flow path including the hygroscopic material during the unloading operational mode.

21. The system of claim 20, wherein the condition of the hygroscopic material is a weeping, swelling or instability condition of the hygroscopic material; and,
wherein the controller is configured to set a system operational limit before an onset of weeping, swelling or other unstable condition.

22. The system of claim 20, wherein the controller is further configured to:
determine a water content of the hygroscopic material; and,
determine if a water content of the hygroscopic material is above a predetermined threshold.

23. A system for generating water from air comprising:
a hygroscopic material to capture water vapor from air during a loading operational mode, and absorb thermal energy to release water vapor to a working fluid during an unloading operational mode;

a condenser configured to condense water vapor released in the working fluid to produce liquid water during the unloading operational mode; and a controller configured to:
flow air in a process flow path including the hygroscopic material to capture water vapor from air during the loading operational mode;
determine a power availability of the system;
determine if a system power state is above a predetermined threshold;
transition the system between the loading operational mode and the unloading operational mode based on a condition of the hygroscopic material; and,
flow a working fluid in a regeneration flow path including the hygroscopic material during the unloading operational mode.

\* \* \* \* \*